US009075258B2

(12) United States Patent
Watanabe

(10) Patent No.: US 9,075,258 B2
(45) Date of Patent: Jul. 7, 2015

(54) DISPLAY UNIT AND DISPLAY DEVICE

(75) Inventor: Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 616 days.

(21) Appl. No.: 13/508,550

(22) PCT Filed: Nov. 12, 2010

(86) PCT No.: PCT/JP2010/070234
§ 371 (c)(1),
(2), (4) Date: May 8, 2012

(87) PCT Pub. No.: WO2011/059071
PCT Pub. Date: May 19, 2011

(65) Prior Publication Data
US 2012/0236483 A1    Sep. 20, 2012

(30) Foreign Application Priority Data
Nov. 12, 2009   (JP) .................................. 2009-259346

(51) Int. Cl.
*H05K 7/00* (2006.01)
*G02F 1/1333* (2006.01)
(Continued)

(52) U.S. Cl.
CPC ...... *G02F 1/13336* (2013.01); *G02F 1/133526* (2013.01); *G02F 2001/133562* (2013.01);
(Continued)

(58) Field of Classification Search
CPC .............................. G06F 1/1616; G06F 1/1637
USPC ............. 361/679.01, 679.02, 679.04, 679.06, 361/679.16, 679.21, 679.27, 679.24; 345/1.1, 3.1, 3.2, 5, 24
See application file for complete search history.

(56) References Cited

U.S. PATENT DOCUMENTS 6,327,482 B1  12/2001  Miyashita
6,483,482 B1  11/2002  Kim
(Continued)

FOREIGN PATENT DOCUMENTS

CN    1237865 A    12/1999
JP    2-123989 U   10/1990
(Continued)

OTHER PUBLICATIONS

English translation of Official Communication issued in corresponding International Application PCT/JP2010/070234, mailed on Jun. 21, 2012.
(Continued)

*Primary Examiner* — Robert J Hoffberg
*Assistant Examiner* — Hung Dang
(74) *Attorney, Agent, or Firm* — Keating & Bennett, LLP

(57) ABSTRACT

A display unit according to the present invention (100*a*) includes at least one display panel (10) and at least one light-transmitting cover (20) disposed on a viewer's side of the at least one display panel; the at least one light-transmitting cover includes a planar portion (24) having a viewer-side surface (24*a*) which is a plane, and a curved surface portion (22) adjoining the planar portion along a first axis, the curved surface portion (22) having a viewer-side surface (22*a*) which is a curved surface; and the planar portion includes a slope portion such that the distance between a viewer-side surface and a rear surface decreases away from the curved surface portion along the first axis. According to the present invention, a direct-viewing type display unit and display device which are thinner than conventional are provided.

11 Claims, 32 Drawing Sheets

(51) Int. Cl.
  *G02F 1/1335* (2006.01)
  *G06F 1/16* (2006.01)
  *G09G 3/36* (2006.01)

(52) U.S. Cl.
  CPC ............ *G06F1/1616* (2013.01); *G06F 1/1641* (2013.01); *G02F 2001/133331* (2013.01); *G06F 1/1677* (2013.01); *G06F 1/1681* (2013.01); *G09G 3/36* (2013.01); *G09G 2380/02* (2013.01); *G09G 2380/14* (2013.01)

(56) References Cited

U.S. PATENT DOCUMENTS

| | | | |
|---|---|---|---|
| 2002/0104769 A1 | 8/2002 | Kim et al. | |
| 2004/0051944 A1 | 3/2004 | Stark | |
| 2006/0077544 A1* | 4/2006 | Stark | 359/448 |
| 2006/0244923 A1 | 11/2006 | Mitani et al. | |
| 2011/0109535 A1 | 5/2011 | Watanabe et al. | |

FOREIGN PATENT DOCUMENTS

| | | |
|---|---|---|
| JP | 05-188873 A | 7/1993 |
| JP | 2000-180964 A | 6/2000 |
| JP | 2001-005414 A | 1/2001 |
| JP | 2002-099226 A | 4/2002 |
| JP | 2004-507779 A | 3/2004 |
| JP | 2004-524551 A | 8/2004 |
| JP | 2006-308707 A | 11/2006 |
| WO | 2008/149449 A1 | 12/2008 |
| WO | 2009/157150 A1 | 12/2009 |

OTHER PUBLICATIONS

Official Communication issued in International Patent Application No. PCT/JP2010/070234, mailed on Dec. 7, 2010.

* cited by examiner

FIG.13
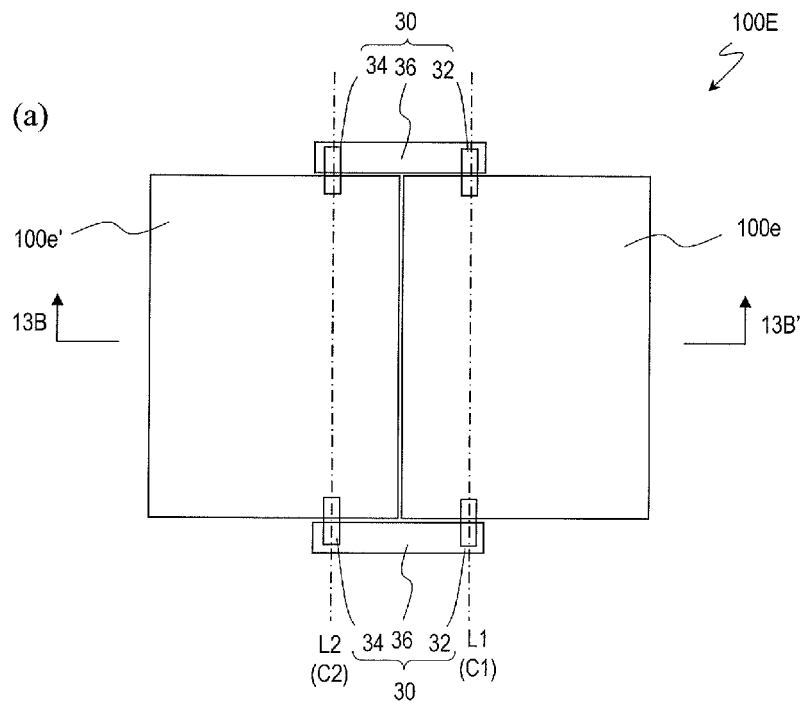
(a)
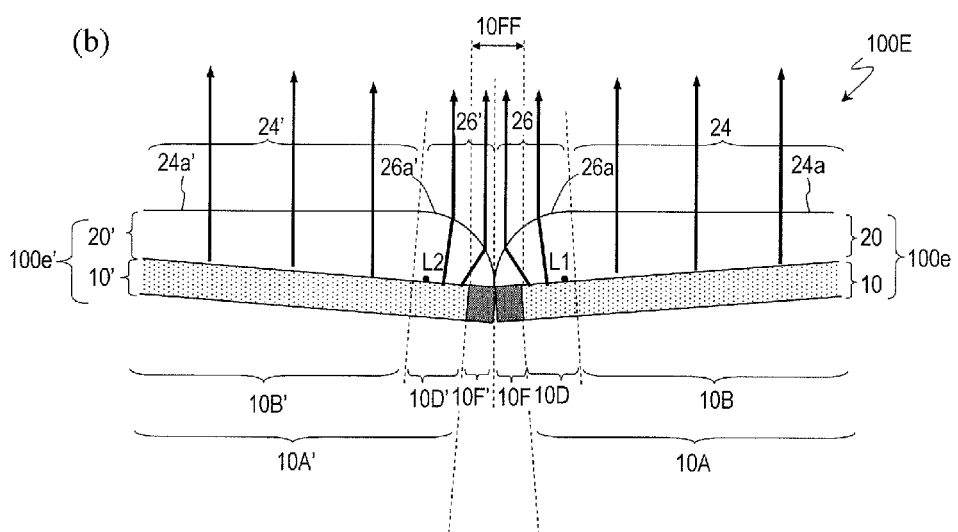
(b)

FIG.14
(a)
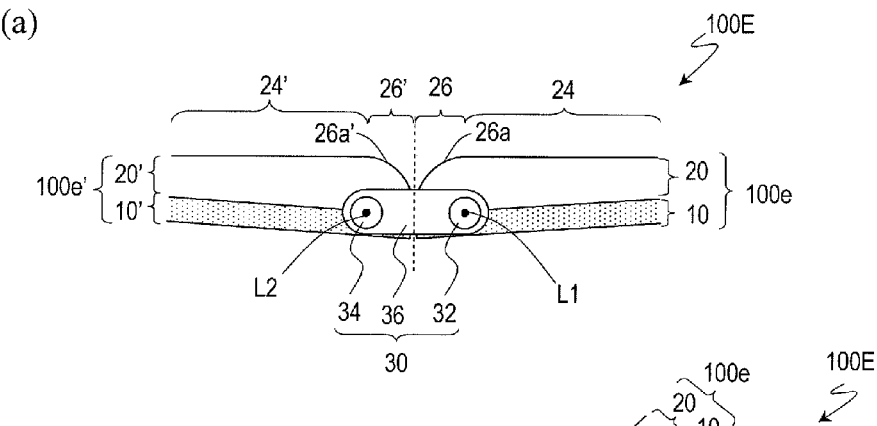
(b)
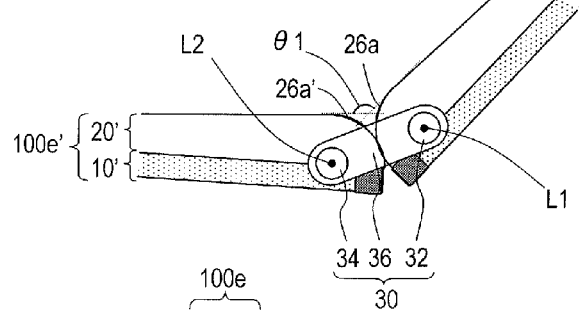
(c)
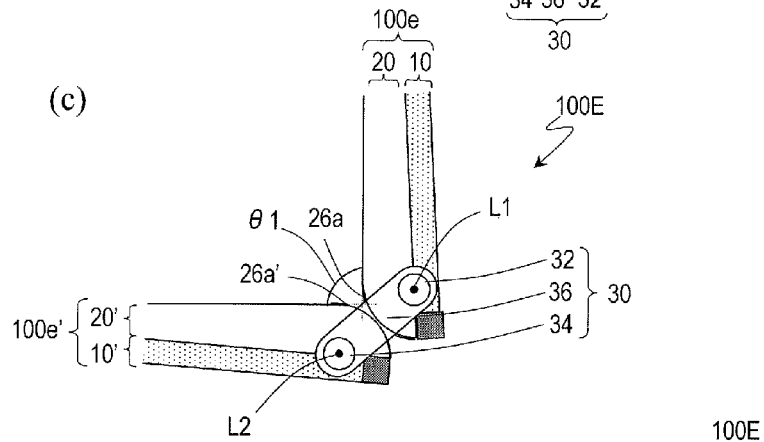
(d)
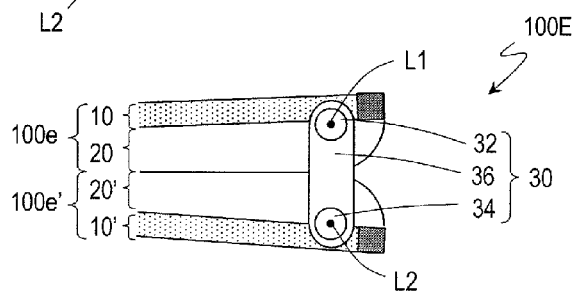

FIG.15
(a)
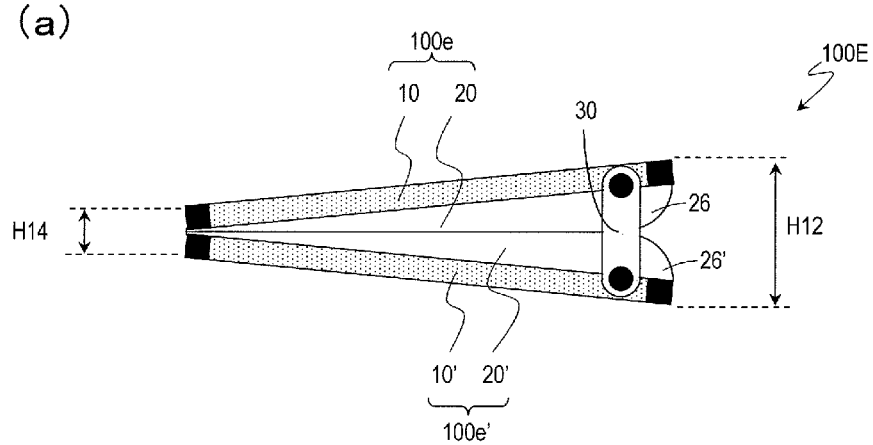
(b)
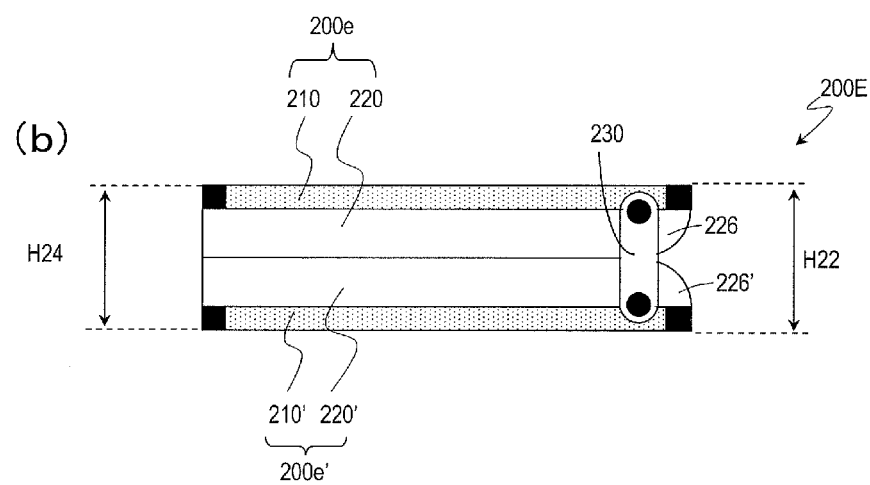

FIG.16
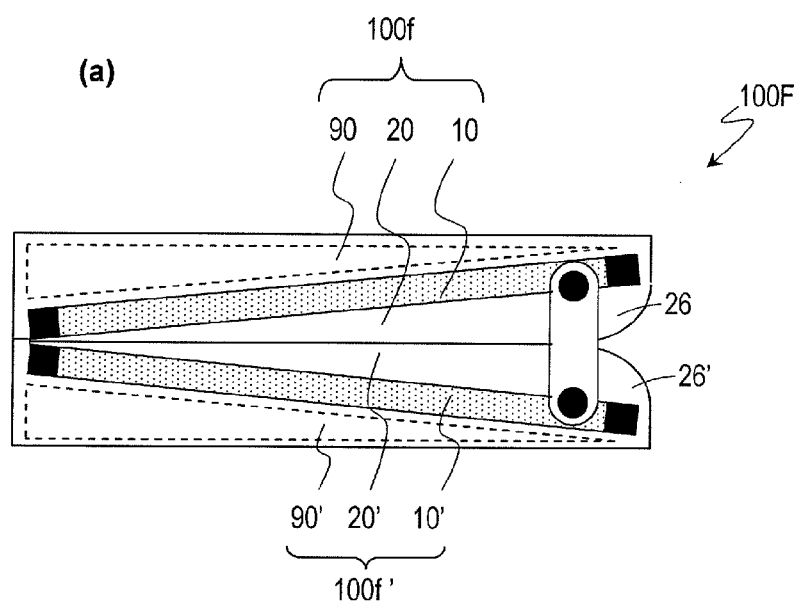
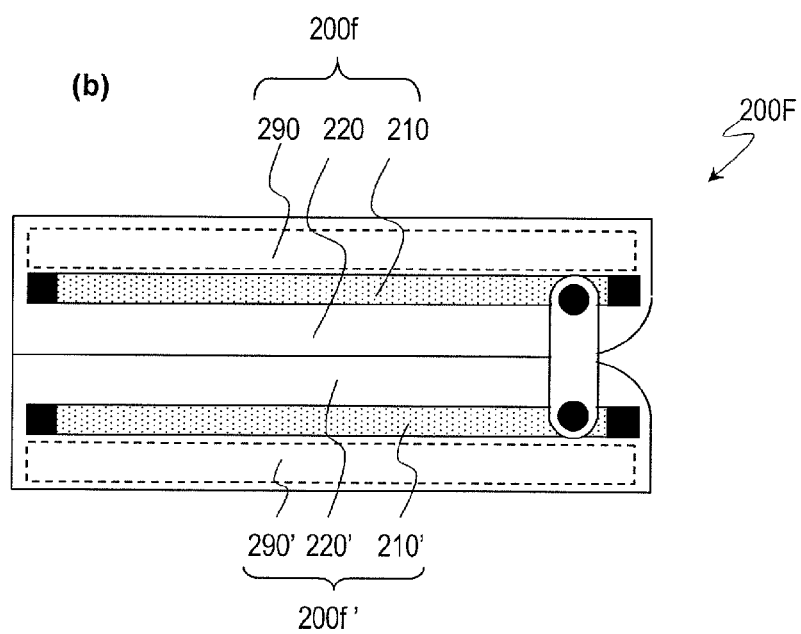

FIG.30
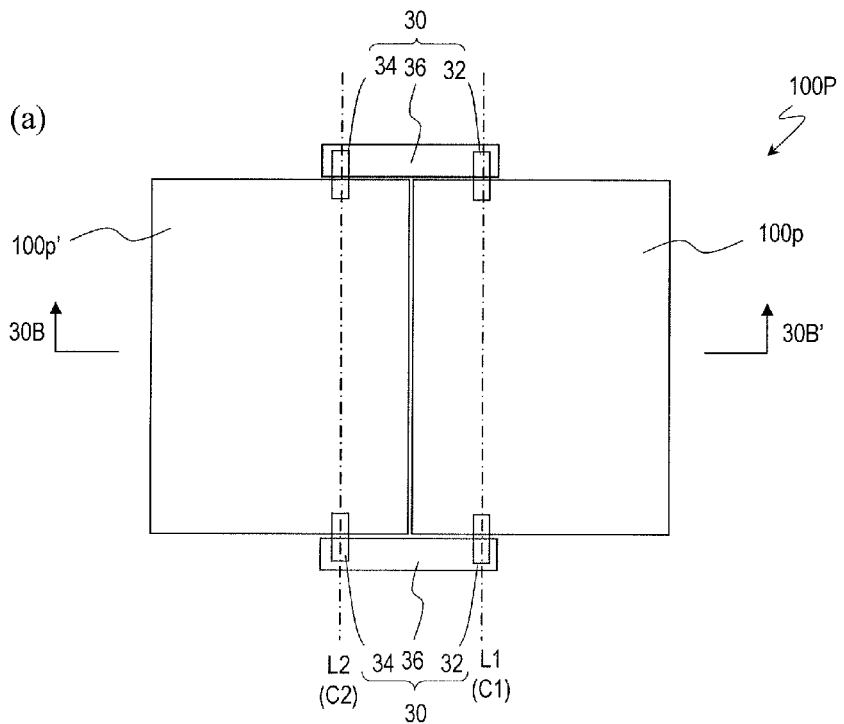
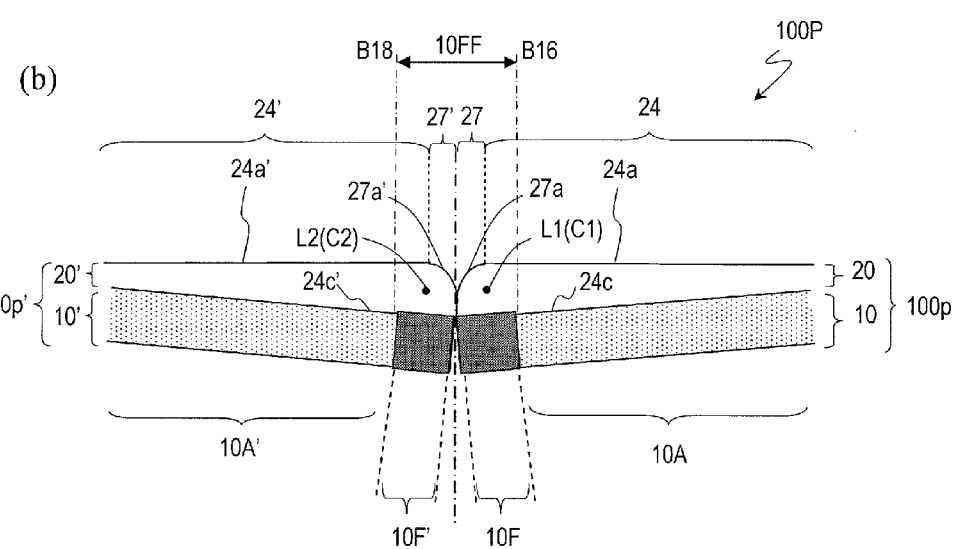

FIG.33
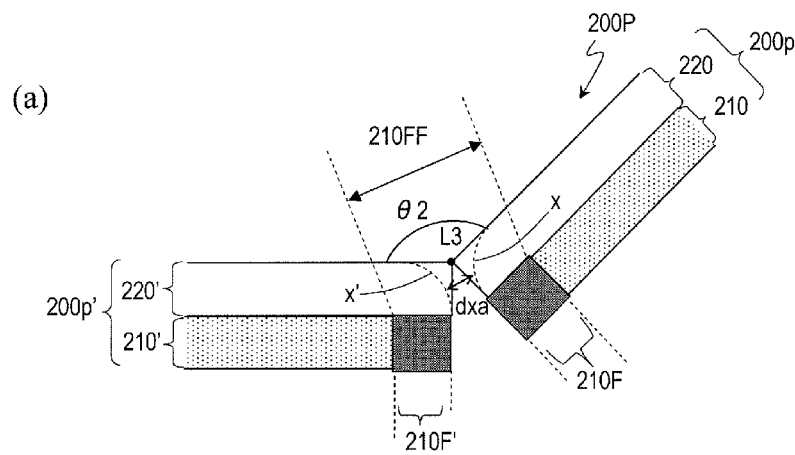
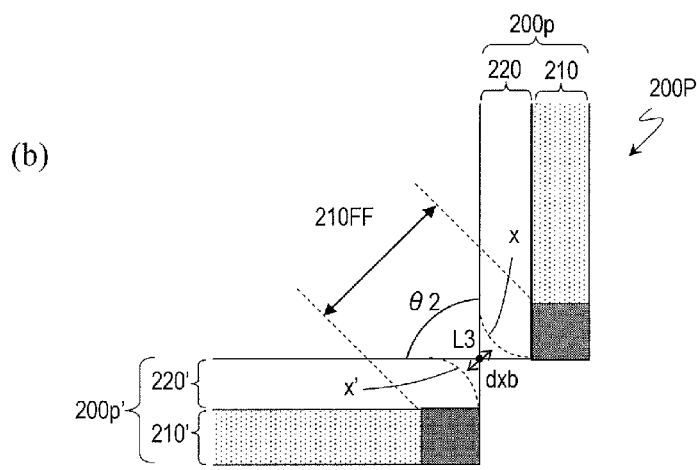
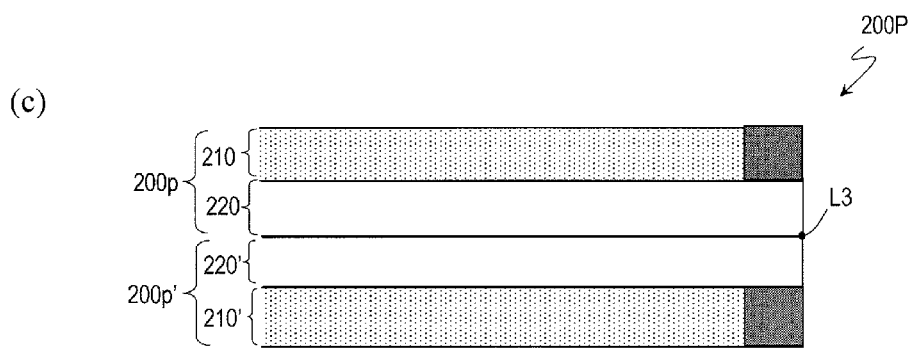

DISPLAY UNIT AND DISPLAY DEVICE

TECHNICAL FIELD

The present invention relates to a display unit and a display device, and in particular to a display unit and a display device of a direct-viewing type.

BACKGROUND ART

A liquid crystal display device includes a liquid crystal display panel, a backlight device, circuits for supplying various electrical signals to the liquid crystal display panel, and a power supply, as well as a housing in which to accommodate these. The liquid crystal display panel has a display region in which a plurality of pixels are arrayed, and a frame region around it. In the display region, pixel electrodes and TFTs are provided. In the frame region, a sealing portion, an implementation of driving circuitry, and the like are provided. Since no pixels are arrayed in the frame region, the frame region does not contribute to displaying. Although liquid crystal display devices are featuring narrower and narrower frames, the frame region cannot be abolished according to principles.

When a large screen is constructed by arraying a plurality of display panels, joints will occur in the image because the frame regions of the display panels do not contribute to displaying. Therefore, in order to display a jointless image, Patent Document 1 discloses a display device including a light-transmitting cover provided on the viewer's side of a display panel. An edge portion of this light-transmitting cover includes a portion where its viewer's side surface is curved. The curved portion functions as a lens, and therefore will be referred to as a "lens portion" hereinafter. The lens portion of the light-transmitting cover is provided so as to overlap the frame region of the display panel and a portion of a region of the display region adjoining the frame region. A portion of the display region that overlaps the lens portion will be referred to as a "peripheral display region". Light which goes out from pixels which are arrayed in the peripheral display region is refracted by the lens portion toward the frame region. As a result, an image is also displayed on the front face of the frame region, so that a jointless image is displayed on the entire screen.

CITATION LIST

Patent Literature

[Patent Document 1] Japanese National Phase PCT Laid-Open Publication No. 2004-524551

SUMMARY OF INVENTION

Technical Problem

It has been found through a study by the inventors that, in order to obscure the frame region by disposing a light-transmitting cover at the viewer's side of a display panel according to the technique described in Patent Document 1, the thickness of the lens portion needs to be three or more times as large as the width of the frame region. This has led to the finding that the display device described in Patent Document 1 has a problem of inferior portability due to the increased thickness and weight induced by the thicker light-transmitting cover. Especially when the technique described in Patent Document 1 is applied to a foldable display device, the display device will be thick in a folded state, which is not preferable for portable use.

The present invention has been made in order to solve the above problems, and an objective thereof is to provide a direct-viewing type display unit and display device which are thinner than conventional. It is a particular objective to provide a direct-viewing type display unit and display device, which are thinner than conventional, such that a frame region of a display panel is obscured or a jointless image can be displayed when a plurality of display panels are used for tiling. It is also an objective to provide a foldable display device which is thinner than conventional and capable of displaying a jointless image.

Solution to Problem

A direct-viewing type display unit according to the present invention comprises at least one display panel and at least one light-transmitting cover disposed on a viewer's side of the at least one display panel, wherein, the at least one light-transmitting cover includes a planar portion having a viewer-side surface which is a plane, and a curved surface portion adjoining the planar portion along a first axis, the curved surface portion having a viewer-side surface which is a curved surface; and the planar portion includes a slope portion such that a distance between a viewer-side surface and a rear surface decreases away from the curved surface portion along the first axis. The first axis is an axis extending along the horizontal direction, for example.

In one embodiment, a distance between a viewer-side surface and a rear surface of the at least one light-transmitting cover is largest at a boundary between the curved surface portion and the planar portion.

In one embodiment, the at least one display panel includes a display region, and a frame region provided outside the display region; and the slope portion extends over to a boundary between the display region and a portion of the frame region that is located at an opposite side from where the curved surface portion is located.

In one embodiment, the slope portion is disposed so as to adjoin the curved surface portion.

In one embodiment, the at least one display panel includes a display region and a frame region provided outside the display region; and the curved surface portion causes a part of light going out from the display region to be refracted toward the frame region.

In one embodiment, the planar portion has a cross-sectional shape which is a wedge shape.

In one embodiment, the at least one light-transmitting cover is formed by injection molding using an acrylic resin, for example.

A display device according to the present invention comprises a first display unit and a second display unit, the first display unit and the second display unit each being the above display unit, wherein, the first display unit includes a first display panel and a first light-transmitting cover disposed on a viewer's side of the first display panel; the second display unit includes a second display panel and a second light-transmitting cover disposed on a viewer's side of the second display panel; the first light-transmitting cover includes a first planar portion and a first curved surface portion adjoining the first planar portion along the first axis; the second light-transmitting cover includes a second planar portion and a second curved surface portion adjoining the second planar portion along the first axis; and the first curved surface portion adjoins the second curved surface portion along the first axis.

In one embodiment, an angle constituted by a side face of the first curved surface portion and a rear surface of the first curved surface portion is less than 90°, and an angle constituted by a side face of the second curved surface portion and a rear surface of the second curved surface portion is less than 90°.

In one embodiment, a distance between the viewer-side surface and a rear surface of the curved surface portion at the boundary between the curved surface portion and the planar portion is less than three times as large as a width of the frame region along a direction in which the first axis extends.

Another display device according to the present invention is a foldable display device comprising a first display unit and a second display unit, and a uniaxial hinge device having a single rotation axis, the first display unit and the second display unit each being the above display unit, wherein, the first display unit includes a first display panel and a first light-transmitting cover disposed on a viewer's side of the first display panel; the second display unit includes a second display panel and a second light-transmitting cover disposed on a viewer's side of the second display panel; and the first display unit and the second display unit are linked via the single rotation axis so as to be capable of relative rotation.

A still another display device according to the present invention is a foldable display device comprising a first display unit and a second display unit, and a biaxial hinge device, the first display unit and the second display unit each being the above display unit, wherein, the first display unit includes a first display panel and a first light-transmitting cover disposed on a viewer's side of the first display panel; the second display unit includes a second display panel and a second light-transmitting cover disposed on a viewer's side of the second display panel; the first display unit and the second display unit are linked by the biaxial hinge device so that the first display unit is capable of rotating around a first rotation axis and that the second display unit is capable of rotating around a second rotation axis which is parallel to the first rotation axis; the first light-transmitting cover includes a first planar portion and a first curved surface portion adjoining the first planar portion; the second light-transmitting cover includes a second planar portion and a second curved surface portion adjoining the second planar portion; a viewer-side surface of the first planar portion is a plane, and a viewer-side surface of the first curved surface portion is a part of a cylindrical surface having a center axis at a first center axis; a viewer-side surface of the second planar portion is a plane, and a viewer-side surface of the second curved surface portion is a part of a cylindrical surface having a center axis at a second center axis; the first rotation axis of the biaxial hinge device coincides with the first center axis of the first light-transmitting cover; and the second rotation axis of the biaxial hinge device coincides with the second center axis of the second light-transmitting cover.

In one embodiment, the first display panel includes a first display region and a first frame region provided outside the first display region; the second display panel includes a second display region and a second frame region provided outside the second display region; the first curved surface portion causes a part of light going out from a first peripheral display region to be refracted toward the first frame region, the first peripheral display region being within the first display region and adjoining the first frame region; and the second curved surface portion causes a part of light going out from a second peripheral display region to be refracted toward the second frame region, the second peripheral display region being within the second display region and adjoining the second frame region.

In one embodiment, when the first display unit and the second display unit are opened or closed, the viewer-side surface of the first curved surface portion and the viewer-side surface of the second curved surface portion are in contact, and the first display unit and the second display unit rotate in opposite directions from each other so as to satisfy the relationship that: an angle by which the first display unit rotates around the first rotation axis and an angle by which the second display unit rotates around the second rotation axis are equal.

In one embodiment, the biaxial hinge device links the first display unit and the second display unit so that, when the first display unit and the second display unit are opened or closed, the viewer-side surface of the first curved surface portion and the viewer-side surface of the second curved surface portion are in contact, and the following relationship is satisfied: an angle which a plane containing the first and second rotation axes constitutes with the viewer-side surface of the first planar portion and an angle which the plane constitutes with the viewer-side surface of the second planar portion are equal.

In one embodiment, the first display unit and the second display unit are impartially opened or closed, while the viewer-side surface of the first curved surface portion and the viewer-side surface of the second curved surface portion are in contact.

In one embodiment, the first display unit further includes a first light-transmitting subhousing extending in parallel to the first center axis and being disposed on a side face of the first display panel; the second display unit further includes a second light-transmitting subhousing extending in parallel to the second center axis and being disposed on a side face of the second display panel; the first display panel includes a first display region and a first frame region provided outside the first display region; the second display panel includes a second display region and a second frame region provided outside the second display region; the first light-transmitting subhousing is disposed so that an edge of the first curved surface portion of the first light-transmitting cover is located at a viewer's side of an end face of the first light-transmitting subhousing; the second light-transmitting subhousing is disposed so that an edge of the second curved surface portion of the second light-transmitting cover is located at a viewer's side of an end face of the second light-transmitting subhousing; the first light-transmitting subhousing and the first light-transmitting cover are formed integrally; the second light-transmitting subhousing and the second light-transmitting cover are formed integrally; the first curved surface portion causes a part of light going out from a first peripheral display region to be refracted toward the first frame region, the first peripheral display region being within the first display region and adjoining the first frame region; the second curved surface portion causes a part of light going out from a second peripheral display region to be refracted toward the second frame region, the second peripheral display region being within the second display region and adjoining the second frame region; a part of light going out from the first peripheral display region of the first display panel goes out toward a viewer's side of the first light-transmitting subhousing; and a part of light going out from the second peripheral display region of the second display panel goes out toward a viewer's side of the second light-transmitting subhousing.

In one embodiment, the end face of the first light-transmitting subhousing is formed so that a distance between the end face of the first light-transmitting subhousing and the side face of the first display panel increases toward a rear face and away from a viewer's side; and the end face of the second light-transmitting subhousing is formed so that a distance between the end face of the second light-transmitting subhousing and the side face of the second display panel increases toward a rear face and away from a viewer's side.

In one embodiment, the first display unit further includes a first planar subhousing and a first curved subhousing, the first planar subhousing having a viewer-side surface which is a plane, a viewer-side surface of the first curved subhousing being a part of a cylindrical surface having a center axis at the first center axis; the second display unit includes a second planar subhousing and a second curved subhousing, the second planar subhousing having a viewer-side surface which is a plane, a viewer-side surface of the second curved subhousing being a part of a cylindrical surface having a center axis at the second center axis; the first planar subhousing is disposed so as to adjoin the first planar portion of the first light-transmitting cover; the second planar subhousing is disposed so as to adjoin the second planar portion of the second light-transmitting cover; the first curved subhousing is disposed so as to adjoin the first curved surface portion of the first light-transmitting cover; the second curved subhousing is disposed so as to adjoin the second curved surface portion of the second light-transmitting cover; a distance between the viewer-side surface of the first curved subhousing and the first center axis is greater than a distance between the viewer-side surface of the first curved surface portion and the first center axis; and a distance between the viewer-side surface of the second curved subhousing and the second center axis is greater than a distance between the viewer-side surface of the second curved surface portion and the second center axis.

In one embodiment, a first rugged structure is provided on the viewer-side surface of the first curved subhousing, and a second rugged structure to mesh with the first rugged structure is provided on the viewer-side surface of the second curved subhousing.

Another display device according to the present invention is a foldable display device comprising a first display unit and a second display unit, and a biaxial hinge device, the first display unit and the second display unit each being the above display unit, wherein, the first display unit includes a first display panel, a first light-transmitting cover disposed on a viewer's side of the first display panel, and a first housing; the second display unit includes a second display panel, a second light-transmitting cover disposed on a viewer's side of the second display panel, and a second housing; the first display unit and the second display unit are linked by the biaxial hinge device so that the first display unit is capable of rotating around the first rotation axis and that the second display unit is capable of rotating around a second rotation axis which is parallel to the first rotation axis; the first housing includes a first planar subhousing and a first curved subhousing, the first planar subhousing having a viewer-side surface which is a plane, a viewer-side surface of the first curved subhousing being a part of a cylindrical surface having a center axis at a first center axis; the second housing includes a second planar subhousing and a second curved subhousing, the second planar subhousing having a viewer-side surface which is a plane, a viewer-side surface of the second curved subhousing being a part of a cylindrical surface having a center axis at a second center axis; the first light-transmitting cover includes a first planar portion and a first curved surface portion, the first planar portion having a viewer-side surface which is a plane, a viewer-side surface of the first curved surface portion having a cross section which is a curve defined by an aspherical function, the cross section being perpendicular to the first center axis; the second light-transmitting cover includes a second planar portion and a second curved surface portion, the second planar portion having a viewer-side surface which is a plane, a viewer-side surface of the second curved surface portion having a cross section which is a curve defined by an aspherical function, the cross section being perpendicular to the second center axis; the first rotation axis of the biaxial hinge device coincides with the first center axis of the first housing; the second rotation axis of the biaxial hinge device coincides with the second center axis of the second housing; the first light-transmitting cover is disposed so that the first curved surface portion adjoins the first curved subhousing and that the first planar portion adjoins the first planar subhousing; and the second light-transmitting cover is disposed so that the second curved surface portion adjoins the second curved subhousing and that the second planar portion adjoins the second planar subhousing.

In one embodiment, the first planar subhousing includes a first slanted subhousing such that a distance between a viewer-side surface and a rear surface decreases away from a boundary between the first planar subhousing and the first curved subhousing along the first axis; and the second planar subhousing includes a second slanted subhousing such that a distance between a viewer-side surface and a rear surface decreases away from a boundary between the second planar subhousing and the second curved subhousing along the first axis.

Another display device according to the present invention comprises a first display unit and a second display unit, the first display unit and the second display unit each being the above display unit, wherein, the first display unit includes a first display panel and a first light-transmitting cover disposed on a viewer's side of the first display panel; the second display unit includes a second display panel and a second light-transmitting cover disposed on a viewer's side of the second display panel; the first light-transmitting cover includes a first planar portion and a first curved surface portion adjoining the first planar portion along the first axis; the second light-transmitting cover includes a second planar portion and a second curved surface portion adjoining the second planar portion along the first axis; and the first display unit adjoins the second display unit in such a manner that an edge portion of a rear surface of the first display panel at the first curved surface portion side overlies an edge portion of a viewer-side surface of the second planar portion at an opposite side from the second curved surface portion.

In one embodiment, the first display unit further includes a bottom subhousing disposed on a rear face side of the first display panel such that a recessed portion is formed in an edge portion of the bottom subhousing at the first curved surface portion side, the recessed portion having a shape corresponding to the shape of an edge portion of the second planar portion at an opposite side from the second curved surface portion.

In one embodiment, a region of the at least one display panel on the rear face side where a battery and/or a circuit board are disposed has a cross-sectional shape which is a wedge shape.

In one embodiment, a display device according to the present invention further comprises a backlight device for emitting light toward the at least one display panel, the backlight device including a light guide plate and a light source, the light guide plate having a cross-sectional shape which is a wedge shape.

In one embodiment, the display panel is a touchscreen.

In one embodiment, the display device is a smartphone.

In one embodiment, the display device is an electronic book.

In one embodiment, the display device is a display device for use at an amusement facility.

Advantageous Effects of Invention

According to the present invention, there are provided a direct-viewing type display unit and display device which are thinner than conventional, such that a frame region of a display panel is obscured or a jointless image can be displayed when a plurality of display panels are used for tiling. In particular, there is provided a foldable display device which is thinner than conventional and capable of displaying a jointless image.

BRIEF DESCRIPTION OF DRAWINGS

FIG. 2 A schematic cross-sectional view of an edge portion of the liquid crystal display unit 100a.

FIGS. 13 (a) and (b) are diagrams showing the liquid crystal display device 100E, where (a) is a schematic plan view, and (b) is a schematic cross-sectional view along line 13B-13B' in (a).

FIGS. 14 (a), (b), (c), and (d) are schematic cross-sectional views of the liquid crystal display device 100E at open angles of 180°, 135°, 90°, and 0°, respectively.

FIG. 15 (a) is a schematic cross-sectional view of the liquid crystal display device 100E in a closed state; and (b) is a schematic cross-sectional view of a liquid crystal display device 200E of Comparative Example in a closed state.

FIG. 16 (a) is a schematic cross-sectional view of a liquid crystal display device 100F in a closed state; and (b) is a schematic cross-sectional view of a liquid crystal display device 200F of Comparative Example in a closed state.

FIGS. 30 (a) and (b) are diagrams showing a liquid crystal display device 100P, where (a) is a schematic plan view, and (b) is a schematic cross-sectional view along line 30B-30B' in (a).

FIGS. 33 (a), (b), and (c) are schematic cross-sectional views of the liquid crystal display device 200P of Comparative Example at open angles of 135°, 90°, and 0°, respectively.

DESCRIPTION OF EMBODIMENTS

Hereinafter, with reference to the drawings, a display unit and display device according to an embodiment of the present invention will be described; however, the display unit and display device of the present invention are not to be limited to the following examples.

Figure 1:
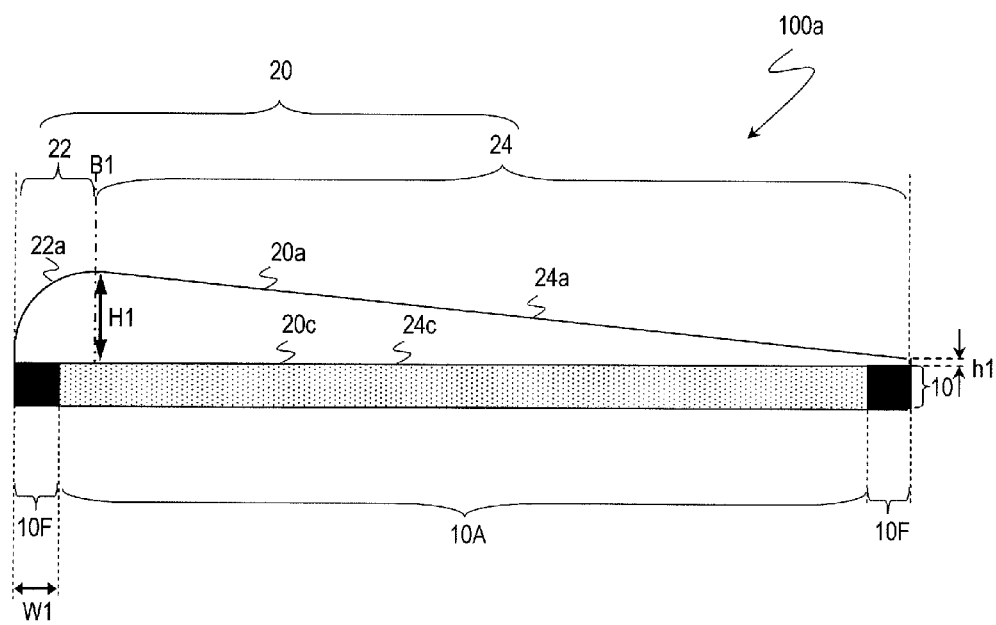
FIG. 1 A schematic cross-sectional view of a liquid crystal display unit 100a according to an embodiment of the present invention.
Figure 2:
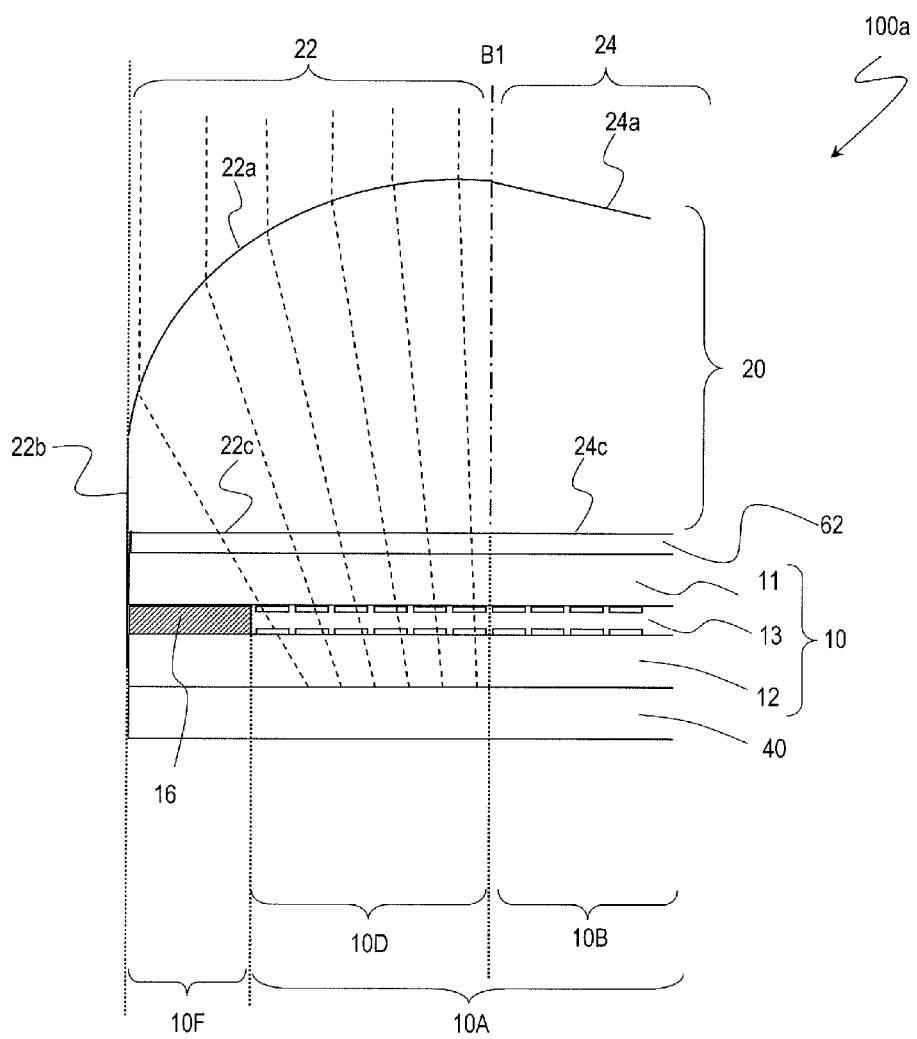

First, with reference to FIG. 1 and FIG. 2, the construction of a liquid crystal display unit 100a according to an embodiment of the present invention will be described. FIG. 1 is a schematic cross-sectional view of the liquid crystal display unit 100a. FIG. 2 is a schematic cross-sectional view of an edge portion of the liquid crystal display unit 100a.

As shown in FIG. 1, the liquid crystal display unit 100a includes a liquid crystal display panel 10 and a light-transmitting cover 20 disposed on the viewer's side of the liquid crystal display panel 10.

The liquid crystal display panel 10 is a known liquid crystal display panel. As shown in FIG. 1, the liquid crystal display panel 10 has a display region 10A in which a plurality of pixels are arrayed, and a frame region 10F provided outside the display region 10A.

As shown in FIG. 1, the light-transmitting cover 20 has a planar portion 24 and a curved surface portion 22 adjoining the planar portion 24 along a first axis (which herein is the horizontal direction). A viewer-side surface 24a of the planar portion 24 is a plane. A viewer-side surface 22a of the curved surface portion 22 is a curved surface.

As shown in FIG. 2, the curved surface portion 22 is disposed at a position overlapping a region that contains the frame region 10F of the liquid crystal display panel 10 and a peripheral display region 10D within the display region 10A that adjoins the frame region 10F. The viewer-side surface 22a of the curved surface portion 22 has a cross-sectional shape which is an arc with a central angle of 90°, as shown in FIG. 2, for example. FIG. 2 schematically shows rays going out from the liquid crystal display panel 10 and entering the curved surface portion 22 of the light-transmitting cover 20. As shown in FIG. 2, light going out from the peripheral display region 10D enters the curved surface portion 22, and is refracted at the viewer-side surface 22a of the curved surface portion 22, so as to travel in the normal direction of the display plane of the liquid crystal display panel 10. Therefore, an image which is formed in the peripheral display region 10D is enlarged in the region consisting of the peripheral display region 10D and the frame region 10F. The image is not displayed in the frame region 10F of the liquid crystal display panel 10 because no pixels are provided there. However, the frame region 10F can be obscured by disposing the light-transmitting cover 20 having the curved surface portion 22 on the viewer's side of the liquid crystal display panel 10. In other words, the curved surface portion 22 functions as a lens, similarly to a "lens portion" described in the aforementioned Patent Document 1.

The planar portion 24 includes a slope portion in which the distance between the viewer-side surface and the rear surface decreases away from the curved surface portion 22 along the first axis. The slope portion extends over to a portion of the frame region 10F that is at the opposite side from the side where the curved surface portion 22 is located, as shown in FIG. 1, for example. Moreover, as shown in FIG. 1, the slope portion adjoins the curved surface portion 22. In other words, as shown in FIG. 1, the slope portion is disposed in a region consisting of the region of the display region 10A excluding the peripheral display region 10D (a central display region 10B shown in FIG. 2) and a portion of the frame region 10F that is at the opposite side from the side where the curved surface portion 22 is located. In other words, as shown in FIG. 1, the planar portion 24 is composed only of the slope portion, such that the distance between the viewer-side surface 24a and the rear surface 24c of the planar portion 24 decreases away from the curved surface portion 22 (i.e., away from a boundary B1 between the curved surface portion 22 and the planar portion 24) along the first axis. In other words, the planar portion 24 has a cross-sectional shape which is a wedge shape as shown in FIG. 1. Note that the planar portion 24 does not need to be composed only of the slope portion; for example, the planar portion may also include a flat portion whose viewer-side surface and rear surface are parallel, in addition to the slope portion, as will be described later. Since the planar portion 24 has the slope portion, the liquid crystal display unit 100a is made thin and light-weighted as will be described below.

Hereinafter, it will be explained that the liquid crystal display unit 100a attains a thinner light-transmitting cover 20 than that of a liquid crystal display unit 200a of Comparative Example.

Figure 3:
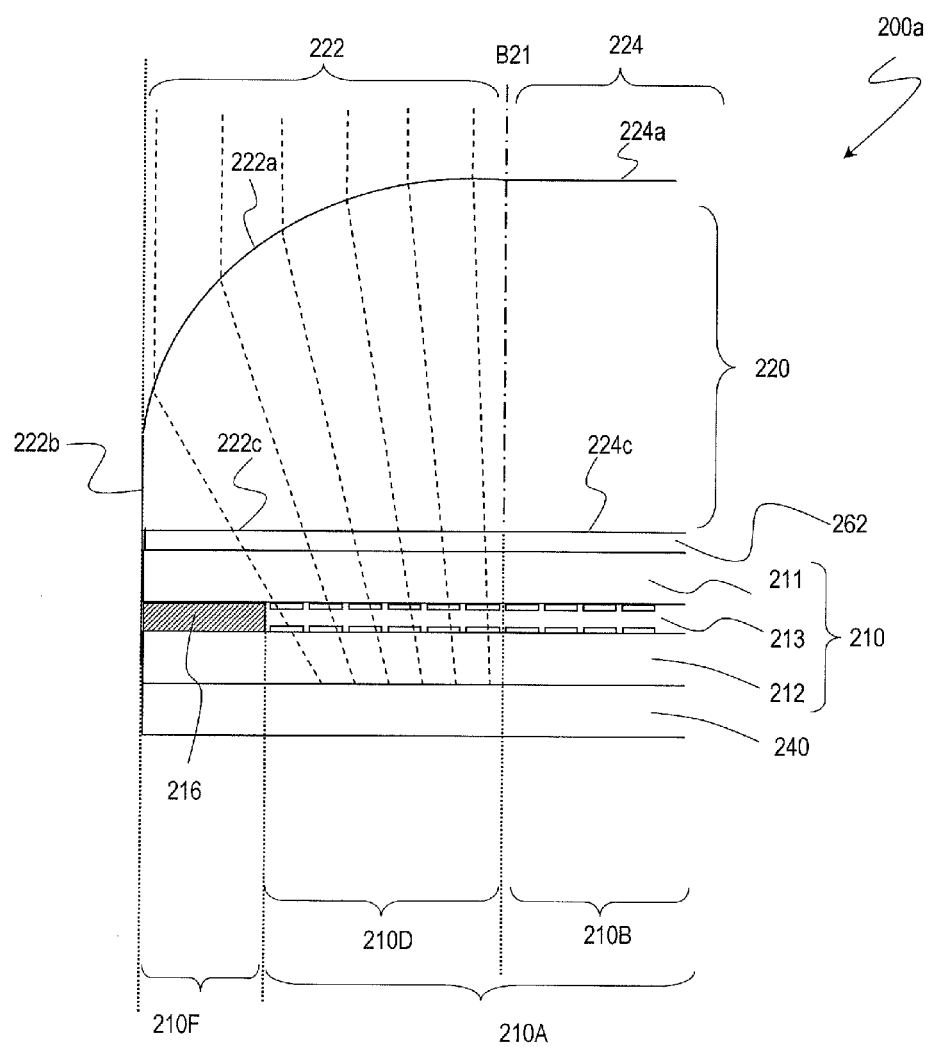
FIG. 3 A schematic cross-sectional view of an edge portion of a liquid crystal display unit 200a of Comparative Example.

First, with reference to FIG. 3, the liquid crystal display unit 200a of Comparative Example will be described. FIG. 3 is a schematic cross-sectional view of an edge portion of the liquid crystal display unit 200a of Comparative Example. As shown in FIG. 3, the liquid crystal display unit 200a includes a liquid crystal display panel 210, and a light-transmitting cover 220 disposed on the viewer's side of the liquid crystal display panel 210. The liquid crystal display panel 210 has a display region 210A and a frame region 210F. The liquid crystal display unit 200a differs from the liquid crystal display unit 100a (FIG. 2) in terms of the shape of the light-transmitting cover. The light-transmitting cover 220 includes a planar portion 224 and a curved surface portion 222, such that a viewer-side surface 224a and a rear surface 224c of the planar portion 224 are parallel. As schematically shown in FIG. 3, light going out from a peripheral display region 210D of the liquid crystal display panel 210 enters the curved surface portion 222, and is refracted at a viewer-side surface 222a of the curved surface portion 222. Therefore, since an image which is formed in the peripheral display region 210D is enlarged onto a region consisting of the peripheral display region 210D and the frame region 210F, the frame region 210F can be obscured.

Figure 4:
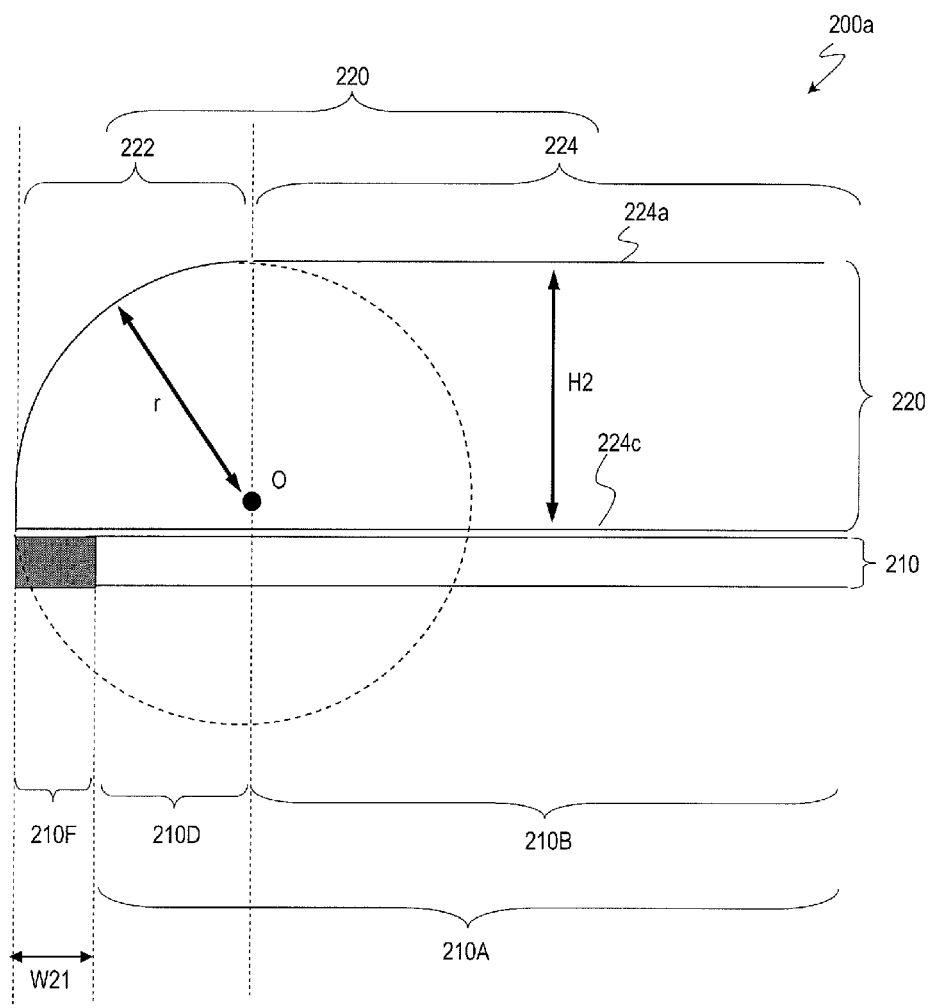
FIG. 4 A diagram for explaining exemplary design values for the liquid crystal display unit 200a of Comparative Example.

Next, with reference to FIG. 4, exemplary design values for the liquid crystal display unit 200a will be described. It has been found through a study by the inventors that, in order to obscure the frame region 210F all the way to the end (i.e., display an image all the way to the end of the curved surface portion 222), a thickness H2 of the curved surface portion 222 needs to be made three or more times as large as a width W21 of the frame region 210F (i.e., the width of the frame region 210F along the horizontal direction). For example, when the width W21 of the frame region 210F is 2.0 mm, in order to display an image all the way to the end of the frame region 210F, it is necessary that the thickness H2 of the curved surface portion 222 needs to be 6.0 mm or more. For example, when the thickness H2 of the curved surface portion 222 is 7.0 mm, since the viewer-side surface 224a and the rear surface 224c of the planar portion 224 are parallel, the thickness of the planar portion 224 is 7.0 mm across the entire planar portion 224.

In a display device composed of an arrangement of a plurality of display panels, a non-display region exists between adjoining display panels. The non-display region includes the frame region of each display panel, and in the case where interspaces or connecting portions exist between them, also includes any such interspace or connecting portion. In order to display a jointless image on a display device composed of an arrangement of a plurality of display panels, the image needs to be displayed on this non-display region. In the case where the non-display region is composed only of the frame regions of adjoining display panels, for example, in order to display a jointless image, the image needs to be displayed all the way to the ends of the frame regions of adjoining display panels. In the case where the non-display region includes not only the frame regions of adjoining display panels but also interspaces or connecting portions therebetween, in order to display a jointless image, the image needs to be displayed even outside of the ends of the frame regions, such that the thickness of each curved surface portion needs to be further increased. Moreover, as the non-display region becomes larger, it becomes necessary to increase the thickness of each curved surface portion in order to display a jointless image.

Therefore, in order to display a jointless image especially on a display device composed of an arrangement of a plurality of display panels, each light-transmitting cover must be thick. Moreover, especially in a foldable display device having a plurality of display panels, if a light-transmitting cover having a curved surface portion is disposed on each display panel for displaying a jointless image, the thickness of the entire display device when folded will increase, which is not preferable for portable use.

The planar portion 24 of the light-transmitting cover 20 of the liquid crystal display unit 100a according to an embodiment of the present invention has a slope portion such that the distance between the viewer-side surface 24a and the rear surface 24c decreases away from the curved surface portion 22 along the first axis. Therefore, the planar portion 24 of the light-transmitting cover 20 can be made thinner than the planar portion 224 of the light-transmitting cover 220 of the liquid crystal display unit 200a of Comparative Example. On the other hand, the thickness of the curved surface portion 22 of the light-transmitting cover 20 of the liquid crystal display unit 100a is the same as the thickness of the curved surface portion 222 of the light-transmitting cover 220 of the liquid crystal display unit 200a of Comparative Example. Therefore, the liquid crystal display unit 100a is able to obscure the frame region 10F to the same extent that the liquid crystal display unit 200a of Comparative Example can. Thus, the resultant liquid crystal display unit 100a has an obscure frame region 10F and is thinner than conventional. Moreover, the liquid crystal display unit 100a is lighter than conventional. Thus, it has excellent portability.

Examples of design values for the light-transmitting cover 20 may be as follows, with reference to FIG. 1; a width W1 of the frame region 10F: 2.0 mm; a thickness H1 of the curved surface portion 22: 7.0 mm; a thickness h1 of an edge portion of the planar portion 24 at the opposite side from the side where the curved surface portion 22 is: 1.0 mm. Note that the width W1 of the frame region 10F is a width of the frame region 10F in a direction which runs along the first axis (horizontal direction). In this case, the thickness h1 of the edge portion of the planar portion 24 can be made about $\frac{1}{7}$ of the thickness of the planar portion 224 of the light-transmitting cover 220 in the aforementioned liquid crystal display unit 200a of Comparative Example. Also in this case, the liquid crystal display unit 100a can obscure the frame region 10F all the way to the end. In other words, an image can be displayed all the way to the end of the curved surface portion 22.

As shown in FIG. 1, the distance between the viewer-side surface 20a and the rear surface 20c of the light-transmitting cover 20 of the liquid crystal display unit 100a is largest at the boundary B1 between the curved surface portion 22 and the planar portion 24. With this construction, as will be described below, the liquid crystal display unit 100a is able to reduce the oddness felt by the viewer, as compared to a liquid crystal display unit 400a of Comparative Example (FIG. 5(a)).

Figure 5:
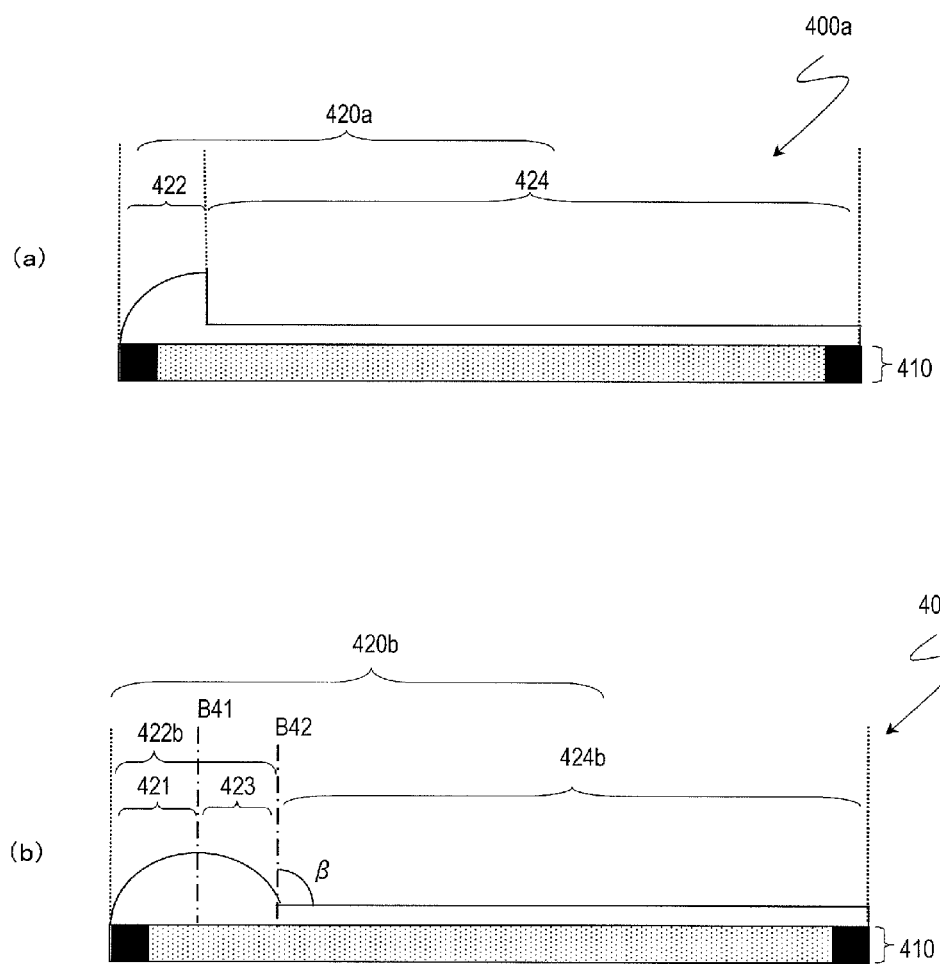
FIG. 5 (a) is a schematic cross-sectional view of a liquid crystal display unit 400a of Comparative Example; and (b) is a schematic cross-sectional view of a liquid crystal display unit 400b of Comparative Example.

A method for making the light-transmitting cover thin without changing the thickness of the curved surface portion might be, for example, making the entire planar portion 424 of the light-transmitting cover 420a thinner, as in the liquid crystal display unit 400a of Comparative Example shown in FIG. 5(a). However, the liquid crystal display unit 400a has a level difference between a planar portion 424 and a curved surface portion 422, and this level difference, when visually recognized, will presumably appear odd to the viewer of the liquid crystal display unit 400a. As shown in FIG. 1, since the liquid crystal display unit 100a according to an embodiment of the present invention does not have the aforementioned level difference which belongs to the liquid crystal display unit 400a, the oddness felt by the viewer can be reduced.

In order to eliminate the aforementioned level difference of the liquid crystal display unit 400a, as manifested by a liquid crystal display unit 400b of Comparative Example shown in FIG. 5(b), for example, a curved surface portion having viewer-side surface which is a semicylindrical surface might be adopted as a curved surface portion 422b of a light-transmitting cover 420b. As shown in FIG. 5(b), in the liquid crystal display unit 400b of Comparative Example, the curved surface portion 422b of the light-transmitting cover 420b has a viewer-side surface which is a semicylindrical surface, such that the curved surface portion 422b has a first curved surface portion 421 which is similar in shape to the curved surface portion 422 of the liquid crystal display unit 400a (FIG. 5(a)), and a second curved surface portion 423 which exists between the first curved surface portion 421 and the planar portion 424b, the second curved surface portion 423 having a viewer-side surface shape which is symmetric to the viewer-side surface of the first curved surface portion 421. The distance between the viewer-side surface and the rear surface of the light-transmitting cover 420b is largest at a boundary B41 between the first curved surface portion 421 and the second curved surface portion 423. Moreover, as shown in FIG. 5(b), the planar portion 424b of the liquid crystal display unit 400b has a viewer-side surface which is a parallel plane to the rear surface. Since the liquid crystal display unit 400b does not have the aforementioned level difference of the liquid crystal display unit 400a, oddness associated with a level difference is not felt by the viewer. However, the boundary B42 between the curved surface portion 422b and the planar portion 424b of the liquid crystal display unit 400b, when visually recognized, may cause the viewer to feel odd. As shown in FIG. 5(b), an angle β constituted by the viewer-side surface of the curved surface portion 422b and the viewer-side surface of the planar portion 424b at the boundary B42 between the planar portion 424b and the curved surface portion 422b (an angle constituted by a tangential line of a cross section of the viewer-side surface of the curved surface portion 422b at the boundary B42 and a straight line representing a cross section of the viewer-side surface of the planar portion 424b) is about 90°. It is considered that the oddness associated with the boundary B42 being visually recognized will become more conspicuous as the angle β constituted by the viewer-side surface of the curved surface portion 422b and the viewer-side surface of the planar portion 424b at the boundary B42 between the planar portion 424b and the curved surface portion 422b decreases.

When the distance between the viewer-side surface 20a and the rear surface 20c of the light-transmitting cover 20 is largest at the boundary B1 between the curved surface portion 22 and the planar portion 24 as in the light-transmitting cover 20 of the liquid crystal display unit 100a according to an embodiment of the present invention, the angle constituted by the viewer-side surface 22a of the curved surface portion 22 and the viewer-side surface 24a of the planar portion 24 at the boundary B1 is larger than the angle β of the liquid crystal display unit 400b shown in FIG. 5(b), so that oddness such as that pertaining to the liquid crystal display unit 400b can be reduced.

Note that, even if the distance between the viewer-side surface 20a and the rear surface 20c of the light-transmitting cover 20 becomes largest at a place which is not the boundary B1 between the curved surface portion 22 and the planar portion 24, inclusion of a slope portion such that the distance between the viewer-side surface 24a and the rear surface 24c decreases away from the curved surface portion 22 along the first axis in the planar portion 24 reduces oddness such as that pertaining to the liquid crystal display unit 400b because the angle constituted by the viewer-side surface 22a of the curved surface portion 22 and the viewer-side surface 24a of the planar portion 24 at the boundary B1 will be larger than the angle β of the liquid crystal display unit 400b (FIG. 5(b)). In the liquid crystal display unit 400b, as described above, the viewer-side surface of the planar portion 424b is parallel to the rear surface, and therefore is also parallel to the display plane of the liquid crystal display panel 410. When the aforementioned slope portion is included in the planar portion 24 as in the liquid crystal display unit 100a (FIG. 1), at the boundary B1, the viewer-side surface 24a of the planar portion 24 is inclined with respect to the display plane of the liquid crystal display panel 10 so that the distance between the viewer-side surface 24a and the display plane decreases away from the curved surface portion 22. In this case, the angle constituted by the viewer-side surface 22a of the curved surface portion 22 and the viewer-side surface 24a of the planar portion 24 at the boundary B1 is larger than that of the liquid crystal display unit 400b, corresponding to the gradient of the viewer-side surface 24a relative to the display plane of the liquid crystal display panel 10.

Moreover, in the case where the distance between the viewer-side surface 20a and the rear surface 20c of the light-transmitting cover 20 becomes largest at a place which is not the boundary B1, even if there is a level difference between the planar portion 24 and the curved surface portion 22, the level difference can be made small by adopting a slope portion in a portion of the planar portion 24 close to the curved surface portion 22. Inclusion of a slope portion in the planar portion 24 will reduce the level difference between the planar portion 24 and the curved surface portion 22 because then the planar portion 24 will have an increased thickness in the portion adjoining the curved surface portion 22.

In a construction which displays an image on the curved surface portion 22, as in the liquid crystal display unit 100a, the distance between the viewer-side surface 20a and the rear surface 20c of the light-transmitting cover 20 being largest at the boundary B1 between the curved surface portion 22 and the planar portion 24 is preferable also in terms of the display signal to be supplied to the pixels of the liquid crystal display panel 10. In the case where the distance between the viewer-side surface and the rear surface of the light-transmitting cover 420b becomes largest on the viewer-side surface of the curved surface portion 422b as in the liquid crystal display unit 400b, within the light entering the curved surface portion 422b from the liquid crystal display panel 410, the light entering the first curved surface portion 421 and the light entering the second curved surface portion 423 will be refracted toward opposite sides. As will be described later, when the frame region 10F is to be obscured by allowing the light going out from the peripheral display region 10D to be refracted at the viewer-side surface 22a of the curved surface portion 22 in the liquid crystal display unit 100a, the display signal to be supplied to the pixels in the peripheral display region 10D may be compressed, for example. The display signal to be supplied to the pixels of the liquid crystal display panel 410 will be complicated if two curved surface portions exist that refract incident light toward opposite sides as in the liquid crystal display unit 400b.

The curved surface portion 22 of the light-transmitting cover 20 of the liquid crystal display unit 100a is disposed on the frame region 10F and a part (peripheral display region 10D) of the display region 10A. However, as in a liquid crystal display device 100P according to an embodiment of the present invention which will be described later (FIGS. 30 and 31), for example, the radius of curvature of the curved surface portion 27 may be made smaller than the width of the frame region 10F. In other words, a construction may be adopted in which the curved surface portion 27 is disposed on the viewer's side of a part of the frame region 10F.

Since the curved surface portion 27 of the liquid crystal display device 100P (FIG. 30) is disposed on the viewer's side of a part of the frame region 10F, no image is displayed on the curved surface portion 27. Particularly in the case where no image is displayed on the curved surface portion as in the liquid crystal display device 100P, it is not necessary that the distance between the viewer-side surface and the rear surface of the light-transmitting cover be largest at the boundary between the curved surface portion and the planar portion. The reason is that, since no image is displayed on the curved surface portion 27, the viewer will not feel odd as in the case of the liquid crystal display unit 400b (FIG. 5(b)). Moreover, the display signal will not be complicated as mentioned earlier.

The viewer-side surface 22a of the curved surface portion 22 of the light-transmitting cover 20 of the liquid crystal display unit 100a has a cross-sectional shape which is an arc with a central angle of 90°, as shown in FIG. 1. However, even if the cross-sectional shape of the viewer-side surface 22a is an arc with a central angle smaller than 90°, a display unit whose frame region 10F is obscured and which is thinner than conventional can be obtained because of a part of the image being displayed on the frame region 10F. When the cross-sectional shape of the viewer-side surface 22a is an arc with a central angle greater than 90°, the distance between the viewer-side surface and the rear surface of the light-transmitting cover will be largest on the viewer-side surface of the curved surface portion, as is the case with the light-transmitting cover 420b of the liquid crystal display unit 400b. Therefore, the viewer may feel odd, similarly to the liquid crystal display unit 400b. Note that such oddness can be suppressed when the cross-sectional shape of the viewer-side surface 22a is an arc with a central angle which is only slightly greater than 90°, for example.

As shown in FIG. 1, the planar portion 24 of the light-transmitting cover 20 of the liquid crystal display unit 100a is composed only of a slope portion; however, the shape of the planar portion is not limited thereto. The planar portion may include a slope portion and a flat portion which is provided outside the slope portion and whose viewer-side surface and rear surface are parallel, for example. For example, the planar portion may include: a slope portion which extends over to a boundary between a portion of the frame region 10F that is at the opposite side from the side where the curved surface portion 22 is located and the display region 10A; and a flat portion which is disposed above the portion of the frame region 10F that is at the opposite side from the side where the curved surface portion 22 is located. Even in a construction where the planar portion 24 includes a slope portion and a flat portion, the liquid crystal display unit can be made thin. The below-described liquid crystal display devices according to embodiments of the present invention will all be directed to the case where the planar portion of the light-transmitting cover is composed only of a slope portion.

The liquid crystal display unit 100a shown in FIG. 1 illustrates an example where the planar portion 24 adjoining the curved surface portion 22 is composed only of a slope portion; that is, the slope portion is provided so as to adjoin the curved surface portion 22. Since the slope portion is provided so as to adjoin the curved surface portion 22, the light-transmitting cover can be made thinner than in the case where a flat portion whose viewer-side surface and rear surface are parallel is provided between the curved surface portion 22 and the slope portion, for example.

The light-transmitting cover 20 can be formed through injection molding by using an acrylic resin, for example. According to principles, the thickness h1 of the edge portion of the planar portion 24 may be 0 mm; however, in the case where injection molding is used for the formation, for example, the thickness h1 is preferably about 0.3 mm or more, from the standpoint of productivity.

As mentioned above, the liquid crystal display panel 10 of the liquid crystal display unit 100a may be any known liquid crystal display panel, and may be a VA mode liquid crystal display panel of a TFT type, for example. As shown in FIG. 2, the liquid crystal display panel 10 includes an upper substrate 11 and a lower substrate 12, with a liquid crystal layer 13 being provided between the upper substrate 11 and the lower substrate 12. TFTs and pixel electrodes are provided on the lower substrate 12, for example; and a color filter layer and a counter electrode are provided on the upper substrate 11, for example. A sealing portion 16, a driving circuit, and the like are provided in the frame region 10F of the liquid crystal display panel 10.

Since an image that is displayed in the peripheral display region 10D is displayed in an enlarged size in a region consisting of the frame region 10F and the peripheral display region 10D via the curved surface portion 22, it is preferable that the image to be formed in the peripheral display region 10D is compressed as compared to the image which is displayed in the central display region 10B, i.e., the region of the display region 10A excluding the peripheral display region 10D. For example, a compressed image can be formed in the peripheral display region 10D by compressing a display signal which is supplied to the pixels that are arrayed in the peripheral display region 10D.

Since the transmission-type liquid crystal display panel 10 is used, the liquid crystal display unit 100a illustrated herein includes a backlight device 40. The backlight device 40 may be a backlight device called an edgelight type, for example, which is composed of LEDs, a light guide plate, and an optical sheet such as a diffuser or a prism sheet. As the liquid crystal display panel 10, a polymer-dispersed liquid crystal display panel or a reflection-type liquid crystal display panel may be used, for example. When a reflection-type liquid crystal display panel is used as the liquid crystal display panel 10, the backlight device 40 is not needed.

Moreover, in the liquid crystal display unit 100a, an optical film portion 62 is provided between the liquid crystal display panel 10 and the light-transmitting cover 20, the optical film portion 62 including a polarizer, a phase plate, or the like, for example. Note that the optical film portion 62 may be omitted.

Although a liquid crystal display unit is illustrated herein, it is also possible to obtain a display unit in which a display panel other than a liquid crystal display panel is used. For example, a display panel for a PDP, an organic EL display panel, an electrophoresis display panel, or the like may be used. In the case where a self-light-emitting type display panel such as an organic EL display panel is used, the backlight device is omitted.

Next, a liquid crystal display device (a liquid crystal display device 100B shown in FIG. 6) which is tiled with liquid crystal display units according to an embodiment of the present invention will be described.

Figure 6:
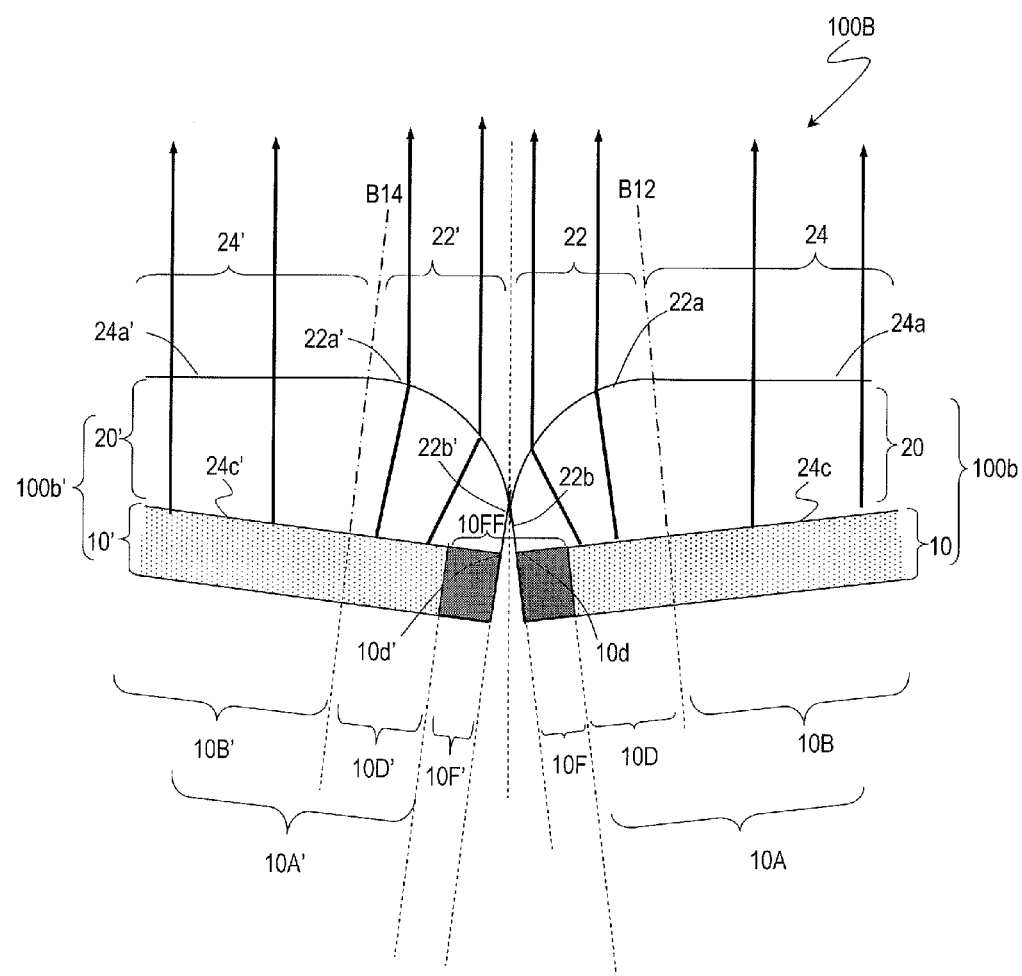
FIG. 6 A schematic cross-sectional view of a liquid crystal display device 100B according to an embodiment of the present invention.

FIG. 6 shows a schematic cross-sectional view of the liquid crystal display device 100B. As shown in FIG. 6, the liquid crystal display device 100B includes liquid crystal display units 100b and 100b'. The liquid crystal display device 100B is a liquid crystal display device which is tiled with two liquid crystal display units. Note that tiling may be achieved by known methods. The liquid crystal display unit 100b and the liquid crystal display unit 100b' have the same construction as that of the above-described liquid crystal display unit 100a (FIGS. 1 and 2).

The liquid crystal display unit 100b includes a liquid crystal display panel 10 and a light-transmitting cover 20 disposed on the viewer's side of the liquid crystal display panel 10. Similarly, the liquid crystal display unit 100b' includes a liquid crystal display panel 10' and a light-transmitting cover 20' disposed on the viewer's side of the liquid crystal display panel 10'. The light-transmitting cover 20 includes a planar portion 24 and a curved surface portion 22, whereas the light-transmitting cover 20' includes a planar portion 24' and a curved surface portion 22'. The liquid crystal display unit 100b and the liquid crystal display unit 100b' are disposed so that the curved surface portion 22 and the curved surface portion 22' adjoin each other along a first axis (horizontal direction).

The distance between the viewer-side surface 20a and the rear surface 20c of the light-transmitting cover 20 is largest at a boundary B12 between the curved surface portion 22 and the planar portion 24. The distance between the viewer-side surface 20a' and the rear surface 20c' of the light-transmitting cover 20' is largest at a boundary B14 between the curved surface portion 22' and the planar portion 24'. A viewer-side surface 24a of the planar portion 24 is a plane. The planar portion 24 has a slope portion such that the distance between the viewer-side surface 24a and the rear surface 24c decreases away from the curved surface portion 22 along the first axis. A viewer-side surface 22a of the curved surface portion 22 is a curved surface. Similarly, the light-transmitting cover 20' includes a planar portion 24' and a curved surface portion 22'. The planar portion 24' includes a slope portion such that the distance between the viewer-side surface 24a' and the rear surface 24c' decreases away from the curved surface portion 22' along the first axis. In the liquid crystal display units 100b and 100b', since the planar portions 24 and 24' include the slope portions, the light-transmitting covers 20 and 20' are thin, as in the liquid crystal display unit 100a (FIG. 1). Although the planar portions 24 and 24' of the liquid crystal display units 100b and 100b' are composed only of slope portions, they may also include portions other than the slope portions.

The liquid crystal display panel 10 includes a display region 10A in which a plurality of pixels are arrayed and a frame region 10F, whereas the liquid crystal display panel 10' includes a display region 10A' in which a plurality of pixels are arrayed and a frame region 10F'. Since no image is displayed in the frame region 10F and the frame region 10F', when one image is displayed over the liquid crystal display panels 10 and 10', a non-display region 10FF which is composed of the frame region 10F, the frame region 10F', and a portion between an edge 10d of the liquid crystal display panel 10 and an edge 10d' of the liquid crystal display panel 10' is visually recognized as a joint.

FIG. 6 schematically shows rays going out from the liquid crystal display panel 10 and entering the light-transmitting cover 20 and rays going out from the liquid crystal display panel 10' and entering the light-transmitting cover 20'. As shown in FIG. 6, according to similar principles to those of the liquid crystal display unit 100a, light entering the curved surface portion 22 is refracted at the viewer-side surface 22a of the curved surface portion 22, whereby the frame region 10F of the liquid crystal display unit 100b can be obscured. Similarly, the frame region 10F' of the liquid crystal display unit 100b' can be obscured. Moreover, as in the liquid crystal display unit 100a, by displaying an image over to the end of the curved surface portion 22, the image can be displayed also in the portion between the edge 10d of the liquid crystal display panel 10 and the edge 10d' of the liquid crystal display panel 10'. Therefore, the non-display region 10FF of the liquid crystal display device 100B can be obscured. Moreover, the light going out from the central display regions 10B and 10B' enters the planar portions 24 and 24', respectively, and travels in directions perpendicular to the viewer-side surface 24a of the planar portion 24 and the viewer-side surface 24a' of the planar portion 24'. Therefore, the liquid crystal display device 100B is able to display a jointless image on the entire screen.

Thus, by using the liquid crystal display units 100b and 100b' according to an embodiment of the present invention for tiling, the liquid crystal display device 100B, which has an obscured joint and which is thin, is obtained.

A side face 22b of the curved surface portion 22 of the light-transmitting cover 20 and a side face 22b' of the curved surface portion 22' of the light-transmitting cover 20' of the liquid crystal display device 100B are not in contact. However, as in a liquid crystal display device 100C shown in FIG. 7, a side face 26b of the curved surface portion 26 of the light-transmitting cover 20 and a side face 26b' of the curved surface portion 26' of the light-transmitting cover 20' may be in contact. In this case, an angle α constituted by the side face 26b and a rear surface 26c of the curved surface portion 26 of the light-transmitting cover 20 and an angle α' constituted by the side face 26b' and a rear surface 26c' of the curved surface portion 26' of the light-transmitting cover 20' are less than 90°. As will be described below, since the liquid crystal display device 100C can have a narrower non-display region 10FF than that of the liquid crystal display device 100B, the light-transmitting covers 20 and 20' can be made even thinner.

Figure 7:
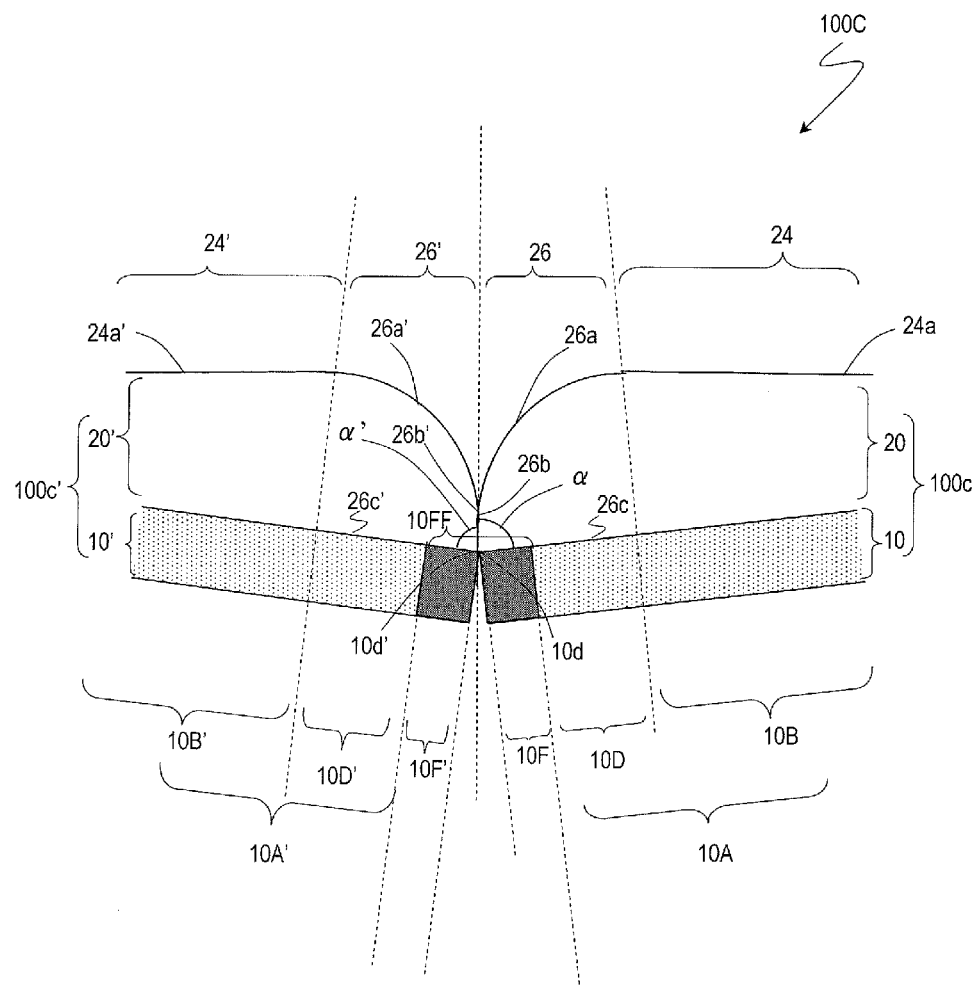
FIG. 7 A schematic cross-sectional view of a liquid crystal display device 100C according to an embodiment of the present invention.

As shown in FIG. 7, since the side face 26b of the curved surface portion 26 and the side face 26b' of the curved surface portion 26' are in contact, the liquid crystal display panel 10 and the liquid crystal display panel 10' can be disposed so that the edge 10d of the liquid crystal display panel 10 abuts with the edge 10d' of the liquid crystal display panel 10'. As a result, as compared to the liquid crystal display device 100B (FIG. 6) in which the edge 10d of the liquid crystal display panel 10 and the edge 10d' of the liquid crystal display panel 10' are apart, the non-display region 10FF can be narrowed. As described above, there is a need to increase the radius of curvature of the curved surface portion needs as the non-display region increases in width. However, in the liquid crystal display device 100C, the non-display region 10FF can be made smaller than in the liquid crystal display device 100B, so that the radius of curvature of the curved surface portion 26 can be made small. Therefore, in the liquid crystal display device 100C, the overall thickness of the light-transmitting cover 20 can be made smaller than in the liquid crystal display device 100B. In the liquid crystal display device 100B, in order to obscure the non-display region 10FF, the thickness of the curved surface portion 22 needs to be three or more times as large as the width of the frame region 10F; however, in the liquid crystal display device 100C, the thickness of the curved surface portion 26 may be less than three times as large as the width of the frame region 10F, for example. Liquid crystal display devices 100E (FIGS. 12 to 14) and so on according to other embodiments of the present invention described later will be illustrated as having a construction in which the side face 26b of the curved surface portion 26 and the side face 26b' of the curved surface portion 26' are in contact, such that the edge of the frame region 10F abuts with the edge of the frame region 10F'; however, even without such a construction, the liquid crystal display device can be made thin and light-weighted because of a slope portion being included in the planar portion.

Figure 9:
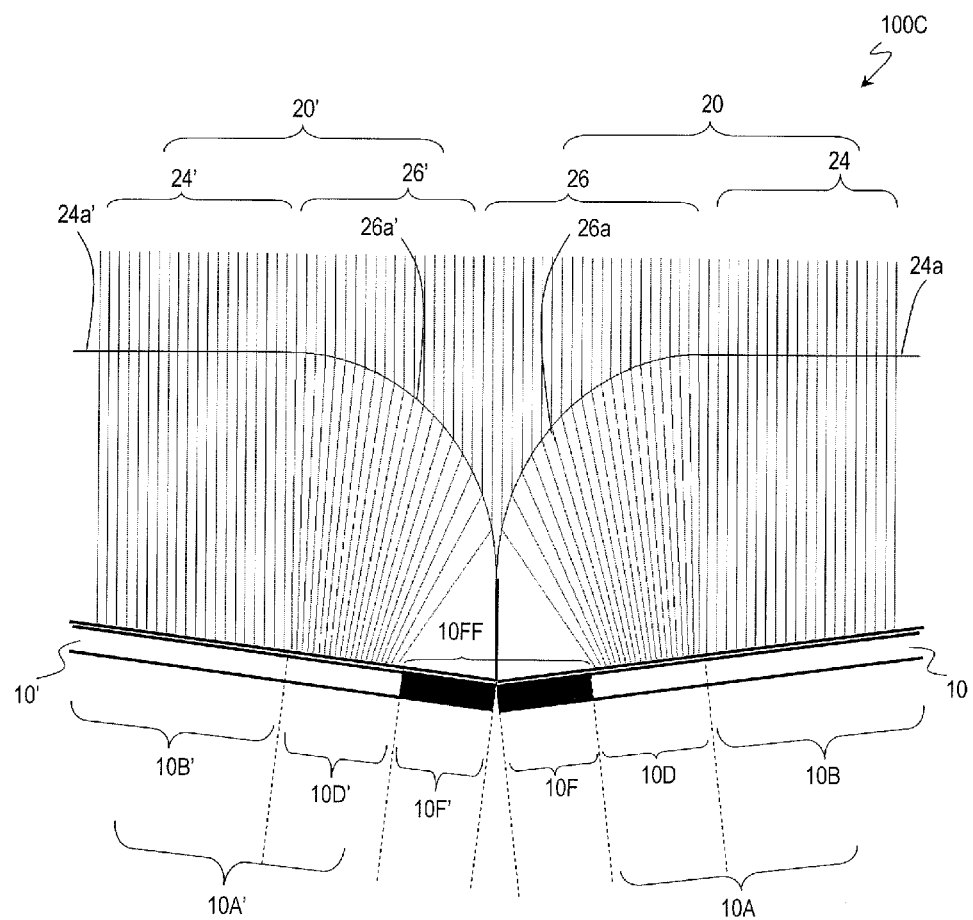
FIG. 9 A diagram showing results of a ray-tracing simulation for the liquid crystal display device 100C.
Figure 10:
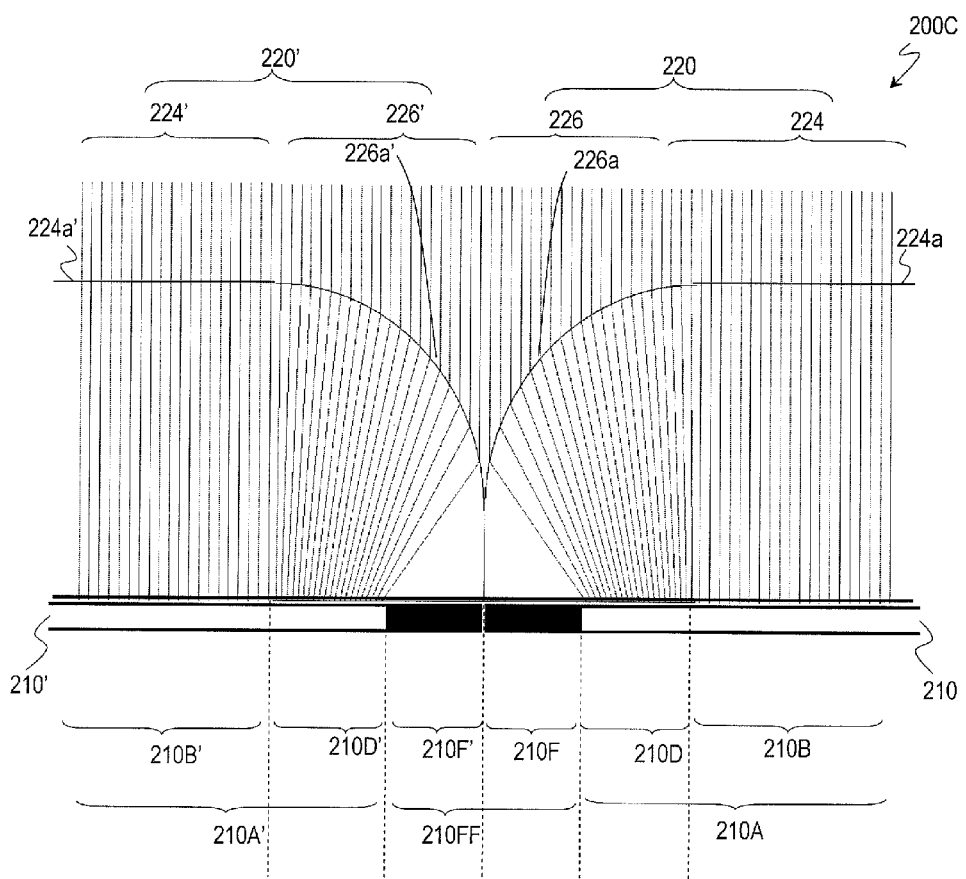
FIG. 10 A diagram showing results of a ray-tracing simulation for the liquid crystal display device 200C of Comparative Example.

Next, ray-tracing simulation results of the liquid crystal display device 100C will be indicated, and its ability to display a jointless image similarly to a liquid crystal display device 200C of Comparative Example will be described. FIG. 9 and FIG. 10 show ray-tracing simulation results of the liquid crystal display device 100C and the liquid crystal display device 200C, respectively.

Figure 8:
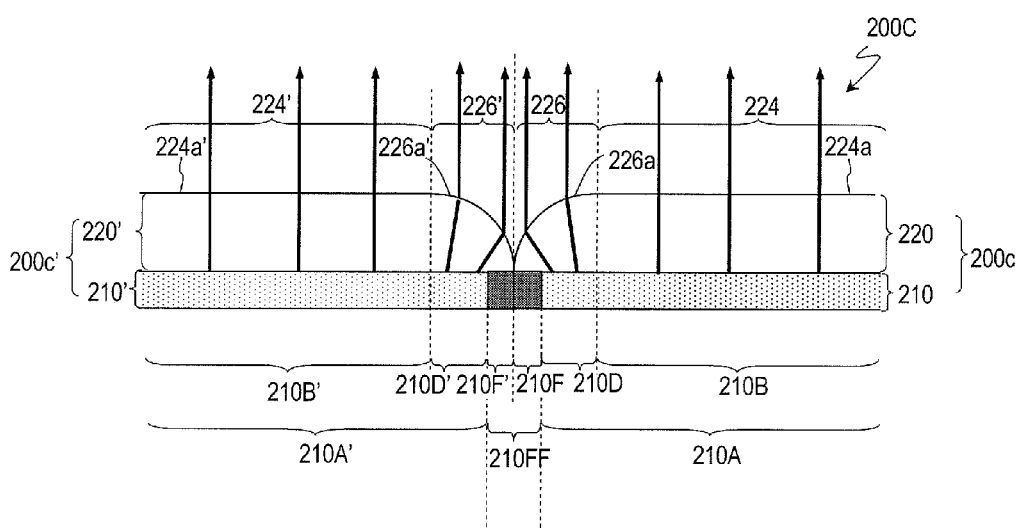
FIG. 8 A schematic cross-sectional view of a liquid crystal display device 200C of Comparative Example.

As shown in FIG. 8, the liquid crystal display device 200C of Comparative Example includes a liquid crystal display unit 200b and a liquid crystal display unit 200b', which have the same construction as that the liquid crystal display unit 200a. FIG. 8 schematically shows rays entering the light-transmitting covers 220 and 220' from the liquid crystal display panels 210 and 210' and going out toward the viewer's side. As shown in FIG. 8, light going out from the peripheral display region 210D of the liquid crystal display panel 210 enters the curved surface portion 226, and is refracted at the viewer-side surface 226a of the curved surface portion 226, so as to travel in a direction perpendicular to the display plane of the liquid crystal display panel 210. Similarly, light going out from a peripheral display region 210D' of the liquid crystal display panel 210' is refracted at a viewer-side surface 226a' of a curved surface portion 226' so as to travel in a direction perpendicular to the display plane of the liquid crystal display panel 210'. Light going out from central display regions 210B and 210B' respectively enters planar portions 224 and 224', and travels in directions perpendicular to the display planes of the liquid crystal display panel 210 and the liquid crystal display panel 210'. As can be seen from the ray-tracing simulation results shown in FIG. 10, via the mechanism which has been schematically described with reference to FIG. 8, light going out from the peripheral display regions 210D and 210D' goes out through the entire viewer-side surfaces 226a and 226a' of the curved surface portions 226 and 226', and light going out from the central display regions 210A and 210A' goes out through viewer-side surfaces 224a and 224a' of the planar portions 224 and 224'. Therefore, since light goes out through the viewer's side of the planar portions 224 and 224' and the curved surface portions 226 and 226', the liquid crystal display device 200C is able to display a jointless image across the entire screen.

As shown in FIG. 9, in the liquid crystal display device 100C according to an embodiment of the present invention, light going out from a peripheral display region 10D of the liquid crystal display panel 10 enters a curved surface portion 26, and is refracted at a viewer-side surface 26a of the curved surface portion 26, so as to travel in a direction perpendicular to a viewer-side surface 24a of the planar portion 24. Similarly, light going out from a peripheral display region 10D' of the liquid crystal display panel 10' is refracted at a viewer-side surface 26a' of the curved surface portion 26', so as to travel in a direction perpendicular to a viewer-side surface 24a' of the planar portion 24'. Light going out from the central display regions 10B and 10B' respectively enters the planar portions 24 and 24', and travels in directions perpendicular to the viewer-side surface 24a of the planar portion 24 and the viewer-side surface 24a' of the planar portion 24'. Therefore, similarly to the liquid crystal display device 200C of Comparative Example, the liquid crystal display device 100C is able to display a jointless image.

Thus, while maintaining a similar level of optical effects as that of the liquid crystal display device 200C of Comparative Example, the liquid crystal display device 100C can be made thinner.

Next, a liquid crystal display device (a liquid crystal display device 100D shown in FIG. 11) according to another embodiment of the present invention will be described.

Figure 11:
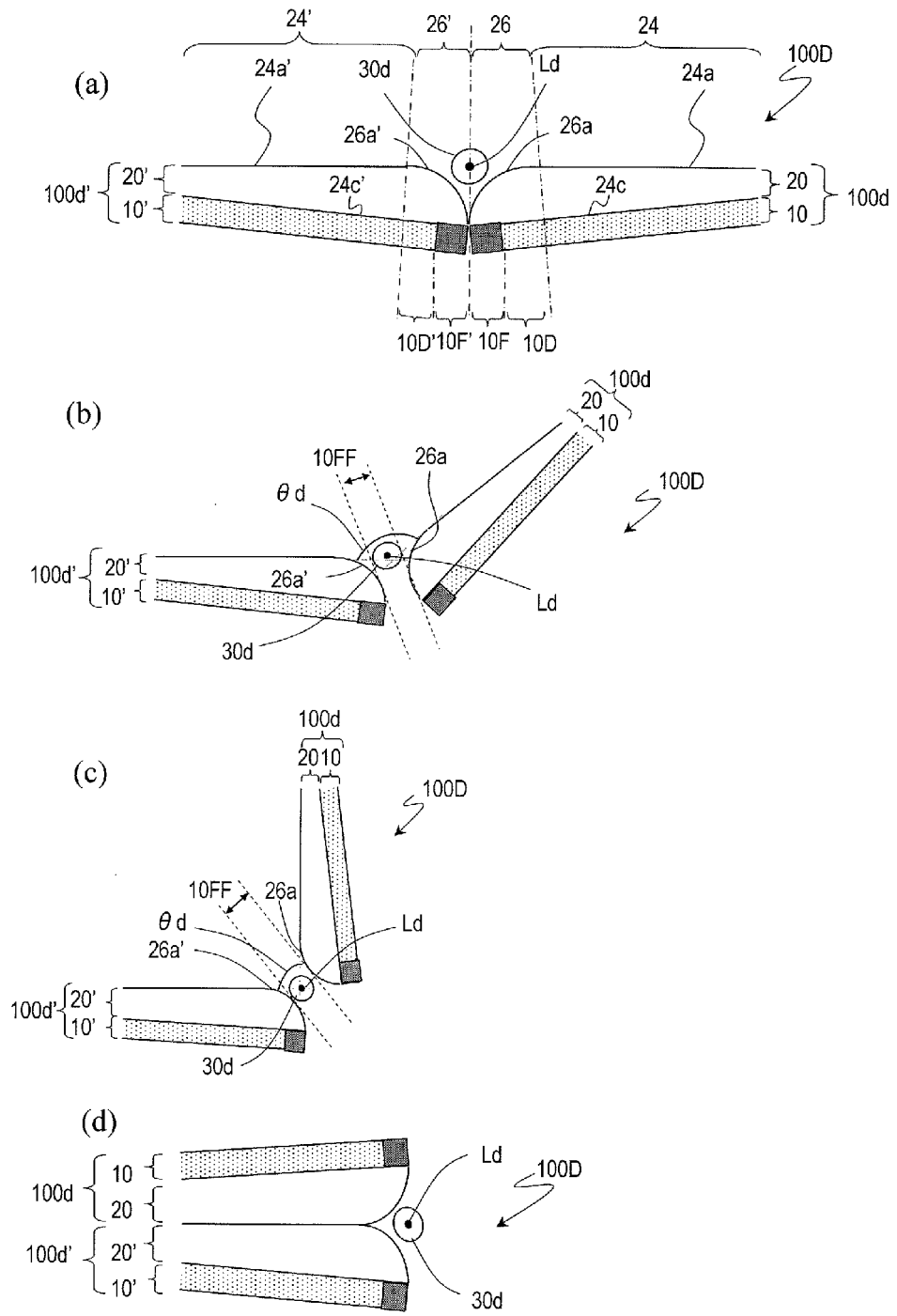
FIGS. 11 (a), (b), (c), and (d) are schematic cross-sectional views of a liquid crystal display device 100D at open angles of 180°, 135°, 90°, and 0°, respectively.

The liquid crystal display device 100D shown in FIG. 11 is a foldable liquid crystal display device. As shown in FIG. 11, the liquid crystal display device 100D includes a liquid crystal display unit 100d, a liquid crystal display unit 100d', and a hinge device 30d.

The hinge device 30d is a uniaxial hinge device having a single hinge shaft, and the liquid crystal display units 100d and 100d' are each capable of rotating around a rotation axis Ld which is defined by the hinge shaft. The liquid crystal display units 100d and 100d' are linked to each other by the hinge device 30d.

FIGS. 11(a), (b), (c), and (d) are schematic cross-sectional views of the liquid crystal display device 100D at open angles θd of 180°, 135°, 90°, and 0°, respectively. As shown in FIGS. 11(b) and (c), the open angle θd is an angle constituted by an extended plane of a viewer-side surface 24a of a planar portion 24 of a light-transmitting cover 20 and an extended plane of a viewer-side surface 24a' of a planar portion 24'; herein, 0°≤θd≤180°. As shown in FIGS. 11(a), (b), (c), and (d), the liquid crystal display device 100D may take an open state (open angle θd=180°), a closed state (θd=0°), and intermediate states therebetween (0°<θd<180°.

The liquid crystal display unit 100d and the unit 100d' have the same construction as that of the liquid crystal display units 100c and 100c' of the liquid crystal display device 100C (FIG. 7). The liquid crystal display units 100d and 100d' are able to cause an image which is formed in the peripheral display regions 10D and 10D' to be displayed on the viewer's side of the curved surface portions 26 and 26'. Similarly to the liquid crystal display device 100C shown in FIG. 7, the liquid crystal display device 100D is able to display a jointless image when the open angle θd is 180° (FIG. 11(a)), because an image displayed in the peripheral display regions 10D and 10D' is displayed on the viewer's side of the curved surface portions 26 and 26'.

Moreover, the planar portion 24 of the light-transmitting cover 20 of the liquid crystal display unit 100d includes a slope portion such that the distance between the viewer-side surface 24a and the rear surface 24c decreases away from the curved surface portion 26 along the first axis. Similarly, the planar portion 24' of the light-transmitting cover 20' of the liquid crystal display unit 100d' includes a slope portion such that the distance between the viewer-side surface 24a' and the rear surface 24c' decreases away from the curved surface portion 26' along the first axis. Therefore, the liquid crystal display units 100d and 100d' are thin as compared to the case where the planar portion of the light-transmitting cover does not include a slope portion and the viewer-side surface and the rear surface are parallel. Therefore, the liquid crystal display device 100D has excellent portability because of being thin even in a folded state.

Next, a liquid crystal display device according to still another embodiment of the present invention (a liquid crystal display device 100E shown in FIGS. 12 to 14) will be described. The liquid crystal display device 100E shown in FIG. 12 is a foldable liquid crystal display device, and differs from the liquid crystal display device 100D (FIG. 11) with respect to the hinge device structure.

Figure 12:
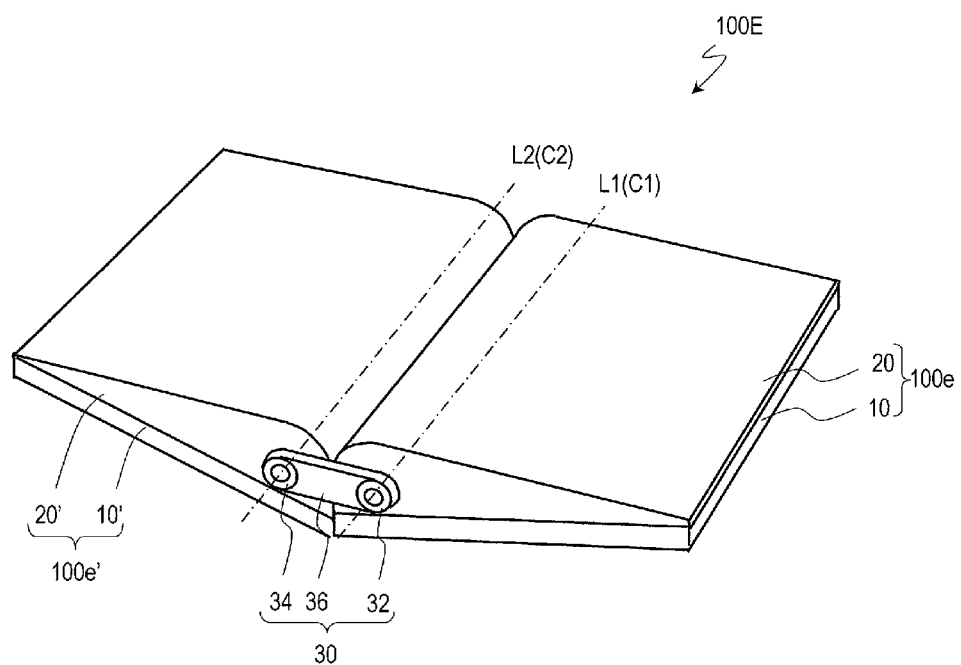
FIG. 12 A schematic perspective view of a liquid crystal display device 100E according to an embodiment of the present invention.

FIG. 12 shows a schematic perspective view of the liquid crystal display device 100E. FIG. 13(a) shows a schematic plan view of the liquid crystal display device 100E, and FIG. 13(b) shows a schematic cross-sectional view of the liquid crystal display device 100E along line 13B-13B' in FIG. 13(a).

As shown in FIG. 12, the liquid crystal display device 100E includes a liquid crystal display unit 100e, a liquid crystal display unit 100e', and biaxial hinge devices 30. As shown in FIG. 13(a), the liquid crystal display device 100E includes two biaxial hinge devices 30 which are provided so as to oppose each other via the liquid crystal display units 100e and 100e'. Since the liquid crystal display device 100E has the biaxial hinge devices 30, the width of the non-display region can be reduced relative to the liquid crystal display device 100D (FIG. 11), as will be described later.

The liquid crystal display units 100e and 100e' have the same construction as that of the liquid crystal display units 100c and 100c' of the liquid crystal display device 100C (FIG. 7). The liquid crystal display unit 100e includes a liquid crystal display panel 10 and a light-transmitting cover 20 disposed on the viewer's side of the liquid crystal display panel 10. Similarly, the liquid crystal display unit 100e' includes a liquid crystal display panel 10' and a light-transmitting cover 20' disposed on the viewer's side of the liquid crystal display panel 10'.

Each biaxial hinge device 30 has a first hinge shaft 32, a second hinge shaft 34, and a linkage member 36 linking the first hinge shaft 32 and the second hinge shaft 34. The first hinge shaft 32 and the second hinge shaft 34 are disposed parallel to each other. The first hinge shaft 32 is affixed to the light-transmitting cover 20, whereas the second hinge shaft 34 is affixed to the light-transmitting cover 20'. The liquid crystal display unit 100e is capable of rotating around a first rotation axis L1 which is defined by the first hinge shafts 32, whereas the liquid crystal display unit 100e' is capable of rotating around a second rotation axis L2 which is defined by the second hinge shafts 34. Each biaxial hinge device 30 links together the liquid crystal display unit 100e and the liquid crystal display unit 100e', via the linkage member 36.

As shown in FIG. 13(b), the light-transmitting cover 20 of the liquid crystal display unit 100e includes a planar portion 24 and a curved surface portion 26 provided at its edge portion closer to the liquid crystal display unit 100e'. Similarly, the light-transmitting cover 20' of the liquid crystal display unit 100e' includes a planar portion 24' and a curved surface portion 26' provided at its edge portion closer to the liquid crystal display unit 100e. The viewer-side surface 24a of the planar portion 24 and the viewer-side surface 24a' of the planar portion 24' are planes. As shown in FIG. 13(b), cross-sectional shapes of the viewer-side surface 26a of the curved surface portion 26 and the viewer-side surface 26a' of the curved surface portion 26' are each an arc with a central angle of 90°. In other words, the viewer-side surface 26a of the curved surface portion 26 and the viewer-side surface 26a' of the curved surface portion 26' each constitute a part of a cylindrical surface (the side face of a cylinder).

The light-transmitting cover 20 is disposed so that the first center axis C1 of the cylindrical surface of the viewer-side surface 26a of the curved surface portion 26 coincides with the first rotation axis L1 of the biaxial hinge devices 30, whereas the light-transmitting cover 20' is disposed so that the second center axis C2 of the cylindrical surface of the viewer-side surface 26a of the curved surface portion 26' coincides with the second rotation axis L2 of the biaxial hinge devices 30. In other words, each hinge device 30 is affixed to the liquid crystal display units 100e and 100e' so that the first rotation axis L1 of each biaxial hinge device 30 coincides with the first center axis C1 of the curved surface portion 26a of the light-transmitting cover 20 and that the second rotation axis L2 coincides with the second center axis C2 of the curved surface portion 26a' of the light-transmitting cover 20'.

Note that, as shown in FIG. 13(a), the first hinge shaft 32 and the second hinge shaft 34 are partly located within the light-transmitting covers 20 and 20', and therefore the first hinge shaft 32 and the second hinge shaft 34 will be visually recognized by the viewer. Therefore, in order to prevent degradation in appearance, the first hinge shaft 32 and the second hinge shaft 34 may be hidden from over the light-transmitting covers 20 and 20' via printing or the like, for example. Alternatively, as in a liquid crystal display device 100J described later (FIGS. 20 to 21), non-light-transmitting housings 80 and 80' may be provided on side faces of the light-transmitting covers 20 and 20', and the first hinge shaft 32 and the second hinge shaft 34 may be partly located within the housings 80 and 80'.

As shown in FIG. 13(b), the liquid crystal display panel 10 includes a display region 10A in which a plurality of pixels are arrayed and a frame region 10F provided outside the display region 10A; similarly, the liquid crystal display panel 10' includes a display region 10A' and a frame region 10F'. Since no image is displayed in the frame regions 10F and 10F', when one image is displayed on the liquid crystal display panels 10 and 10', a non-display region 10FF composed of the frame regions 10F and 10F' would be visually recognized as a joint if the light-transmitting covers 20 and 20' did not exist.

FIG. 13(b) schematically shows rays going out from the liquid crystal display panels 10 and 10' and entering the light-transmitting covers 20 and 20'. As shown in FIG. 13(b), light going out from the peripheral display regions 10D and 10D' and entering the curved surface portions 26 and 26' is refracted at the viewer-side surfaces 26a and 26a' of the curved surface portions 26 and 26' and travels in directions perpendicular to the viewer-side surfaces 24a and 24a' of the planar portions 24 and 24'. Therefore, since an image which is formed in the peripheral display region 10D, 10D' is displayed on the viewer's side of a region consisting of the peripheral display region 10D, 10D' and the frame region 10F, 10F', the liquid crystal display device 100E is able to display a jointless image, similarly to the liquid crystal display device 100C (FIG. 7).

In the liquid crystal display device 100E, since the curved surface portion 26 of the light-transmitting cover 20 and the curved surface portion 26' of the light-transmitting cover 20' are linked by the biaxial hinge devices 30 so as to oppose each other as described above, the width of the non-display region 10FF, which would become a joint in the image, can be reduced not only in an open state (open angle θ1=180° (FIG. 13(b))) but also in intermediate states (0°<θ1<180°) between an open state and a closed state.

With reference to FIGS. 14(a) to (d), an open-close operation of the liquid crystal display panels 10 and 10' in the liquid crystal display device 100E will be described.

In the liquid crystal display device 100E, the liquid crystal display panels 10 and 10' are opened or closed as part of the liquid crystal display units 100e and 100e' respectively including the light-transmitting covers 20 and 20'. The liquid crystal display unit 100e is capable of rotating around the first rotation axis L1 which is defined by the first hinge shaft 32, whereas the liquid crystal display unit 100e' is capable of rotating around the second rotation axis L2 which is defined by the second hinge shaft 34. The liquid crystal display units 100e and 100e' are capable of taking an open state (open angle θ1=180°), a closed state (θ1=0°), and intermediate states therebetween (0°<θ1<180°).

FIGS. 14(a), (b), (c), and (d) show schematic cross-sectional views of the liquid crystal display device 100E when the open angle θ1 between the liquid crystal display units 100e and 100e' is 180°, 135°, 90°, and 0°. As shown in FIGS. 14(b) and (c), the open angle θ1 is an angle constituted by an extended plane of the viewer-side surface 24a of the planar portion 24 of the light-transmitting cover 20 and an extended plane of the viewer-side surface 24a' of the planar portion 24' of the light-transmitting cover 20'; herein, 0°≤θ1≤180°.

The liquid crystal display unit 100e rotates around the first rotation axis L1 which is defined by the first hinge shaft 32, whereas the liquid crystal display unit 100e' rotates around the second rotation axis L2 which is defined by the second hinge shaft 34. The viewer-side surface 26a of the curved surface portion 26 is a part of a cylindrical surface having its center axis C1 at the first rotation axis L1, whereas the viewer-side surface 26a' of the curved surface portion 26' is a part of a cylindrical surface having its center axis C2 at the second rotation axis L2. These two cylindrical surfaces have the same radius (designated "$r_0$"); the distance between the first rotation axis L1 (center axis C1) and the second rotation axis L2 (center axis C2) is $2r_0$; and the viewer-side surfaces 26a and 26a' are in contact with each other. It will be appreciated that the distance between the first rotation axis L1 and the second rotation axis L2 does not change even if the liquid crystal display unit 100e rotates around the first rotation axis L1 or if the liquid crystal display unit 100e' rotates around the second rotation axis L2. Therefore, as illustrated by the cases where the open angle θ1=135° and 90° shown in FIGS. 14(b) and (c), the viewer-side surface 26a of the curved surface portion 26 and the viewer-side surface 26a' of the curved surface portion 26' are opened or closed while being in contact with each other.

Although the liquid crystal display units 100e and 100e' are capable of independently rotating around the rotation axes L1 and L2, respectively, it is preferable that the liquid crystal display unit 100e and the liquid crystal display unit 100e' rotate equally, as shown in FIGS. 14(b) and (c). A case will be discussed where, as illustrated in FIGS. 14(b) and (c), the liquid crystal display unit 100e is rotated while the liquid crystal display unit 100e' stays in place.

As shown in FIG. 14(b), when the liquid crystal display unit 100e is rotated counterclockwise by 45°, the open angle θ1 is 135°. At this time, line segments connecting the first hinge shaft 32 and the second hinge shaft 34 (which coincide with the first rotation axis L1 and the second rotation axis L2 in the figure) of each biaxial hinge device 30 constitute an angle of 22.5° with respect to the horizon. In other words, the liquid crystal display unit 100e has rotated counterclockwise by 22.5° around the first rotation axis L1, and the liquid crystal display unit 100e' has rotated clockwise by 22.5° around the second rotation axis L2.

The same is also true of the case shown in FIG. 14(c). When the liquid crystal display unit 100e is rotated counterclockwise by 90°, the open angle θ1 is 90°. At this time, line segments connecting the first hinge shaft 32 and the second hinge shaft 34 (which coincide with the first rotation axis L1 and the second rotation axis L2 in the figure) of each biaxial hinge devices 30 constitute an angle of 45° with respect to the horizon. In other words, the liquid crystal display unit 100e has rotated counterclockwise by 45° around the first rotation axis L1, and the liquid crystal display unit 100e' has rotated clockwise by 45° around the second rotation axis L2.

Thus, the viewer-side surface 26a of the curved surface portion 26 and the viewer-side surface 26a' of the curved surface portion 26' are in contact, and the liquid crystal display unit 100e and the liquid crystal display unit 100e' are opened or closed so that the angle by which liquid crystal display unit 100e rotates around the first rotation axis L1 and the angle by which the liquid crystal display unit 100e' rotates around the second rotation axis L2 are equal. In other words, the biaxial hinge devices 30 link the liquid crystal display unit 100e and the liquid crystal display unit 100e' in such a manner that, when the liquid crystal display unit 100e and the liquid crystal display unit 100e' are opened or closed, the viewer-side surface 26a of the curved surface portion 26 and the viewer-side surface 26a' of the curved surface portion 26' are in contact, and the following relationship is satisfied: the angle which a plane containing the first rotation axis L1 and the second rotation axis L2 constitutes with the viewer-side surface 24a of the planar portion 24 and the angle which a plane containing the first rotation axis L1 and the second rotation axis L2 constitutes with the viewer-side surface 24a' of the planar portion 24' are equal.

When the liquid crystal display units 100e and 100e' are opened or closed so that the above relationship is maintained, in any arbitrary intermediate state, the proportions which the frame regions 10F and 10F' account for in the non-display region 10FF will be equal to a viewer who is looking in a direction bisecting the open angle θ1, whereby the oddness felt by the viewer can be reduced.

Hereinafter, it will be explained that, in the liquid crystal display device 100E, the width of the non-display region 10FF, which would become a joint in the image, can be reduced even in intermediate states (0°<θ1<180°) between an open state and a closed state.

As described above, the liquid crystal display device 100E is able to display an image on the viewer's side of the viewer-side surfaces 26a and 26a' of the curved surface portions 26 and 26'. Therefore, when the open angle θ1=135° (FIG. 14(b)), for example, since the viewer-side surface 26a of the curved surface portion 26 and the viewer-side surface 26a' of the curved surface portion 26' are in contact, a jointless image can be displayed on the entire viewer's side of the liquid crystal display device 100E, including the portion at which the viewer-side surface 26a and the viewer-side surface 26a' are in contact. Similarly, when the open angle θ1=90° (FIG. 14(c)), the liquid crystal display device 100E is able to display a jointless image on the entire viewer's side of the liquid crystal display device 100E, including the portion at which the viewer-side surface 26a and the viewer-side surface 26a' are in contact. Even when the θ1 is neither 90° nor 135°, the viewer-side surface 26a of the curved surface portion 26 and the viewer-side surface 26a' of the curved surface portion 26' are in contact in any intermediate state (0°<θ1<180°). Therefore, the liquid crystal display device 100E is able to display a jointless image on the entire viewer's side by displaying an image on the viewer's side of the viewer-side surfaces 26a and 26a' of the curved surface portions 26 and 26' in intermediate states (0°<θ1<180°).

The liquid crystal display device 100D (FIG. 11) is able to display a jointless image when the open angle is 180° (FIG. 11(a)), but cannot display a jointless image in intermediate states (0°<θd<180°). For example, when the open angle θd is 135°, as shown in FIG. 11(b), the viewer-side surface 26a of the curved surface portion 26 and the viewer-side surface 26a' of the curved surface portion 26' become parted. Therefore, even when an image is displayed on the curved surface portions 26 and 26', the interspace between the viewer-side surface 26a of the curved surface portion 26 and the viewer-side surface 26a' of the curved surface portion 26' is visually recognized as the non-display region 10FF. Similarly, when the open angle is 90° (FIG. 11(c)), the interspace between the viewer-side surface 26a of the curved surface portion 26 and the viewer-side surface 26a' of the curved surface portion 26' is visually recognized as the non-display region 10FF.

On the other hand, as described above, the liquid crystal display device 100E provides an advantage of being able to display a jointless image not only in an opened state but also in intermediate states (0°<θ1<180°), because the liquid crystal display units 100e and 100e' are opened or closed while the viewer-side surface 26a of the curved surface portion 26 and the viewer-side surface 26a' of the curved surface portion 26' are in contact.

Note that the liquid crystal display device 100D (FIG. 11) is structured so that, when the open angle θd is 180° (FIG. 11(a)), the hinge device 30d protrudes from the outermost surface of the light-transmitting covers 20 and 20' and thus the entire display plane does not present a flat shape. On the other hand, the liquid crystal display device 100E (FIG. 14) maintains a flat shape when the open angle θ1 is 180° (FIG. 14(a)), without the biaxial hinge devices 30 protruding. In mobile phones, personal digital assistants, and the like of the recent years, there is a tendency to favor designs featuring a flat display plane, and the structure of the liquid crystal display device 100E is also advantageous from this standpoint.

In the liquid crystal display device 100E illustrated herein, the viewer-side surface 26a of the curved surface portion 26 and the viewer-side surface 26a' of the curved surface portion 26' are each a part of a cylindrical surface having the same radius $r_0$; however, the viewer-side surface 26a and the viewer-side surface 26a' may be parts of cylindrical surfaces of mutually different radii. Moreover, the non-display region 10FF can be made small without the liquid crystal display unit 100e and the liquid crystal display unit 100e' being constructed so as to rotate by the same angle respectively around the first rotation axis L1 and the second rotation axis L2 when opened or closed. However, the construction of the liquid crystal display device 100E, where the liquid crystal display unit 100e and the liquid crystal display unit 100e' rotate by the same angle in mutually different directions when opened or closed, provides an advantage in that the proportions which the frame regions 10F and 10F' account for in the non-display region 10FF will be equal to a viewer looking in a direction bisecting the open angle θ1 in any arbitrary intermediate state, as describe above, thus reducing the oddness felt by the viewer.

Moreover, opening or closing does not need to occur while the viewer-side surface 26a and the viewer-side surface 26a' are in contact. For example, in the case where abrasion or scratching might be induced by opening or closing while the viewer-side surface 26a and the viewer-side surface 26a' are in contact, a construction may be adopted such that opening or closing occurs while an interspace exists between the viewer-side surface 26a and the viewer-side surface 26a'. With a view to preventing abrasion or scratching of the viewer-side surface 26a and the viewer-side surface 26a', hardcoating may be provided on the viewer-side surface 26a and the viewer-side surface 26a'.

The above description illustrates the liquid crystal display device 100E with the light-transmitting covers 20 and 20', which is able to display an image all the way to the end of the curved surface portions 26 and 26', as an example. However, depending on the width of the frame regions 10F and 10F', the thickness of the light-transmitting covers 20 and 20', and the radius of curvature of the curved surface portions 26 and 26', joints may become visible at some open angles θ1 in intermediate states (0°<θ1<180°). However, as compared to the liquid crystal display device 100D (FIG. 11), given the same width of the frame regions 10F and 10F', same thickness of the light-transmitting covers 20 and 20', and same radius of curvature of the curved surface portions 26 and 26', the liquid crystal display device 100E will offer a broader range of open angles θ1 at which the joint can be eliminated, or if at all, the joint will be visible in only a small joint width.

FIG. 15(a) shows a schematic cross-sectional view of the liquid crystal display device 100E in a closed state. FIG. 15(b) shows a schematic cross-sectional view of a liquid crystal display device 200E of Comparative Example in a closed state, which includes liquid crystal display units 200e and 200e' having light-transmitting covers 220 and 220', such that the viewer-side surface and the rear surface of the planar portion are parallel, and biaxial hinge devices 230. The viewer-side surface of the curved surface portions 226 and 226' of the light-transmitting covers 220 and 220' of the liquid crystal display device 200E have the same radius of curvature as the radius of curvature of the viewer-side surface of the curved surface portions 26 and 26' of the liquid crystal display device 100E. As will be clear from a comparison between FIGS. 15(a) and (b), in a closed state, a thickness H12 of the liquid crystal display device 100E at the curved surface portions 26 and 26' and a thickness H22 of the liquid crystal display device 200E at the curved surface portions 226 and 226' are about the same. On the other hand, a thickness H14 of the liquid crystal display device 100E at the opposite side from the side where the curved surface portions 26 and 26' are located is smaller than a thickness H24 of the liquid crystal display device 200E at the opposite side from the side where the curved surface portions 226 and 226' are located. When provided with light-transmitting covers on the viewer's side of display panels, a foldable display device will become thick particularly in a folded state. However, as described above, the liquid crystal display device 100E has excellent portability because of being thin even in a closed state.

As shown in FIG. 16(a), when batteries and circuit boards are to be provided at the back of the liquid crystal display panels 10 and 10' of a foldable liquid crystal display device 100F including light-transmitting covers with planar portions having a wedge cross-sectional shape similarly to the liquid crystal display device 100E (FIGS. 12 to 14), regions 90 and 90' in which to accommodate the batteries and circuit boards may have a wedge cross-sectional shape that becomes thicker away from the curved surface portions 26 and 26', so that the overall display device in a closed state has an invariable thickness. As shown in FIG. 16(b), when batteries and circuit boards are to be provided at the back of liquid crystal display panels 210 and 210' of a liquid crystal display device 200F of Comparative Example, whose light-transmitting covers 220 and 220' are such that the viewer-side surface and the rear surface of the planar portion are parallel, regions 290 and 290' in which to accommodate batteries and circuit boards must have a rectangular cross-sectional shape in order to attain an invariable thickness as a whole, which increases the overall thickness. The liquid crystal display device 100F can be thinner and lighter-weighted than the liquid crystal display device 200F of Comparative Example. Also in a foldable liquid crystal display device according to another embodiment of the present invention (liquid crystal display device 100D (FIG. 11), a liquid crystal display device 100G described below (FIG. 17), and so on, when batteries and circuit boards are to be provided at the back of the liquid crystal display panels 10 and 10', a wedge cross-sectional shape which becomes thicker away from the curved surface portions 26 and 26' may be conferred to the regions 90 and 90' in which to accommodate the batteries and circuit boards, as in the liquid crystal display device 100F.

Next, with reference to FIG. 17, a liquid crystal display device 100G according to another embodiment will be described.

Figure 17:
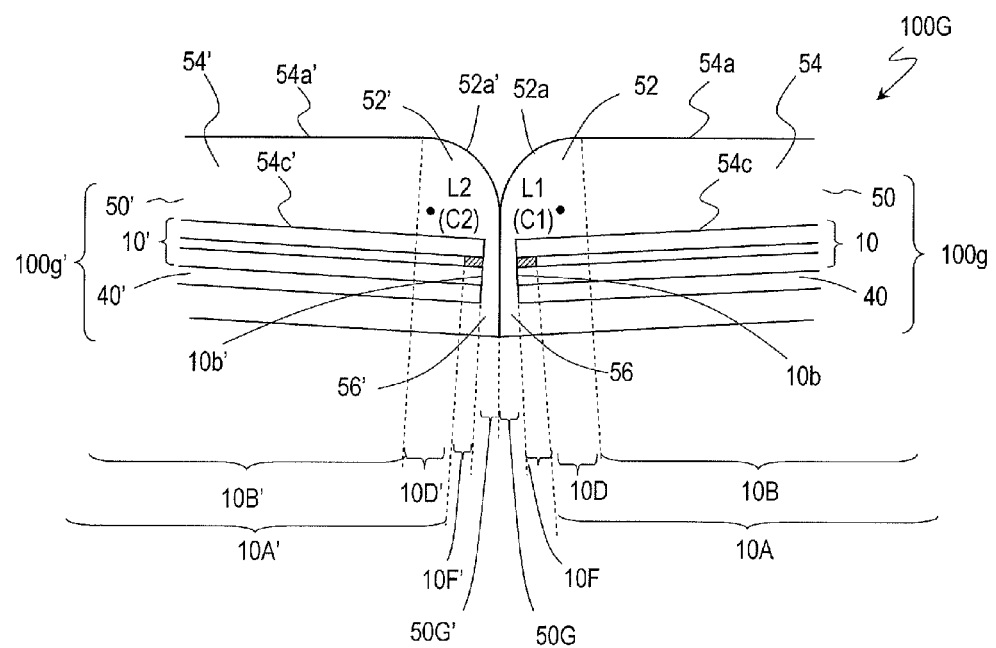
FIG. 17 A schematic cross-sectional view of a liquid crystal display device 100G.

As shown in FIG. 17, the liquid crystal display device 100G, which is a foldable liquid crystal display device, includes a liquid crystal display unit 100g, a liquid crystal display unit 100g', and biaxial hinge devices (not shown). The liquid crystal display unit 100g includes a liquid crystal display panel 10, a housing 50, and a backlight device 40. The liquid crystal display unit 100g' includes a liquid crystal display panel 10', a housing 50', and a backlight device 40'. Similarly to the liquid crystal display device 100E (FIGS. 12 to 14), the liquid crystal display unit 100g and the liquid crystal display unit 100g' of the liquid crystal display device 100G are linked to each other by the biaxial hinge devices so as to be capable of rotating around a first rotation axis L1 and a second rotation axis L2, respectively. A difference from the liquid crystal display device 100E is that the liquid crystal display units 100g and 100g' of the liquid crystal display device 100G include light-transmitting housings 50 and 50', instead of the light-transmitting covers 20 and 20'. Although the housings 50 and 50' have curved surface portions 52 and 52' which refract light going out from peripheral display regions 10D and 10D' of the liquid crystal display panels 10 and 10', the curved surface portions 52 and 52' differ from the curved surface portions 26 and 26' of the liquid crystal display device 100E in that they are disposed at positions overlapping a region consisting of the peripheral display regions 10D and 10D', frame regions 10F and 10F', and panel neighborhoods 50G and 50G' described below. Although the liquid crystal display device 100G shown in FIG. 17 also includes the liquid crystal display panel 10, the backlight device 40, and the like, these are similar to the liquid crystal display panel 10, the backlight device 40, and the like of the liquid crystal display unit 100a, and the descriptions thereof are omitted.

Figure 18:
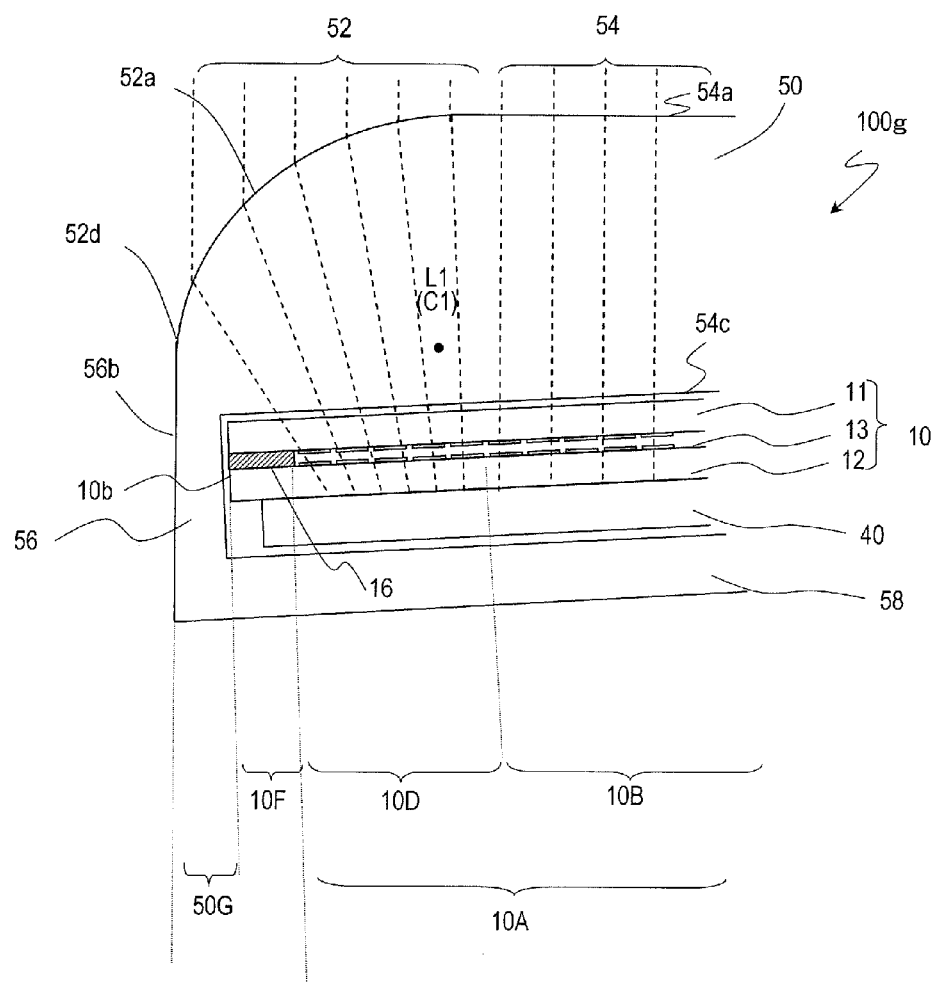
FIG. 18 A schematic cross-sectional view of an edge portion of a liquid crystal display unit 100g.

FIG. 18 shows a schematic cross-sectional view of an edge portion of the liquid crystal display unit 100g. Hereinafter, any part of a housing will be referred to as a "subhousing". The housing 50 is light-transmissive, and, as shown in FIG. 18, includes a curved surface portion 52, a planar portion 54, a lateral subhousing 56, and a bottom subhousing 58. The lateral subhousing 56 is provided for protecting the liquid crystal display panel 10. Because of having the lateral subhousing 56, the liquid crystal display unit 100g can prevent the liquid crystal display panel 10 from being exposed to dust and water. Moreover, application of direct impact on the liquid crystal display panel 10 can also be prevented.

The lateral subhousing 56 is provided on a side face 10b of the liquid crystal display panel 10, whereas the bottom subhousing 58 is provided below the backlight device 40. The curved surface portion 52 is disposed at a position overlapping a region including the peripheral display region 10D of the liquid crystal display panel 10, the frame region 10F of the liquid crystal display panel 10, and a portion outside the liquid crystal display panel 10 where the lateral subhousing 56 is disposed. Hereinafter, the region in which the lateral subhousing 56 is disposed will be referred to as the "panel neighborhood 50G". As shown in FIG. 18, the curved surface portion 52 is disposed so that an outer edge portion 52d of the curved surface portion 52 exists at the viewer's side of an outer end face (also referred to as a "side face") 56b of the lateral subhousing 56. The viewer-side surface 52a of the curved surface portion 52 is a part of a cylindrical surface whose center axis is at a first center axis C1, the first center axis C1 coinciding with the first rotation axis L1 of the biaxial hinge devices. The planar portion 54 is disposed at a position overlapping a central display region 10B of the liquid crystal display panel 10. A viewer-side surface 54a of the planar portion 54 is a plane. The planar portion 54 includes a slope portion such that the distance between the viewer-side surface 54a and a rear surface 54c decreases away from the curved surface portion 52 along a first axis (which herein is the horizontal direction).

In FIG. 18, rays going out from pixels which are arrayed in the display region 10A and entering the curved surface portion 52 and the planar portion 54 are indicated by broken lines. The light going out from pixels which are arrayed in the peripheral display region 10D enters the curved surface portion 52, and is refracted outside (i.e., toward the boundary between the liquid crystal display units 100g and 100g'). At this time, the light entering the curved surface portion 52 is refracted at the viewer-side surface 52a of the curved surface portion 52, and goes out from the viewer-side surface 52a of the curved surface portion 52, which is disposed above the peripheral display region 10D, the frame region 10F, and the panel neighborhood 50G. Light going out from the viewer-side surface 52a of the curved surface portion 52 travels straight in a direction perpendicular to the viewer-side surface 54a of the planar portion 54. Therefore, an image which is formed in the peripheral display region 10D of the liquid crystal display panel 10 is displayed in an enlarged size in the region consisting of the peripheral display region 10D, the frame region 10F, and the panel neighborhood 50G. Light going out from pixels which are arrayed in the central display region 10B enters the planar portion 54, and travels straight in a direction perpendicular to the viewer-side surface 54a of the planar portion 54. Thus, the image which is formed in the central display region 10B is displayed on the viewer's side of the planar portion 54.

In the liquid crystal display unit 100g, since a part of image is displayed on the viewer's side of the lateral subhousing 56, the lateral subhousing 56 can be obscured. Therefore, the liquid crystal display unit 100g is unlikely to allow its frame (the frame region 10F and the lateral subhousing 56) to be visually recognized. Moreover, since an image which is formed in the peripheral display region 10D is displayed on the viewer's side of the curved surface portion 52, and an image which is formed in the central display region 10B is displayed on the viewer's side of the planar portion 54, an image can be displayed on the entire viewer's side of the liquid crystal display unit 100g.

Also in the liquid crystal display unit 100g', since an image which is formed in the peripheral display region 10D' is displayed on the viewer's side of the peripheral display region 10D', the frame region 10F', and a lateral subhousing 56', the frame (the frame region 10F' and the lateral subhousing 56') is unlikely to be visually recognized. Furthermore, since an image which is formed in a central display region 10B' is displayed on the viewer's side of a planar portion 54', an image can be displayed on the entire viewer's side of the liquid crystal display unit 100g'.

Because of having the housings 50 and 50' of the above-described construction, the liquid crystal display device 100G is able to display a jointless image on the entire viewer's side when the open angle is 180° (FIG. 17).

Moreover, as in the case of the liquid crystal display unit 100g, the planar portion 54' of the housing 50' of the liquid crystal display unit 100g' includes a slope portion such that the distance between a viewer-side surface 54a' and a rear surface 54c' decreases away from the curved surface portion 52' along a first axis (which herein is the horizontal direction). Therefore, as compared to the case where the viewer-side surface and the rear surface of the planar portion are parallel, the liquid crystal display device 100G is thin and light-weighted. In particular, it has excellent portability because of being thin even in a folded state.

The liquid crystal display units 100g and 100g' of the liquid crystal display device 100G are linked by biaxial hinge devices similar to the biaxial hinge devices 30 (FIGS. 12 to 14) of the liquid crystal display device 100E, and are opened or closed while the viewer-side surface 52a of the curved surface portion 52 of the housing 50 and the viewer-side surface 52a' of the curved surface portion 52' of the housing 50' are in contact. Moreover, as described above, an image can be displayed on the viewer's side of the curved surface portions 52 and 52'. Therefore, a jointless image can be displayed in any intermediate state between an open state and a closed state. There is also an advantage in that the side faces 10b and 10b' of the liquid crystal display panels 10 and 10' are protected by the lateral subhousings 56 and 56' in the intermediate states and closed state.

Since the lateral subhousings 56 and 56' are provided outside the frame regions 10F and 10F', the liquid crystal display units 100g and 100g' of the liquid crystal display device 100G have a large frame and thus a large non-display region, as compared to the liquid crystal display device 100E (FIG. 13), which lacks lateral subhousings. However, since the curved surface portions 52 and 52' are disposed in each region containing the peripheral display region 10D, 10D', the frame region 10F, 10F', and the panel neighborhood 50G, 50G', it is possible to make the lateral subhousing 56, 56' difficult to be visually recognized, whereby a jointless image can be displayed.

Note that, as shown in FIG. 18, the end face 56b of the lateral subhousing 56 of the housing 50 of the liquid crystal display unit 100g may be formed so as to be oblique. As shown in FIG. 18, the end face 56b of the lateral subhousing 56 may be formed so that the distance between the end face 56b and the side face 10b of the display panel 10 increases toward the rear face and away from the viewer's side.

In the liquid crystal display device 100E (FIG. 13) lacking the lateral subhousing, the side faces of the liquid crystal display panels 10 and 10' become exposed in a closed state, as shown in FIG. 14(d). The side faces of the liquid crystal display panels 10 and 10' are also exposed in intermediate states (FIGS. 14(b) to (c)). Because of including the lateral subhousings 56 and 56', the liquid crystal display device 100G provides an advantage of preventing the side faces 10b and 10b' of the liquid crystal display panels 10 and 10' from being exposed in the closed state and intermediate states.

Figure 19:
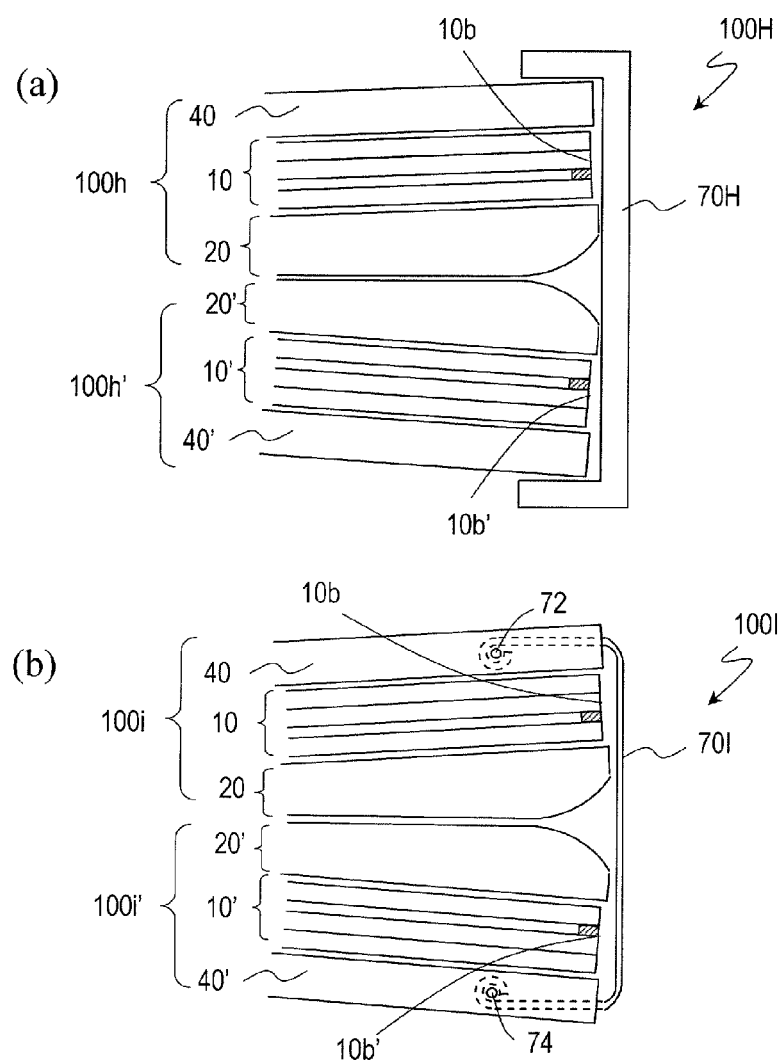
FIG. 19 (a) is a schematic cross-sectional view of a liquid crystal display device 100H; and (b) is a schematic cross-sectional view of a liquid crystal display device 100I.

As described above, in the liquid crystal display device 100E, the side faces of the liquid crystal display panels 10 and 10' are exposed at an open angle of 0° (closed state (FIG. 14(d)). Therefore, a protection member which protects the side faces of the liquid crystal display panels 10 and 10' at an open angle of 0° may be provided. FIGS. 19(a) and (b) show a liquid crystal display device 100H having a protection member 70H, and a liquid crystal display device 100I having a protection member 70I, respectively.

As in the liquid crystal display device 100H shown in FIG. 19(a), the protection member 70H may be attached when the open angle is 0°. Alternatively, as in the liquid crystal display device 100I shown in FIG. 19(b), a film-like protection member 70I may be provided, such that, when the open angle is more than 0°, the film-like protection member 70I is wound up around centers of winding 72 and 74 which are respectively provided in the liquid crystal display units 100i and 100i'. The liquid crystal display device 100I has an advantage in that the side faces of the liquid crystal display panels 10 and 10' can be protected not only in a closed state but also in intermediate states.

Note that, in the liquid crystal display device 100G shown in FIG. 17, where lateral subhousings are provided on the side faces 10b and 10b' of the liquid crystal display panels 10 and 10', it is possible to protect the side faces 10b and 10b' of the liquid crystal display panels 10 and 10' in the closed state and intermediate states, without separately providing any protection member.

Next, with reference to FIGS. 20 and 21, a liquid crystal display device 100J according to another embodiment will be described. The liquid crystal display device 100J differs from the liquid crystal display device 100E (FIGS. 12 to 14) and the like in that the liquid crystal display units 100j and 100j' include housings 80 and housings 80' as described below.

Figure 20:
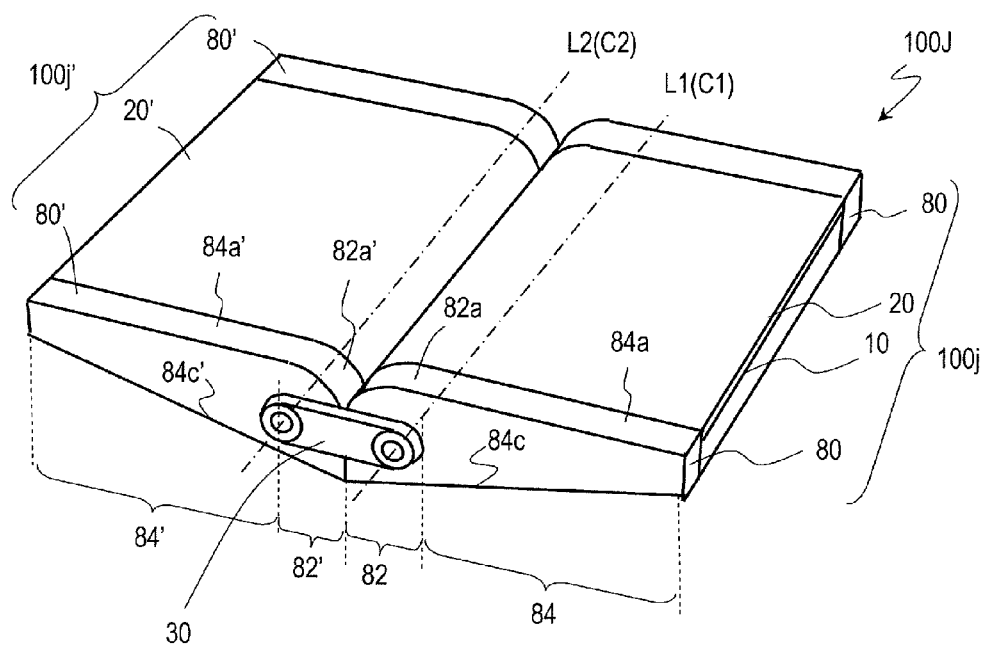
FIG. 20 A schematic perspective view of a liquid crystal display device 100J.

FIG. 20 shows a schematic perspective view of the liquid crystal display device 100J. FIG. 21(a) shows a schematic plan view of the liquid crystal display device 100J, and FIG. 21(b) shows a schematic cross-sectional view of the liquid crystal display device 100J along line 21B-21B' in FIG. 21(a).

As shown in FIG. 20, the liquid crystal display device 100J includes a liquid crystal display unit 100j, a liquid crystal display unit 100j', and biaxial hinge devices 30. As shown in FIG. 21(a), the liquid crystal display device 100J includes two biaxial hinge devices 30 which are provided so as to oppose each other via the liquid crystal display units 100j and 100j'.

The liquid crystal display unit 100j includes a liquid crystal display panel 10, a light-transmitting cover 20, and housings 80. The light-transmitting cover 20 is provided on the viewer's side of the liquid crystal display panel 10. The housings 80 are disposed on a side face of the liquid crystal display panel 10 and on a side face of the light-transmitting cover 20, which are perpendicular to a first center axis C1 described later. The liquid crystal display unit 100j includes the two housings 80 being provided so as to oppose each other via the liquid crystal display panel 10 and the light-transmitting cover 20. Similarly, the liquid crystal display unit 100j' includes a liquid crystal display panel 10', a light-transmitting cover 20' disposed on the viewer's side of the liquid crystal display panel 10', and housings 80'.

As shown in FIG. 21(a), each biaxial hinge device 30 has a first hinge shaft 32, a second hinge shaft 34, and a linkage member 36 linking the first hinge shaft 32 and the second hinge shaft 34. The first hinge shaft 32 and the second hinge shaft 34 are disposed parallel to each other. The first hinge shaft 32 is affixed to the housings 80, whereas the second hinge shaft 34 is affixed to the housings 80'. The liquid crystal display unit 100j is capable of rotating around a first rotation axis L1 which is defined by the first hinge shaft 32, whereas the liquid crystal display unit 100j' is capable of rotating around a second rotation axis L2 which is defined by the second hinge shaft 34. Each biaxial hinge device 30 links together the liquid crystal display unit 100j and the liquid crystal display unit 100j', via the linkage member 36. As has been described with reference to FIG. 13(a), the first hinge shaft 32 and the second hinge shaft 34 of the liquid crystal display device 100E are partly located within the light-transmitting covers 20 and 20', so that the first hinge shaft 32 and the second hinge shaft 34 may partly be visually recognized by the viewer. As shown in FIG. 21(a), the first hinge shaft 32 and the second hinge shaft 34 of the liquid crystal display device 100J are partly located within the housings 80 and 80'; therefore, by forming the housings 80 and 80' from a non-light-transmitting material, for example, the first hinge shaft 32 and the second hinge shaft 34 can be prevented from being visually recognized by the viewer, thereby providing for an improved appearance.

As shown in FIG. 20, each housing 80 of the liquid crystal display unit 100j includes a curved subhousing 82 and a planar subhousing 84. Similarly, each housing 80' of the liquid crystal display unit 100j' includes a curved subhousing 82' and a planar subhousing 84'. A viewer-side surface 84a of the planar subhousing 84 and a viewer-side surface 84a' of the planar subhousing 84' are planes. As shown in FIG. 20, the planar subhousing 84 includes a slanted subhousing such that the distance between viewer-side surface 84a and a rear surface 84c of the planar subhousing 84 decreases away from the curved subhousing 82 along a first axis (horizontal direction). Moreover, the planar subhousing 84' includes a slanted subhousing such that the distance between the viewer-side surface 84a' and a rear surface 84c' of the planar subhousing 84' decreases away from the curved subhousing 82' along the first axis (horizontal direction). Although the planar subhousings 84 and 84' shown in FIG. 20 illustrate examples which are composed only of slanted subhousings, the planar subhousings 84 and 84' may include portions other than the slanted subhousings. Each planar subhousing may include a slanted subhousing, and a flat subhousing which is provided outside the slanted subhousing and whose viewer-side surface and rear surface are parallel, for example. The viewer-side surface 82a of the curved subhousing 82 and the viewer-side surface 82a' of the curved subhousing 82' are parts of cylindrical surfaces whose center axes are the first center axis C1 and the second center axis C2, respectively.

As shown in FIG. 21(b), the light-transmitting covers 20 and 20' include curved surface portions 26 and 26' and planar portions 24 and 24'. Viewer-side surfaces 24a and 24a' of the planar portions 24 and 24' are planes. The planar portion 24 includes a slope portion such that the distance between the viewer-side surface 24a and the rear surface 24c of the planar portion 24 decreases away from the curved surface portion 26 along the first axis (horizontal direction). The planar portion 24' includes a slope portion such that the distance between the viewer-side surface 24a' and the rear surface 24c' of the planar portion 24' decreases away from the curved surface portion 26' along the first axis (horizontal direction). The viewer-side surface 26a of the curved surface portion 26 and the viewer-side surface 26a' of the curved surface portion 26' are parts of cylindrical surfaces whose center axes are the first center axis C1 and the second center axis C2, respectively.

As shown in FIG. 21(a), each curved subhousing 82 is disposed so as to adjoin the curved surface portion 26 of the light-transmitting cover 20. Each curved subhousing 82' is disposed so as to adjoin the curved surface portion 26' of the light-transmitting cover 20'. The planar subhousings 84 are disposed so as to adjoin the planar portion 24 of the light-transmitting cover 20, whereas the planar subhousings 84' are disposed so as to adjoin the planar portion 24' of the light-transmitting cover 20'. The housings 80 and the light-transmitting cover 20 are disposed so that the first center axis C1 coincides with the first rotation axis L1 of the biaxial hinge devices 30. Similarly, the housings 80' and the light-transmitting cover 20' are disposed so that the second center axis C2 coincides with the second rotation axis L2 of the biaxial hinge devices 30.

The viewer-side surface 26a of the curved surface portion 26 and the viewer-side surface 82a of the curved subhousing 82 differ in their distances from the first center axis C1. In other words, they differ in cylindrical surface radii. Similarly, the viewer-side surface 26a' of the curved surface portion 26' and the viewer-side surface 82a' of the curved subhousing 82' differ in their distances from the second center axis C2.

FIG. 21(b) together shows the viewer-side surface 26a of the curved surface portion 26 and the viewer-side surface 82a of the curved subhousing 82. As shown in FIG. 21(b), the viewer-side surface 82a of the curved subhousing 82 is greater than the viewer-side surface 26a of the curved surface portion 26. As described earlier, the viewer-side surface 82a of the curved subhousing 82 and the viewer-side surface 26a of the curved surface portion 26 are both parts of cylindrical surfaces whose center axes are the first center axis C1. Therefore, the distance between the viewer-side surface 82a of the curved subhousing 82 and the first center axis C1 is greater than the distance between the viewer-side surface 26a of the curved surface portion 26 and the first center axis C1. In other words, the radius of curvature of the viewer-side surface 82a of the curved subhousing 82 is greater than the radius of curvature of the viewer-side surface 26a of the curved surface portion 26. Similarly, the distance between the viewer-side surface 82a' of the curved subhousing 82' and the second center axis C2 is greater than the distance between the viewer-side surface 26a' of the curved surface portion 26' and the second center axis C2.

Therefore, during opening and closing of the liquid crystal display device 100J, the viewer-side surface 26a of the curved surface portion 26 and the viewer-side surface 26a' of the curved surface portion 26' are not in contact, but the viewer-side surface 82a of the curved subhousing 82 and the viewer-side surface 82a' of the curved subhousing 82' are in contact.

Now, as in the liquid crystal display device 100E (FIGS. 12 to 14), if the liquid crystal display units 100e and 100e' are opened or closed while the viewer-side surface 26a of the curved surface portion 26 of light-transmitting cover 20 and the viewer-side surface 26a' of the curved surface portion 26' of light-transmitting cover 20' are in contact, the viewer-side surface 26a or the viewer-side surface 26a' may incur abrasion or scratching. In the liquid crystal display device 100J, since the viewer-side surfaces 82a and 82a' of the curved subhousings 82 and 82' have a greater radius of curvature than the curved surface portions 26 and 26' than the radius of curvature of the viewer-side surfaces 26a and 26a', opening or closing occurs without allowing contact between the viewer-side surface 26a of the curved surface portion 26 and the viewer-side surface 26a' of the curved surface portion 26'. Therefore, an advantage is provided in that abrasion or scratching of the viewer-side surface 26a and the viewer-side surface 26a' is prevented.

Now, the difference (indicated as "dr$_1$" in FIG. 21(b)) between the distance of the viewer-side surface 26a of the curved surface portion 26 from the first center axis C1 and the distance of the viewer-side surface 82a of the curved subhousing 82 from the first center axis C1 is no less than 0.05 mm and no more than 0.5 mm. Since the radius of curvature of the viewer-side surfaces 82a and 82a' of the curved subhousings 82 and 82' is greater than the radius of curvature of the viewer-side surfaces 26a and 26a' of the curved surface portions 26 and 26', in the liquid crystal display device 100J, an interspace (a joint dr$_2$ indicated in FIG. 21(b)) between the viewer-side surface 26a of the curved surface portion 26 and the viewer-side surface 26a' of the curved surface portion 26' is visually recognized. If dr$_1$ is greater than 0.5 mm, the joint dr$_2$ may be conspicuous. If it is less than 0.05 mm, abrasion or scratching is likely to occur at the viewer-side surface 26a and the viewer-side surface 26a'. Note that, as mentioned earlier, with a view to preventing abrasion or scratching of the viewer-side surface 26a and the viewer-side surface 26a', hardcoating may be provided on the viewer-side surface 26a and the viewer-side surface 26a'.

The curved surface portions 26 and 26' of the light-transmitting covers 20 and 20' of the liquid crystal display device 100J are able to display an image on the viewer's side, as are the curved surface portions 26 and 26' of the liquid crystal display device 100E shown in FIGS. 12 to 14. Therefore, the liquid crystal display device 100J can display a jointless image in the open state and intermediate states. Moreover, the liquid crystal display device 100J is thinner and lighter-weighted, because each planar subhousing 84 includes a slanted subhousing such that the distance between the viewer-side surface 84a and the rear surface 84c decreases away from the curved subhousing 82 along the first axis; each planar subhousing 84' includes a slanted subhousing such that the distance between the viewer-side surface 84a' and the rear surface 84c' decreases away from the curved subhousing 82' along the first axis; the planar portion 24 includes a slope portion such that the distance between the viewer-side surface 24a and the rear surface 24c decreases away from the curved surface portion 26 along the first axis; and the planar portion 24' includes a slope portion such that the distance between the viewer-side surface 24a' and the rear surface 24c' decreases away from the curved surface portion 26' along the first axis. Therefore, in particular, it has excellent portability even in a folded state.

Figure 22:
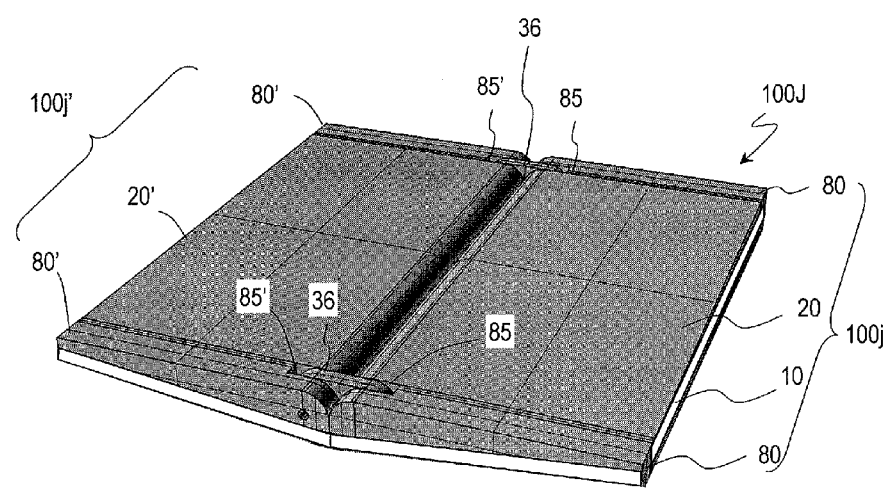
FIG. 22 A schematic perspective view of the liquid crystal display device 100J.

In the case where the housings 80 and 80' are provided as in the liquid crystal display device 100J, grooves 85 and 85' may be provided in the curved subhousings 82 and 82', such that the linkage members 36 of the biaxial hinge devices 30 are disposed in the grooves 85 and 85', as shown in FIG. 22.

In a display device such as the liquid crystal display device 100J, where the liquid crystal display units 100j and 100j' are opened or closed while the viewer-side surface 82a of the curved subhousing 82 and the viewer-side surface 82a' of the curved subhousing 82' are in contact, if one of the viewer-side surface 82a of the curved subhousing 82 and the viewer-side surface 82a' of the curved subhousing 82' slides relative to the other, impartial opening or closing cannot be stably achieved. In other words, impartial rotation cannot be stably performed in such a manner that the angle by which the liquid crystal display unit 100j rotates around the first rotation axis L1 and the angle by which the liquid crystal display unit 100j' rotates around the second rotation axis L2 are equal. Accordingly, as in a liquid crystal display device 100K and a liquid crystal display device 100L described below, structures for stabilizing the open-close operations may be provided.

Figure 21:
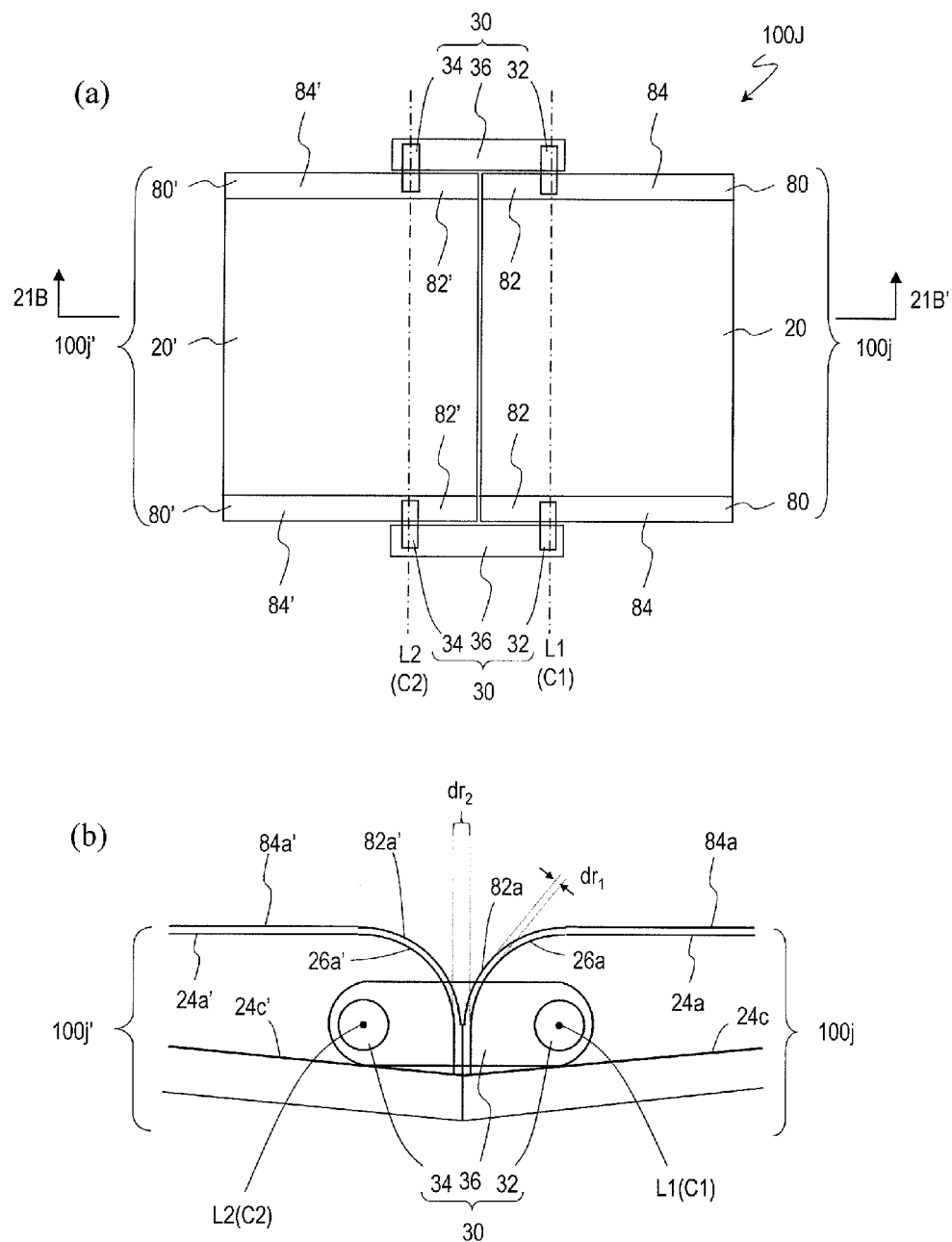
FIGS. 21 (a) and (b) are diagrams showing the liquid crystal display device 100J, where (a) is a schematic plan view, and (b) is a schematic cross-sectional view along line 21B-21B' in (a).
Figure 23:
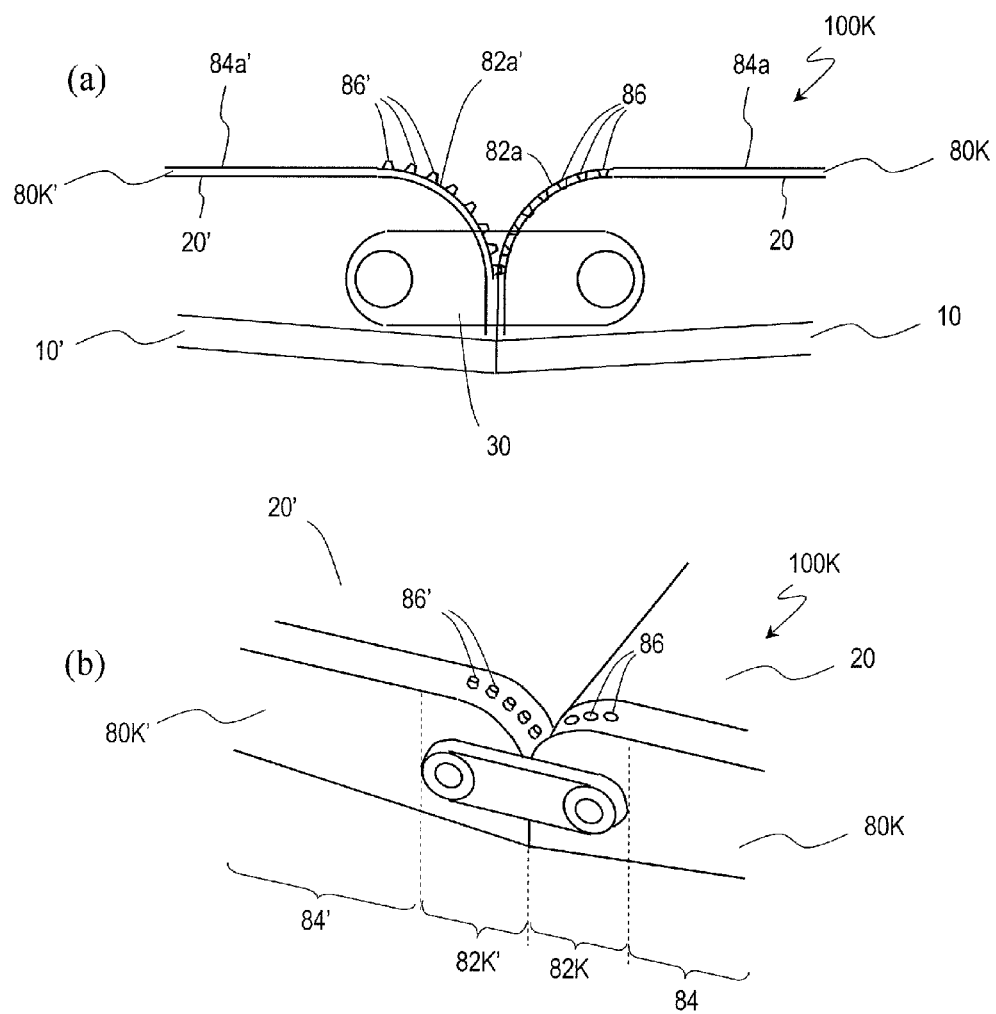
FIGS. 23 (a) and (b) are diagrams showing a liquid crystal display device 100K, where (a) is a schematic cross-sectional view, and (b) is a schematic perspective view.

Instead of each housing 80 and each housing 80' of the liquid crystal display device 100J shown in FIG. 21, the liquid crystal display device 100K shown in FIGS. 23(a) and (b) includes a housing 80K having a curved subhousing 82K with a plurality of recesses 86 being provided on its viewer-side surface 82a, and a housing 80K' having a curved subhousing 82K' with a plurality of protrusions 86' being provided on its viewer-side surface 82a'. By providing the protrusions 86' and recesses 86 so that the protrusions 86' mesh with the recesses 86, the respective liquid crystal display units are stably allowed to rotate equally.

Figure 24:
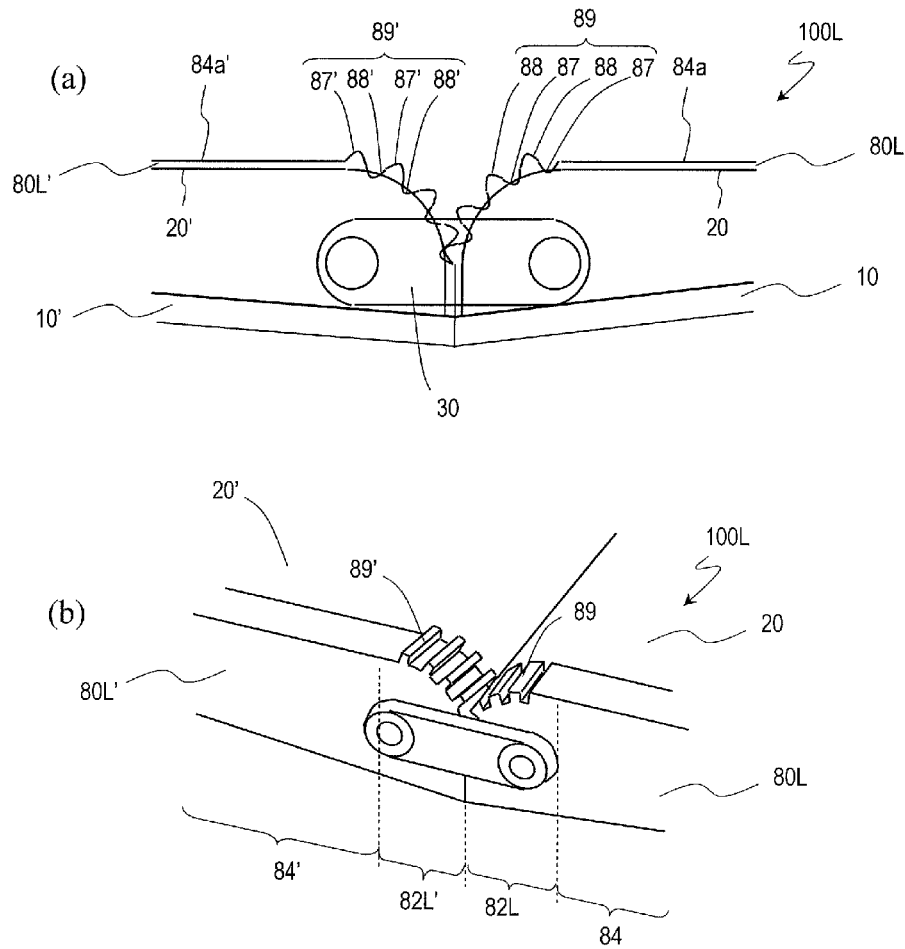
FIGS. 24 (a) and (b) are diagrams showing a liquid crystal display device 100L, where (a) is a schematic cross-sectional view, and (b) is a schematic perspective view.

The liquid crystal display device 100L shown in FIGS. 24(a) and (b) includes housings 80L each having a subhousing 82L with a first rugged structure 89 provided thereon, and housings 80L' each having a subhousing 82L' with a second rugged structure 89' provided thereon. The first rugged structure 89 includes a plurality of alternating recesses 87 and protrusions 88. The second rugged structure 89' includes a plurality of alternating protrusions 87 and recesses 88'. By providing the first rugged structure 89 and the second rugged structure 89' so that they mesh with each other, the respective liquid crystal display units are stably allowed to rotate equally.

The recesses 86 and protrusions 86' of the above-described liquid crystal display device 100K (FIG. 23), and the recesses 87, protrusions 88, protrusions 87' and recesses 88' of the liquid crystal display device 100L (FIG. 24), have a height or depth of no less than 0.1 mm and no more than 1 mm, and a cross-sectional width of no less than 0.5 mm and no more than 3 mm, for example.

Moreover, in order to stably achieve impartial rotation in the open-close operations of the liquid crystal display units 100j and 100j', in the liquid crystal display device 100J shown in FIG. 21, friction between the viewer-side surface 82a of the curved subhousing 82 and the viewer-side surface 82a' of the curved subhousing 82' may be increased. For example, a high-friction layer using a rubber material may be provided on the viewer-side surfaces 82a and 82a' of the curved subhousings 82 and 82'. Moreover, on the viewer-side surfaces 82a and 82a' of the curved subhousings 82 and 82', rugged structures which are smaller than the recesses 86 and protrusions 86' of the liquid crystal display device 100K (FIG. 23) and the recesses 87, protrusions 88, protrusions 87' and recesses 88' of the liquid crystal display device 100L (FIG. 24) may be provided (e.g., rugged structures with a height of no less than 5 μm and no more than 100 μm, and a two-dimensional size of no less than 5 μm and no more than 100 μm), thus realizing a satin-finished surface.

In the liquid crystal display device 100J, the viewer-side surfaces 26a and 26a' of the curved surface portions 26 and 26' of the light-transmitting covers 20 and 20' have arc cross sections. However, as in a liquid crystal display device 100M shown in FIG. 25, the viewer-side surfaces 28a and 28a' of the curved surface portions 28 and 28' may be curved surfaces whose cross section is a non-arc curve.

Figure 25:
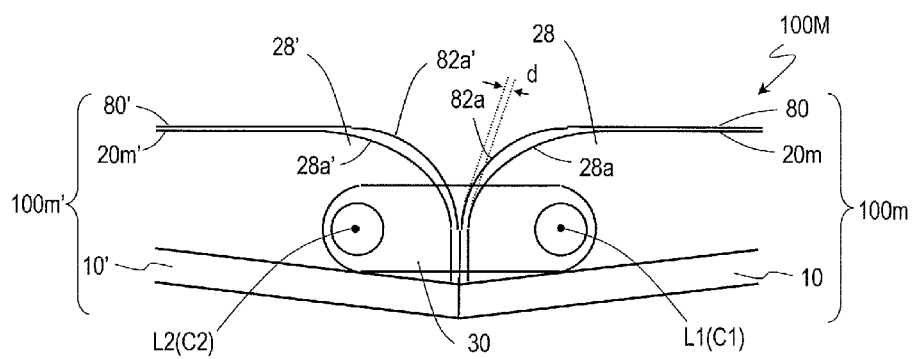
FIG. 25 A schematic cross-sectional view of a liquid crystal display device 100M.

FIG. 25 shows a schematic cross-sectional view of a direct-viewing type liquid crystal display device 100M according to an embodiment of the present invention. The liquid crystal display device 100M includes a liquid crystal display unit 100m, a liquid crystal display unit 100m', and biaxial hinge devices 30. The liquid crystal display unit 100m includes a liquid crystal display panel 10, a light-transmitting cover 20m disposed on the viewer's side of the liquid crystal display panel 10, and housings 80. Similarly, the liquid crystal display unit 100m' includes a liquid crystal display panel 10', a light-transmitting cover 20m', and housings 80'. The light-transmitting cover 20m includes a curved surface portion 28 with a viewer-side surface 28a having a cross section which is a curve defined by an aspherical function. Similarly, the light-transmitting cover 20m' includes a curved surface portion 28' with a viewer-side surface 28a' having a cross section which is a curve defined by an aspherical function. Note that the housings 80, the housings 80', and the biaxial hinge device 30 of the liquid crystal display device 100M are similar in construction to the housings 80, the housings 80', and the biaxial hinge devices 30 of the liquid crystal display device 100J (FIGS. 20 to 22). Therefore, in the liquid crystal display device 100M, similarly to the liquid crystal display device 100J, the liquid crystal display unit 100m ands 100m' are opened or closed while the viewer-side surface 82a of the curved subhousing 82 and the viewer-side surface 82a' of the curved subhousing 82' are in contact.

Figure 26:
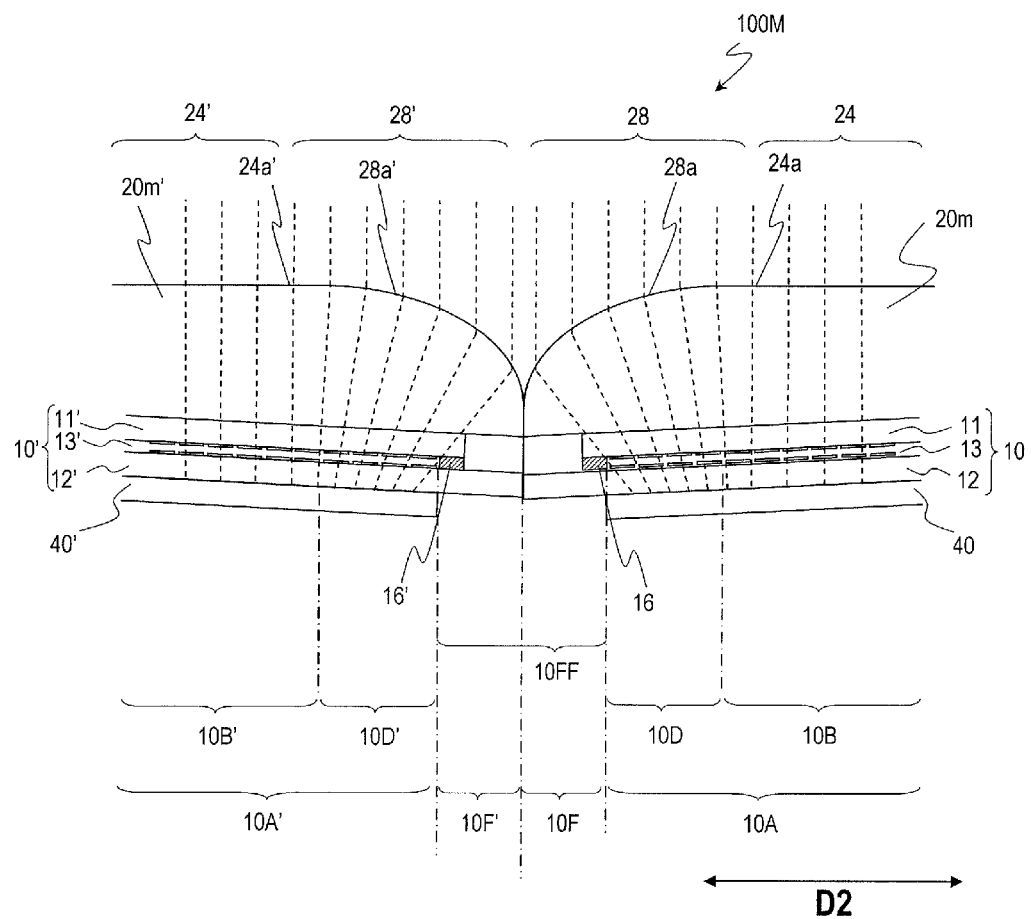
FIG. 26 A schematic cross-sectional view of the liquid crystal display device 100M.

FIG. 26 shows a schematic cross-sectional view of the liquid crystal display device 100M. With reference to FIG. 26, it will be explained that the liquid crystal display device 100M is able to display an undistorted image.

As shown in FIG. 26, the liquid crystal display panel 10, 10' includes a display region 10A, 10A' in which a plurality of pixels are arrayed, and a frame region 10F, 10F' disposed outside the display region 10A, 10A'. A non-display region 10FF which does not contribute to displaying includes the frame regions 10F and 10F', and in the case where interspaces or connecting portions exist between them, also includes any such interspace or connecting portion. In the display region 10A, 10A' of the liquid crystal display panel 10, 10', a plurality of pixels are provided in a matrix along a first direction (a direction perpendicular to the plane of the figure of FIG. 26) and a second direction which is perpendicular to the first direction and parallel to the display plane of the display panel 10, 10' (a horizontal direction on the plane of the figure of FIG. 26). The pixels are arrayed at an equal pitch, along each of the first direction and the second direction.

The liquid crystal display panel 10 includes an upper substrate 11 and a lower substrate 12, with a liquid crystal layer 13 being provided between the upper substrate 11 and the lower substrate 12. On the upper substrate 11, a color filter layer and a counter electrode are formed, for example. On the lower substrate 12, transparent electrodes are formed in a matrix, and also TFTs, bus lines, and driving circuits for supplying signals to them are provided, for example. Moreover, the frame region 10F of the liquid crystal display panel 10 includes a sealing portion 16 for keeping the liquid crystal layer 13 in between the upper substrate 11 and the lower substrate 12, driving circuits for driving the pixels, and the like. In the liquid crystal display panel 10', similarly to the liquid crystal display panel 10, an upper substrate 11', a lower substrate 12', a liquid crystal layer 13', and a sealing portion 16' are provided.

The light-transmitting cover 20m, 20m' includes a curved surface portion 28, 28' and a planar portion 24, 24'. The planar portion 24, 24' is disposed on the viewer's side of the central display region 10B, 10B'. A viewer-side surface 24a, 24a' of the planar portion 24, 24' is a plane. The curved surface portion 28 is disposed astride a boundary between the display region 10A and the frame region 10F of the liquid crystal display panel 10 extending along the first direction. Similarly, the curved surface portion 28' is disposed astride a boundary between the display region 10A' and the frame region 10F' of the liquid crystal display panel 10' extending along the first direction. Stated otherwise, the curved surface portion 28 is disposed on the viewer's side of a region which includes a part of the frame region 10F and a part of the peripheral display region 10D within the display region 10A that adjoins the part of the frame region 10F along the second direction D2. Similarly, the curved surface portion 28' is disposed on the viewer's side of a region which includes a part of the frame region 10F' and a part of the peripheral display region 10D' within the display region 10A' that adjoins the part of the frame region 10F' along the second direction D2.

When the viewer-side surface 28a of the curved surface portion 28 has a cross-sectional shape which is a curve as defined by an aspherical function that is described in International Publication No. 2009/157150, it can display an undistorted image as described below. For reference sake, the entire disclosure of International Publication No. 2009/157150 is incorporated herein by reference.

Now, a shape for the viewer-side surface 28a of the curved surface portion 28 that allows an image formed in the peripheral display region 10D to be formed so as to compressed by an image compression rate a relative to an image formed in the central display region 10B, and allows the image formed in the peripheral display region 10D to be displayed with 1/a times enlargement on the viewer-side surface 28a of the curved surface portion 28, can be determined as follows.

As an aspherical function f(x), the following mathematical function is used.

$$f(x) = h - cx^2/(1+(1-(1+k)c^2x^2)^{1/2}) + A_4x^4 + A_6x^6 + A_8x^8 + A_{10}x^{10}$$

Herein, c: curvature of the curved surface portion 28 (an inverse of the radius of curvature);

h: thickness of the planar portion 24 at the curved surface portion 28 side; and k: conic constant.

x represents the position of each point on the viewer-side surface 28a of the curved surface portion 28 (position along the second direction D2), whose value increases toward the frame region 10F, assuming that the central display region 10B side is zero (0).

For example, when width W2 of the peripheral display region 10D: 12 mm width W1 of the frame region 10F: 3 mm image compression rate a: 0.8 thickness h of the planar portion 24 at the curved surface portion 28 side: 13 mm radius of curvature (an inverse of the curvature c of the curved surface portion 28, 1/c): 23 mm refractive index n of the curved surface portion 28: 1.49 (acrylic resin), then k=1.15

$A_4 = -7.86 \times 10^{-7}$ $A_6 = 1.89 \times 10^{-8}$ $A_8 = -1.62 \times 10^{-10}$ $A_{10} = 4.95 \times 10^{-13}$.

Moreover, the value of k is derived by the following equation.

$$k = 89.918a^4 - 194.57a^3 + 159.82a^2 - 57.099a + 7.1865$$

When the image compression rate is small (e.g., a<0.7), the value of 1/a becomes large, so that each pixel is greatly enlarged. This may allow any black matrix that exists between pixels to become conspicuous, often resulting in poor displaying. On the other hand, when the image compression rate is large (e.g., a>0.9), a large curved surface portion will be needed relative to the width of the frame region, which is not preferable. For example, when image compression rate a=0.95, since a=W2/(W1+W2)=0.95, the width (W1+W2) of the curved surface portion will be 20 times as large as the width W1 of the frame region. When the width W1 of the frame region is 3 mm as in the above example, the width W1+W2 of the curved surface portion will be 60 mm. For example, in display devices for use in mobile phones and the like, the device width is often 60 mm or less, which makes it impossible for any member such that the width W1+W2 of the curved surface portion is 60 mm to be disposed. Therefore, the image compression rate a is preferably about 0.7 to 0.9. From the above equation, the conic constants k at image compression rates a=0.7, 0.9 are respectively calculated to be k≈0.38, 2.4, and therefore the preferable range for the conic constant k is no less than 0.38 and no more than 2.4.

By determining the aspherical function f(x) by using the aforementioned k values, and fabricating curved surface portions 28 and 28' having the viewer-side surfaces 28a and 28a' as expressed by f(x), it becomes possible to display an undistorted image in the region composed of the peripheral display region 10D, 10D' and the frame region 10F, 10F'.

FIG. 26 schematically shows rays going out from the liquid crystal display panels 10 and 10' and entering the light-transmitting covers 20m and 20m'. Light going out from the pixels that are arrayed in the central display region 10B, 108' of the liquid crystal display panel 10, 10' enters the planar portion 24, 24', travels straight within the planar portion 24, 24' to go out toward the viewer's side, and proceeds in a direction perpendicular to the viewer-side surface 24a, 24a' of the planar portion 24. Therefore, on the viewer's side of the planar portion 24, 24', an image which is formed in the central display region 10B, 10B' is displayed. Light going out from the pixels that are arrayed in the peripheral display region 10D, 10D' enters the curved surface portion 28, 28', and is refracted outside (i.e., toward the border line between the liquid crystal display panels 10 and 10') to go out toward the viewer's side, and proceeds in a direction perpendicular to the viewer-side surface 24a, 24a' of the planar portion 24. In this manner, as a result of the light going out from the peripheral display region 10D, 10D' of the liquid crystal display panel 10, 10' being refracted, an image is displayed on the front face of the frame region 10F, 10F'.

Now, the cross-sectional shape of the viewer-side surface 28a, 28a' of the curved surface portion 28, 28' is a curve defined by the aforementioned aspherical function f(x). Therefore, an image formed in the peripheral display region 10D can be displayed on the viewer's side of the curved surface portion 28, 28' with 1/a times enlargement, whereby an undistorted image can be displayed on the viewer's side of the curved surface portion 28. As mentioned above, on the viewer's side of the planar portion 24, 24', an image which is formed in the central display region 10B, 10B' is displayed. By allowing the image formed in the peripheral display region 10D, 10D' to be compressed by the image compression rate a relative to the image formed in the central display region 10B, 10B', and allowing the image formed in the peripheral display region 10D, 10D' to be displayed with 1/a times enlargement on the viewer-side surface 28a, 28a' of the curved surface portion 28, 28', an undistorted image can be displayed on the viewer's side of the planar portion 24, 24' and the curved surface portion 28, 28'. In other words, an undistorted image can be displayed across the entire display plane of the liquid crystal display device 100M.

Note that, as shown in FIG. 25, in the liquid crystal display device 100M, the distance between the viewer-side surface 82a of the curved subhousing 82 and the first center axis C1 in each housing 80 is greater than the distance between the viewer-side surface 28a of the curved surface portion 28 of the light-transmitting cover 20 and the first center axis C1. The difference (indicated as "d" in FIG. 25) between the distance of the viewer-side surface 82a from the first center axis C1 and the distance of the viewer-side surface 28a from the first center axis C1 is preferably no less than 0.05 mm and no more than 0.5 mm, similarly to $dr_1$ of the liquid crystal display device 100J (FIG. 21(b)).

Figure 27:
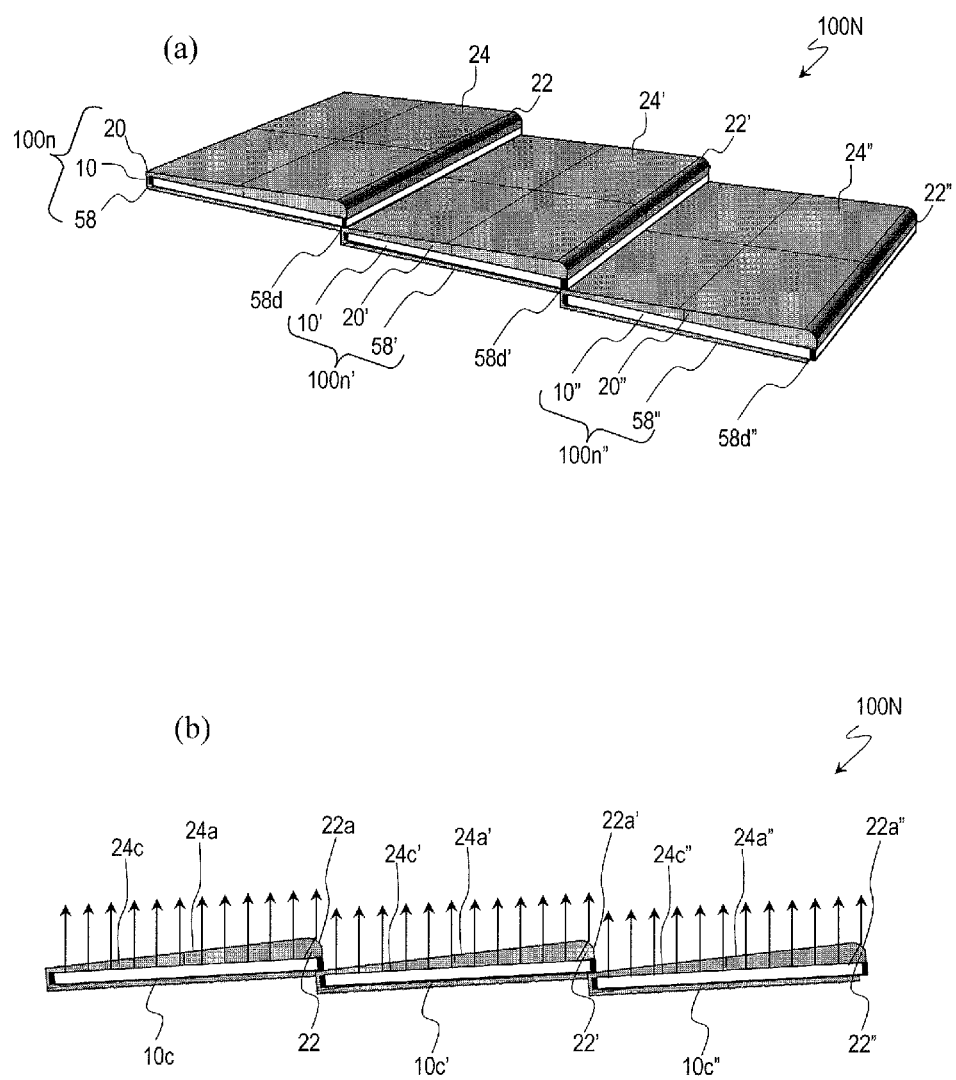
FIGS. 27 (a) and (b) are diagrams showing a liquid crystal display device 100N, where (a) is a schematic perspective view, and (b) is a schematic cross-sectional view.

Next, with reference to FIG. 27, a liquid crystal display device 100N according to another embodiment of the present invention will be described.

FIG. 27(a) is a schematic perspective view of the liquid crystal display device 100N, and FIG. 27(b) is a schematic cross-sectional view of the liquid crystal display device 100N. As shown in FIG. 27(a), the liquid crystal display device 100N includes three liquid crystal display units 100n, 100n', and 100n" having the same construction as that of the liquid crystal display unit 100a (FIG. 1 and FIG. 2).

As shown in FIGS. 27(a) and (b), the liquid crystal display unit 100n includes a liquid crystal display panel 10 and a light-transmitting cover 20. The light-transmitting cover 20 includes a planar portion 24 and a curved surface portion 22. Similarly, the liquid crystal display unit 100n' includes a liquid crystal display panel 10', and a light-transmitting cover 20' having a planar portion 24' and a curved surface portion 22'. The liquid crystal display unit 100n adjoins the liquid crystal display unit 100n' in such a manner that an edge portion of a rear surface 10c of the liquid crystal display panel 10 at the side of the curved surface portion 22 overlies an edge portion of a viewer-side surface 24a' of the planar portion 24' at the opposite side from the curved surface portion 22'.

Similarly to the liquid crystal display unit 100n and the liquid crystal display unit 100n', the liquid crystal display unit 100n" includes a liquid crystal display panel 10", and a light-transmitting cover 20" having a planar portion 24" and a curved surface portion 22". The liquid crystal display unit 100n' adjoins the liquid crystal display unit 100n" in such a manner that an edge portion of a rear surface 10c' of the liquid crystal display panel 10' at the side of the curved surface portion 22' overlies an edge portion of a viewer-side surface 24a" of the planar portion 24" at the opposite side from the curved surface portion 22".

The planar portion 24 of the light-transmitting cover 20 of the liquid crystal display unit 100n includes a slope portion such that the distance between the viewer-side surface 24a and the rear surface 24c decreases away from the curved surface portion 22 along a first axis (which herein is the horizontal direction). The planar portions 24' and 24" of the light-transmitting covers 20' and 20" also have similar shapes. Similarly to the planar portion 24, the planar portion 24' includes a slope portion such that the distance between the viewer-side surface 24a' and the rear surface 24c' decreases away from the curved surface portion 22' along the first axis, whereas the planar portion 24" includes a slope portion such that the distance between the viewer-side surface 24a" and the rear surface 24c" decreases away from the curved surface portion 22" along the first axis.

FIG. 27(b) schematically shows rays going out from the liquid crystal display panels 10, 10', and 10" and entering the light-transmitting covers 20, 20', and 20" so as to go out toward the viewer's side. As shown in FIG. 27(b), the rays entering the curved surface portions 22, 22', and 22" are respectively refracted by viewer-side surfaces 22a, 22a', and 22a" of the curved surface portions 22, 22', and 22". Therefore, the liquid crystal display device 100N is able to obscure the joints between the liquid crystal display unit 100n and the liquid crystal display unit 100n' and between the liquid crystal display unit 100n' and the liquid crystal display unit 100n".

Hereinafter, it will be explained in comparison with Comparative Example that, since planar portions 24, 24', and 24" have wedge cross-sectional shapes, the liquid crystal display device 100N features a small overall thickness of the display device, and has small joints between the liquid crystal display unit 100n and the liquid crystal display unit 100n' and between the liquid crystal display unit 100n' and the liquid crystal display unit 100n", as compared to the case where the viewer-side surface and the rear surface of each planar portion are parallel.

Figure 28:
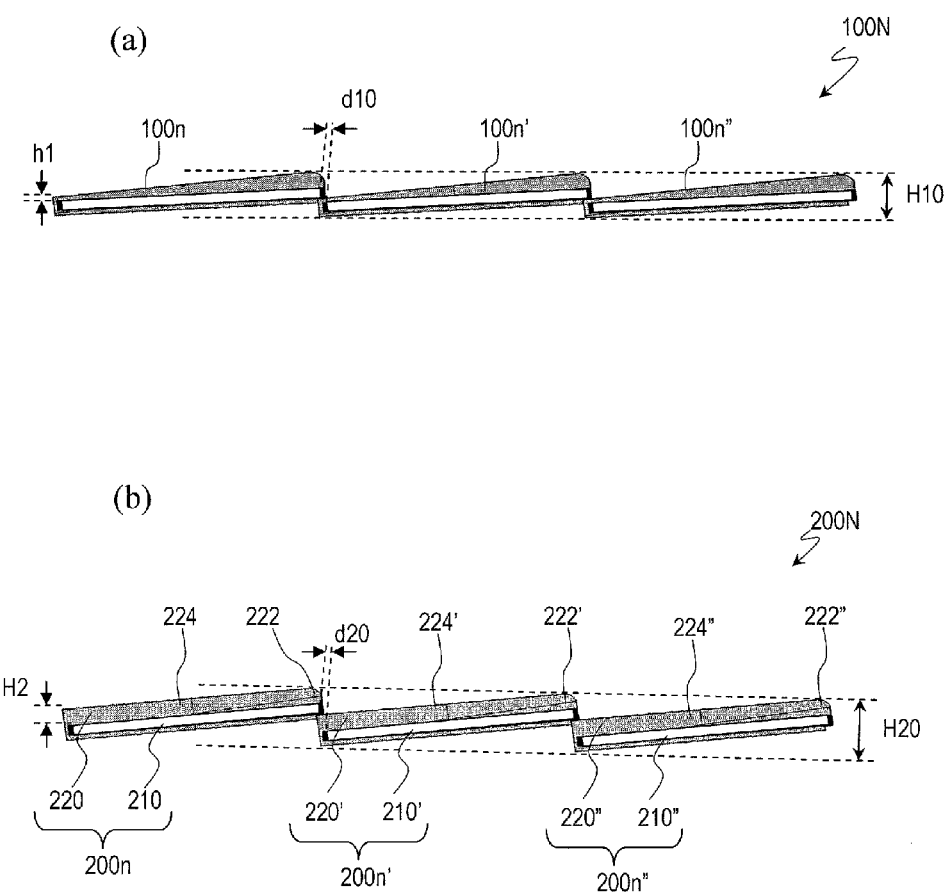
FIG. 28 (a) is a schematic cross-sectional view of the liquid crystal display device 100N, and (b) is a schematic cross-sectional view of the liquid crystal display device 200N of Comparative Example.

FIG. 28(a) shows a schematic cross-sectional view of the liquid crystal display device 100N according to an embodiment of the present invention, whereas FIG. 28(b) shows a schematic cross-sectional view of a liquid crystal display device 200N of Comparative Example. As shown in FIG. 28(b), the liquid crystal display device 200N includes three liquid crystal display units 200n, 200n', and 200n" having the same construction as that of the liquid crystal display unit 200a of Comparative Example (FIG. 3). The liquid crystal display device 200N differs from the liquid crystal display device 100N (FIG. 28(a)) in that the viewer-side surface and the rear surface of planar portions 224, 224', and 224" of light-transmitting covers 220, 220', and 220" of liquid crystal display units 200n, 200n', and 200n" are parallel.

As shown in FIG. 28(b), the liquid crystal display device 200N is thickest in a place where a portion of the liquid crystal display unit 200n at the curved surface portion 222 side lies on an edge portion of the planar portion 224' of the liquid crystal display unit 200n' at the opposite side from the curved surface portion 222', and in a place where a portion of the liquid crystal display unit 200n' at the curved surface portion 222' side lies on an edge portion of the planar portion 224" of the liquid crystal display unit 200n" at the opposite side from the curved surface portion 222". The liquid crystal display device 100N is similarly thickest in a place where the curved surface portion 22 of the liquid crystal display unit 100n lies on the edge portion of the planar portion 24' of the liquid crystal display unit 100n', and in a place where the curved surface portion 22' of the liquid crystal display unit 100n' lies on the edge portion of the planar portion 24" of the liquid crystal display unit 100n"; however, since the edge portion of the planar portion 24' and the edge portion of the planar portion 24" are thinner than the edge portion of the planar portion 224' and the edge portion of the planar portion 224", the liquid crystal display device 100N is thinner than the liquid crystal display device 200N at its thickest places. Therefore, the overall thickness H10 of the liquid crystal display device 100N is thinner than the overall thickness H20 of the liquid crystal display device 200N.

At the place where the liquid crystal display unit 200n lies on the liquid crystal display unit 200n', a viewer of the liquid crystal display device 200N may visually recognize a joint d20 shown in FIG. 28(b), corresponding to the thickness H2 of the edge portion of the planar portion 224', between an image which is displayed on the viewer's side of the liquid crystal display unit 200n and an image which is displayed on the viewer's side of the liquid crystal display unit 200n'. Since the thickness h1 of the edge portion of the planar portion 24' of the liquid crystal display device 100N is smaller than the thickness H2 of the edge portion of the planar portion 224', a joint d10 which is visually recognized between the liquid crystal display units 100n and 100n' (shown in FIG. 28(a)) can be reduced. Therefore, the liquid crystal display device 100N is able to obscure image joints as compared to the liquid crystal display device 200N.

As shown in FIG. 27(a), the liquid crystal display unit 100n of the liquid crystal display device 100N has a bottom subhousing 58 such that a recessed portion 58d is formed in an edge portion of the bottom subhousing 58 at the curved surface portion 22 side, the recessed portion 58d having a shape corresponding to the shape of an edge portion of the planar portion 24' of the liquid crystal display unit 100n' at the opposite side from the curved surface portion 22'. Similarly, the liquid crystal display unit 100n' has a bottom subhousing 58' such that a recessed portion 58d' is formed in an edge portion of the bottom subhousing 58' at the curved surface portion 22' side, the recessed portion 58d' having a shape corresponding to the shape of an edge portion of the planar portion 24" of the liquid crystal display unit 100n" at the opposite side from the curved surface portion 22". When each liquid crystal display unit includes a bottom subhousing, forming a recessed portion at the edge portion of the bottom subhousing allows the overall display device to become even thinner corresponding to the recessed portion.

Figure 29:
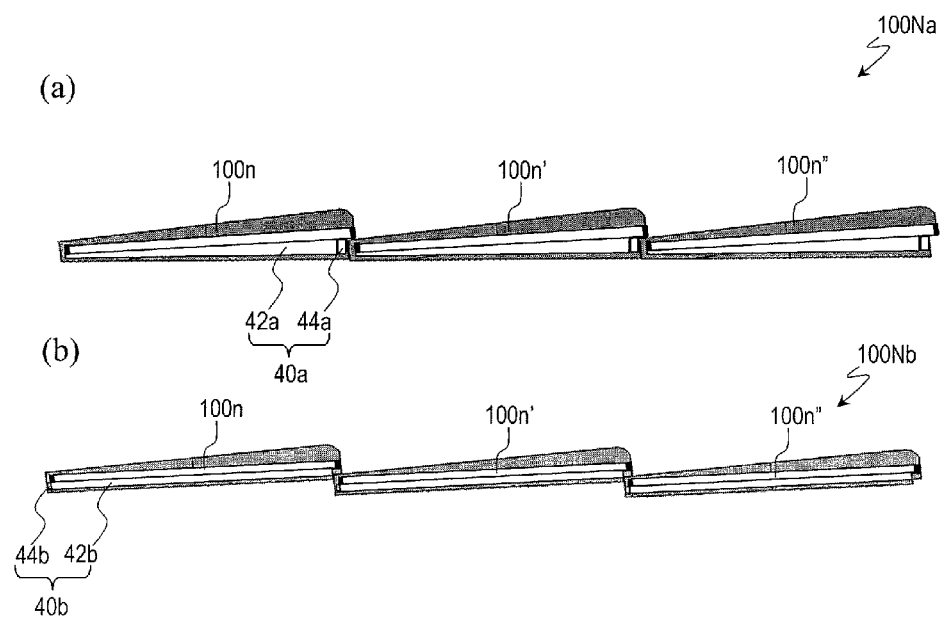
FIG. 29 (a) is a schematic cross-sectional view of a liquid crystal display device 100Na; and (b) is a schematic cross-sectional view of a liquid crystal display device 100Nb.

When a plurality of liquid crystal display units are used for tiling, as in a liquid crystal display device 100Na shown in FIG. 29(a), edgelight type backlight devices 40a may be employed each including a light guide plate 42a with a wedge cross-sectional shape and a light source 44a. By adopting a construction such that the light guide plate 42a with a wedge cross-sectional shape is disposed so that its thickness decreases away from the liquid crystal display unit 100n', with the light source 44a being interposed between the light guide plate 42a and the side face of the liquid crystal display unit 100n', it becomes possible to employ a larger light source than in the case where a backlight device 40b having a plate-like light guide plate 42b and a light source 44b is used as the light source 44a, as in a liquid crystal display device 100Nb shown in FIG. 29(b). Since larger light sources can be used in the liquid crystal display device 100Na than in the liquid crystal display device 100Nb, a high-luminance displaying is enabled. Note that the liquid crystal display device 100Nb shown in FIG. 29(b) illustrates an example where the shape of the liquid crystal display unit 100n as viewed from the viewer's side is rectangular, and where the light source 44b is disposed at the opposite side from the side where the curved surface portion of the light-transmitting cover is located. In the case where the liquid crystal display unit 100n has a rectangular shape as viewed from the viewer's side and a plate-like light guide plate 42b is employed, as in the liquid crystal display device 100Nb, the light source 44b may be disposed on any of the four sides. Moreover, such may be disposed on two or more sides among the four sides.

Although the liquid crystal display device 100N being tiled up with three liquid crystal display units 100n, 100n', and 100n" is exemplified above, tiling may be accomplished with four or more liquid crystal display units. Moreover, similarly to the method of tiling for the liquid crystal display units 100n and 100n' or tiling for the liquid crystal display units 100n' and 100", tiling with two liquid crystal display units may be carried out such that an edge portion of the liquid crystal display panel of one liquid crystal display unit at the curved surface portion side lies on an edge portion of the curved surface portion of the other liquid crystal display unit at the opposite side from the planar portion. Either liquid crystal display device can be made thin and light-weighted for reasons similar to those described with respect to the liquid crystal display device 100N. Moreover, image joints can be obscured.

Figure 31:
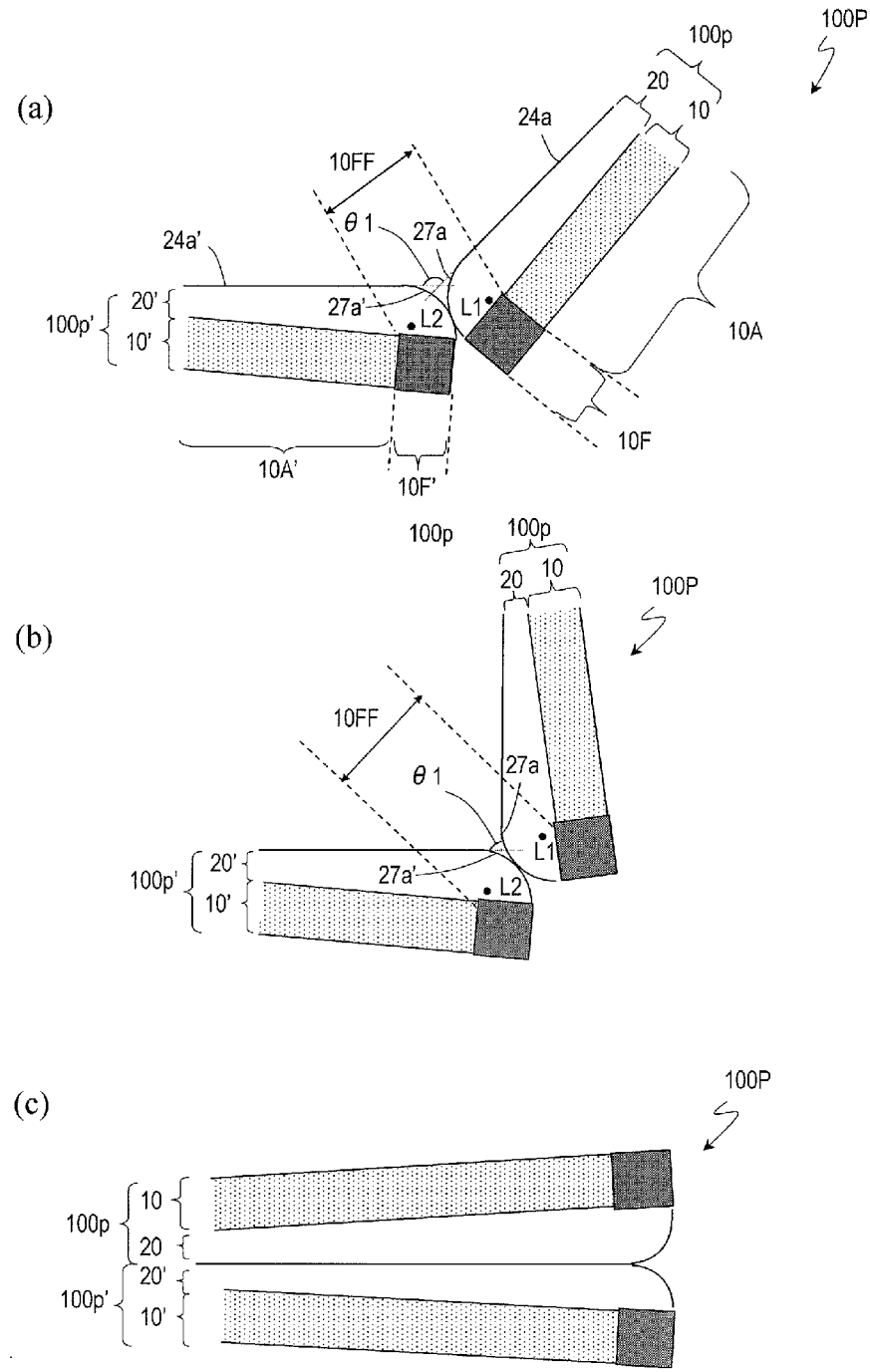
FIGS. 31 (a), (b), and (c) are schematic cross-sectional views of the liquid crystal display device 100P at open angles of 135°, 90°, and 0°, respectively.

Next, with reference to FIGS. 30 and 31, a liquid crystal display device 100P according to another embodiment of the present invention will be described.

FIG. 30(a) shows a schematic plan view of the liquid crystal display device 100P, and FIG. 30(b) shows a schematic cross-sectional view of the liquid crystal display device 100P along line 30B-30B' in FIG. 30(a).

As shown in FIG. 30, the liquid crystal display device 100P includes a liquid crystal display unit 100p, a liquid crystal display unit 100p', and biaxial hinge devices 30. As shown in FIG. 31(a), the liquid crystal display device 100P includes two biaxial hinge devices 30 which are provided so as to oppose each other via the liquid crystal display units 100p and 100p'. Each biaxial hinge device 30 has the same construction as that of the biaxial hinge devices 30 of the liquid crystal display device 100E (FIGS. 12 to 14). As will be described later, the liquid crystal display device 100P differs from the liquid crystal display device 100E (FIGS. 12 to 14) in that the non-display region 10FF will be visually recognized, because no part of an image is displayed on curved surface portions 27 and 27' of light-transmitting covers 20 and 20' of the liquid crystal display units 100p and 100p'.

The liquid crystal display unit 100p includes a liquid crystal display panel 10 and the light-transmitting cover 20, whereas the liquid crystal display unit 100p' includes a liquid crystal display panel 10' and the light-transmitting cover 20'. The light-transmitting cover 20 includes a planar portion 24 and the curved surface portion 27 provided at its edge portion closer to the liquid crystal display unit 100p'. Similarly, the light-transmitting cover 20' of the liquid crystal display unit 100p' includes a planar portion 24' and the curved surface portion 27' provided at its edge portion closer to the liquid crystal display unit 100p. The distance between the viewer-side surface and the rear surface of the light-transmitting cover 20 is largest at a boundary B16 between the curved surface portion 27 and the planar portion 24. The distance between the viewer-side surface and the rear surface of the light-transmitting cover 20' is largest at a boundary B18 between the curved surface portion 27' and the planar portion 24'. The planar portion 24 includes a slope portion such that the distance between a viewer-side surface 24a and a rear surface 24c decreases away from the curved surface portion 27 along a first axis (which herein is the horizontal direction). The planar portion 24' includes a slope portion such that the distance between a viewer-side surface 24a' and a rear surface 24c' decreases away from the curved surface portion 27' along the first axis. A viewer-side surface 27a of the curved surface portion 27 is a part of a cylindrical surface whose center axis is a first center axis C1, whereas a viewer-side surface 27a' of the curved surface portion 27' is a part of a cylindrical surface whose center axis is a second center axis C2.

The light-transmitting cover 20 is disposed so that the first center axis C1 of the cylindrical surface of the viewer-side surface 27a of the curved surface portion 27 coincides with a first rotation axis L1 of the biaxial hinge devices 30, whereas the light-transmitting cover 20' is disposed so that the second center axis C2 of the cylindrical surface of the viewer-side surface 27a' of the curved surface portion 27' coincides with a second rotation axis L2 of the biaxial hinge devices 30.

Similarly to the liquid crystal display panels of the liquid crystal display device 100E (FIGS. 12 to 14) or the like, the liquid crystal display panels 10 and 10' are known liquid crystal display panels. As shown in FIG. 30(b), the liquid crystal display panel 10 includes a display region 10A in which a plurality of pixels are arrayed and a frame region 10F provided outside the display region 10A; similarly, the liquid crystal display panel 10' includes a display region 10A' and a frame region 10F'. Since no image is displayed in the frame regions 10F and 10F', when a single image is displayed on the liquid crystal display panels 10 and 10', a non-display region 10FF composed of the frame regions 10F and 10F' will be visually recognized as a joint.

FIGS. 31(a), (b), and (c) are schematic cross-sectional views of the liquid crystal display device 100P at open angles θ1 of 135°, 90°, and 0°, respectively. Since each biaxial hinge device 30 has the same construction as that of the biaxial hinge devices 30 of the liquid crystal display device 100E (FIGS. 12 to 14), the liquid crystal display device 100P is opened or closed while the viewer-side surface 27a of the curved surface portion 27 and the viewer-side surface 27a' of the curved surface portion 27' are in contact with each other, as has been described with respect to the liquid crystal display device 100E by referring to FIG. 14.

The liquid crystal display device 100P differs from the liquid crystal display device 100E (FIGS. 12 to 14) with respect to the positions at which the curved surface portions 27 and 27' of the light-transmitting covers 20 and 20' of the liquid crystal display units 100p and 100p' are located. The viewer-side surfaces 27a and 27a' of the curved surface portions 27 and 27' of the light-transmitting covers 20 and 20' of the liquid crystal display units 100p and 100p' have a smaller radius of curvature than the radius of curvature of the viewer-side surfaces 22a and 22a' of the curved surface portions 22 and 22' of the light-transmitting covers 20 and 20' of the liquid crystal display device 100E (FIGS. 12 to 14), such that the curved surface portions 27 and 27' of the light-transmitting covers 20 and 20' of the liquid crystal display units 100p and 100p' are disposed on the viewer's side of a part of the frame regions 10F and 10F'. The curved surface portions 27 and 27' are not constructed so as to cause an image which is formed in the display regions 10A and 10A' to be partly displayed on the frame regions 10F and 10F', and the viewer will visually recognize the non-display region 10FF at open angles θ1 of 180°, 135°, and 90° as respectively shown in FIG. 30(b), FIG. 31(a), and FIG. 31(b). However, as will described below, this provides an advantage in that the non-display region can be narrowed as compared to the display device 200P whose entire viewer-side surface is a plane, in any intermediate state between an open state and a closed state.

Hereinafter, it will be explained that the liquid crystal display device 100P is able to reduce the non-display region in intermediate states (0°<θ1<180°) between an open state and a closed state, in comparison with Comparative Example.

Figure 32:
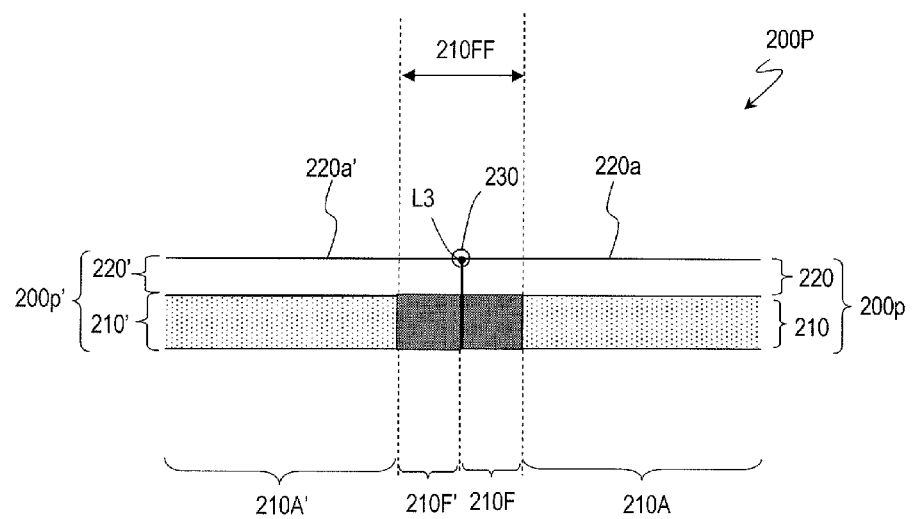
FIG. 32 A schematic cross-sectional view of a liquid crystal display device 200P of Comparative Example.

With reference to FIGS. 32 and 33, a foldable liquid crystal display device 200P of Comparative Example will be described. The liquid crystal display device 200P of Comparative Example shown in FIG. 32 differs from the liquid crystal display device 100P in that it includes hinge devices 230 each having a single hinge shaft, and that an entire viewer-side surface 220a of its light-transmitting cover 220 is a plane.

As shown in FIG. 32, the liquid crystal display device 200P of Comparative Example includes a liquid crystal display unit 200p, a liquid crystal display unit 200p', and hinge devices 230. The liquid crystal display unit 200p includes a liquid crystal display panel 210 and a light-transmitting cover 220. As shown in FIG. 32, the entire viewer-side surface 220a of the light-transmitting cover 220 is a plane. Similarly, the liquid crystal display unit 200p' includes a liquid crystal display panel 210' and a light-transmitting cover 220', and an entire viewer-side surface 220a' of the light-transmitting cover 220' is a plane.

Each hinge device 230 is a uniaxial hinge device having a single hinge shaft, and the liquid crystal display units 200p and 200p' are each capable of rotating around a rotation axis L3 which is defined by the hinge shaft. The liquid crystal display units 200p and 200p' are linked to each other by the hinge devices 230, and are able to take an open state (open angle θ2=180°), a closed state (θ2=0°), or intermediate states (0°<θ2<180°) therebetween.

FIGS. 33(a), (b), and (c) show schematic cross-sectional views of the liquid crystal display device 200P at open angles θ2 of 135°, 90°, and 0°, respectively. The open angle θ2 is an angle constituted by the viewer-side surface 220a of the light-transmitting cover 220 and the viewer-side surface 220a' of the light-transmitting cover 220'.

FIGS. 33(a) and (b) show cross sections of the viewer-side surface 27a of the curved surface portion 27 and the viewer-side surface 27a' of the curved surface portion 27' of the liquid crystal display device 100P with broken lines x and x', respectively. As described above, since the viewer-side surface 27a of the curved surface portion 27 and the viewer-side surface 27a' of the curved surface portion 27' are each a part of a cylindrical surface, the broken lines x and x' are arcs. Now, a situation where viewing is conducted from a direction of bisecting the open angle (θ1, θ2) is considered. As can be seen from FIG. 33(a), when the open angle (θ1, θ2) is 135°, the width of the non-display region 10FF of the liquid crystal display device 100P of the present embodiment along a direction which orthogonally intersects the direction bisecting the open angle is smaller, by the distance $dx_a$ between the broken line x and the broken line x', than the width of the non-display region 210FF of the liquid crystal display device 200P of Comparative Example along a direction bisecting the open angle. Similarly when the open angle (θ1, θ2) is 90°, as shown in FIG. 33(b), the width of the non-display region 10FF of the liquid crystal display device 100P according to the embodiment is smaller than the width of the non-display region 210FF of the liquid crystal display device 200P of Comparative Example by the distance $dx_b$ between the broken line x and the broken line x'.

Even when the open angle (θ1) is neither 90° nor 135°, for similar reasons, the width of the non-display region 10FF of the liquid crystal display device 100P according to the embodiment is smaller than the width of the non-display region 210FF of the liquid crystal display device 200P of Comparative Example. Thus, in the liquid crystal display device 100A, the non-display region 10FF can be reduced in intermediate states (0°<θ1<180°) between an open state and a closed state.

Moreover, the liquid crystal display device 100P can be made thin and light-weighted because the planar portion 24 of the light-transmitting cover 20 has a slope portion such that the distance between the viewer-side surface 24a and the rear surface 24c decreases away from the curved surface portion 27 along the first axis, and because the planar portion 24' of the light-transmitting cover 20' has a slope portion such that the distance between the viewer-side surface 24a' and the rear surface 24c' decreases away from the curved surface portion 27' along the first axis (which herein is the horizontal direction).

Note that the light-transmitting covers 20 and 20' are made of an acrylic resin, for example, and protects the display planes of the liquid crystal display panels 10 and 10' from impact and dust or the like.

A display unit or display device according to the present invention can be used for an electronic book, a smartphone, a portable game machine, a display device with a touchscreen, or the like. Without being limited thereto, a display device according to the present invention can also be used as a display device having a large screen and excellent portability. It can also be used as a display device at an amusement facility.

INDUSTRIAL APPLICABILITY

The present invention is suitably used as a display unit or display device for displaying information.

REFERENCE SIGNS LIST 10, 10' liquid crystal display panel
10A, 10A' display region
10B, 10B' central display region
10D, 10D' peripheral display region
10F, 10F' frame region
10b, 10b' side face of liquid crystal display panel
11, 11' upper substrate
12, 12' lower substrate
13, 13' liquid crystal layer
16, 16' sealing portion
20, 20' light-transmitting cover
22, 22' curved surface portion
24, 24' planar portion
30 biaxial hinge device
40, 40' backlight device
62, 62' optical film portion
100a liquid crystal display unit
100B liquid crystal display device
B1 boundary between planar portion and curved surface portion
C1 first center axis
C2 second center axis
L1 first rotation axis
L2 second rotation axis

The invention claimed is:

1. A direct-viewing type display unit comprising at least one display panel and at least one light-transmitting cover disposed on a viewer's side of the at least one display panel, wherein,
the at least one light-transmitting cover includes a planar portion having a viewer-side surface which is a plane, and a curved surface portion adjoining the planar portion along a first axis, the curved surface portion having a viewer-side surface which is a curved surface;
the planar portion includes a slope portion such that a distance between a viewer-side surface and a rear surface decreases away from the curved surface portion along the first axis;
the at least one display panel includes a display region, and a frame region provided outside the display region; and
the slope portion extends over to a boundary between the display region and a portion of the frame region that is located at an opposite side from where the curved surface portion is located.

2. The display unit of claim 1, wherein a distance between a viewer-side surface and a rear surface of the at least one light-transmitting cover is largest at a boundary between the curved surface portion and the planar portion.

3. The display unit of claim 1, wherein,
the at least one display panel includes a display region and a frame region provided outside the display region; and
the curved surface portion causes a part of light going out from the display region to be refracted toward the frame region.

4. A display device comprising a first display unit and a second display unit, the first display unit and the second display unit each being the display unit of claim 1, wherein,
the first display unit includes a first display panel and a first light-transmitting cover disposed on a viewer's side of the first display panel;
the second display unit includes a second display panel and a second light-transmitting cover disposed on a viewer's side of the second display panel;
the first light-transmitting cover includes a first planar portion and a first curved surface portion adjoining the first planar portion along the first axis;
the second light-transmitting cover includes a second planar portion and a second curved surface portion adjoining the second planar portion along the first axis; and
the first curved surface portion adjoins the second curved surface portion along the first axis.

5. A foldable display device comprising a first display unit and a second display unit, and a uniaxial hinge device having a single rotation axis, the first display unit and the second display unit each being the display unit of claim 1, wherein,
the first display unit includes a first display panel and a first light-transmitting cover disposed on a viewer's side of the first display panel;
the second display unit includes a second display panel and a second light-transmitting cover disposed on a viewer's side of the second display panel; and
the first display unit and the second display unit are linked via the single rotation axis so as to be capable of relative rotation.

6. A display device comprising a first display unit and a second display unit, the first display unit and the second display unit each being the display unit of claim 1, wherein,
the first display unit includes a first display panel and a first light-transmitting cover disposed on a viewer's side of the first display panel;
the second display unit includes a second display panel and a second light-transmitting cover disposed on a viewer's side of the second display panel;
the first light-transmitting cover includes a first planar portion and a first curved surface portion adjoining the first planar portion along the first axis;
the second light-transmitting cover includes a second planar portion and a second curved surface portion adjoining the second planar portion along the first axis; and
the first display unit adjoins the second display unit in such a manner that an edge portion of a rear surface of the first display panel at the first curved surface portion side overlies an edge portion of a viewer-side surface of the second planar portion at an opposite side from the second curved surface portion.

7. A foldable display device comprising a first display unit and a second display unit, and a biaxial hinge device, the first display unit and the second display unit each being defined by:
a direct-viewing type display unit comprising at least one display panel and at least one light-transmitting cover disposed on a viewer's side of the at least one display panel,
the at least one light-transmitting cover includes a planar portion having a viewer-side surface which is a plane, and a curved surface portion adjoining the planar portion along a first axis, the curved surface portion having a viewer-side surface which is a curved surface; and
the planar portion includes a slope portion such that a distance between a viewer-side surface and a rear surface decreases away from the curved surface portion along the first axis, wherein,
the first display unit includes a first display panel and a first light-transmitting cover disposed on a viewer's side of the first display panel;
the second display unit includes a second display panel and a second light-transmitting cover disposed on a viewer's side of the second display panel;
the first display unit and the second display unit are linked by the biaxial hinge device so that the first display unit is capable of rotating around a first rotation axis and that the second display unit is capable of rotating around a second rotation axis which is parallel to the first rotation axis;
the first light-transmitting cover includes a first planar portion and a first curved surface portion adjoining the first planar portion;
the second light-transmitting cover includes a second planar portion and a second curved surface portion adjoining the second planar portion;
a viewer-side surface of the first planar portion is a plane, and a viewer-side surface of the first curved surface portion is a part of a cylindrical surface having a center axis at a first center axis;
a viewer-side surface of the second planar portion is a plane, and a viewer-side surface of the second curved surface portion is a part of a cylindrical surface having a center axis at a second center axis;
the first rotation axis of the biaxial hinge device coincides with the first center axis of the first light-transmitting cover; and
the second rotation axis of the biaxial hinge device coincides with the second center axis of the second light-transmitting cover.

8. The display device of claim 7, wherein, when the first display unit and the second display unit are opened or closed, the viewer-side surface of the first curved surface portion and the viewer-side surface of the second curved surface portion are in contact, and the first display unit and the second display unit rotate in opposite directions from each other so as to satisfy the relationship that: an angle by which the first display unit rotates around the first rotation axis and an angle by which the second display unit rotates around the second rotation axis are equal.

9. The display device of claim 7, wherein,
the first display unit further includes a first light-transmitting subhousing extending in parallel to the first center axis and being disposed on a side face of the first display panel;
the second display unit further includes a second light-transmitting subhousing extending in parallel to the second center axis and being disposed on a side face of the second display panel;
the first display panel includes a first display region and a first frame region provided outside the first display region;
the second display panel includes a second display region and a second frame region provided outside the second display region;
the first light-transmitting subhousing is disposed so that an edge of the first curved surface portion of the first light-transmitting cover is located at a viewer's side of an end face of the first light-transmitting subhousing;
the second light-transmitting subhousing is disposed so that an edge of the second curved surface portion of the second light-transmitting cover is located at a viewer's side of an end face of the second light-transmitting subhousing;
the first light-transmitting subhousing and the first light-transmitting cover are formed integrally;
the second light-transmitting subhousing and the second light-transmitting cover are formed integrally;
the first curved surface portion causes a part of light going out from a first peripheral display region to be refracted toward the first frame region, the first peripheral display region being within the first display region and adjoining the first frame region;
the second curved surface portion causes a part of light going out from a second peripheral display region to be refracted toward the second frame region, the second peripheral display region being within the second display region and adjoining the second frame region;
a part of light going out from the first peripheral display region of the first display panel goes out toward a viewer's side of the first light-transmitting subhousing; and
a part of light going out from the second peripheral display region of the second display panel goes out toward a viewer's side of the second light-transmitting subhousing.

10. The display device of claim 7, wherein,
the first display unit further includes a first planar subhousing and a first curved subhousing, the first planar subhousing having a viewer-side surface which is a plane, a viewer-side surface of the first curved subhousing being a part of a cylindrical surface having a center axis at the first center axis;
the second display unit includes a second planar subhousing and a second curved subhousing, the second planar subhousing having a viewer-side surface which is a plane, a viewer-side surface of the second curved subhousing being a part of a cylindrical surface having a center axis at the second center axis;
the first planar subhousing is disposed so as to adjoin the first planar portion of the first light-transmitting cover;
the second planar subhousing is disposed so as to adjoin the second planar portion of the second light-transmitting cover;
the first curved subhousing is disposed so as to adjoin the first curved surface portion of the first light-transmitting cover;
the second curved subhousing is disposed so as to adjoin the second curved surface portion of the second light-transmitting cover;
a distance between the viewer-side surface of the first curved subhousing and the first center axis is greater than a distance between the viewer-side surface of the first curved surface portion and the first center axis; and
a distance between the viewer-side surface of the second curved subhousing and the second center axis is greater than a distance between the viewer-side surface of the second curved surface portion and the second center axis.

11. A foldable display device comprising a first display unit and a second display unit, and a biaxial hinge device, the first display unit and the second display unit each being defined by:
a direct viewing type display unit, comprising at least one display panel and at least one light-transmitting cover disposed on a viewer's side of the at least one display panel,
the at least one light-transmitting cover includes a planar portion having a viewer-side surface which is a plane, and a curved surface portion adjoining the planar portion along a first axis, the curved surface portion having a viewer-side surface which is a curved surface; and
the planar portion includes a slope portion such that a distance between a viewer-side surface and a rear surface decreases away from the curved surface portion along the first axis, wherein,
the first display unit includes a first display panel, a first light-transmitting cover disposed on a viewer's side of the first display panel, and a first housing;
the second display unit includes a second display panel, a second light-transmitting cover disposed on a viewer's side of the second display panel, and a second housing;
the first display unit and the second display unit are linked by the biaxial hinge device so that the first display unit is capable of rotating around the first rotation axis and that the second display unit is capable of rotating around a second rotation axis which is parallel to the first rotation axis;
the first housing includes a first planar subhousing and a first curved subhousing, the first planar subhousing having a viewer-side surface which is a plane, a viewer-side surface of the first curved subhousing being a part of a cylindrical surface having a center axis at a first center axis;
the second housing includes a second planar subhousing and a second curved subhousing, the second planar subhousing having a viewer-side surface which is a plane, a viewer-side surface of the second curved subhousing being a part of a cylindrical surface having a center axis at a second center axis;
the first light-transmitting cover includes a first planar portion and a first curved surface portion, the first planar portion having a viewer-side surface which is a plane, a viewer-side surface of the first curved surface portion having a cross section which is a curve defined by an aspherical function, the cross section being perpendicular to the first center axis;
the second light-transmitting cover includes a second planar portion and a second curved surface portion, the second planar portion having a viewer-side surface which is a plane, a viewer-side surface of the second curved surface portion having a cross section which is a curve defined by an aspherical function, the cross section being perpendicular to the second center axis;

the first rotation axis of the biaxial hinge device coincides with the first center axis of the first housing;

the second rotation axis of the biaxial hinge device coincides with the second center axis of the second housing;

the first light-transmitting cover is disposed so that the first curved surface portion adjoins the first curved subhousing and that the first planar portion adjoins the first planar subhousing; and the second light-transmitting cover is disposed so that the second curved surface portion adjoins the second curved subhousing and that the second planar portion adjoins the second planar subhousing.

* * * * *